(12) United States Patent
Lablans

(10) Patent No.: US 10,896,327 B1
(45) Date of Patent: Jan. 19, 2021

(54) DEVICE WITH A CAMERA FOR LOCATING HIDDEN OBJECT

(71) Applicant: Peter Lablans, Morris Township, NJ (US)

(72) Inventor: Peter Lablans, Morris Township, NJ (US)

(73) Assignee: Spatial Cam LLC, Morristown, NJ (US)

( * ) Notice: Subject to any disclaimer, the term of this patent is extended or adjusted under 35 U.S.C. 154(b) by 0 days.

(21) Appl. No.: 16/508,031

(22) Filed: Jul. 10, 2019

Related U.S. Application Data

(63) Continuation-in-part of application No. 15/645,545, filed on Jul. 10, 2017, now Pat. No. 10,354,407, which is a continuation-in-part of application No. 14/147,569, filed on Jan. 5, 2014, now Pat. No. 9,736,368, which is a continuation-in-part of application No. 13/844,626, filed on Mar. 15, 2013, now Pat. No. 9,171,221.

(60) Provisional application No. 61/819,634, filed on May 5, 2013, provisional application No. 61/823,375, filed on May 14, 2013, provisional application No.
(Continued)

(51) Int. Cl.
*H04N 7/18* (2006.01)
*G06K 9/00* (2006.01)
*H04N 5/232* (2006.01)
*G06F 16/538* (2019.01)
*H04W 4/02* (2018.01)
*G06F 16/587* (2019.01)
*G06K 9/46* (2006.01)

(52) U.S. Cl.
CPC ....... *G06K 9/00671* (2013.01); *G06F 16/538* (2019.01); *G06F 16/587* (2019.01); *G06K 9/00778* (2013.01); *G06K 9/4604* (2013.01); *H04N 5/23299* (2018.08); *H04W 4/026* (2013.01)

(58) Field of Classification Search
CPC .................................................. G06K 9/00671
USPC ........................................................ 348/47
See application file for complete search history.

(56) References Cited

U.S. PATENT DOCUMENTS

| 4,644,583 | A | * | 2/1987 | Watanabe | G06K 9/4604 348/26 |
|---|---|---|---|---|---|
| 4,782,402 | A | | 11/1988 | Kanamaru | |
| 4,866,430 | A | | 9/1989 | Chek | |

(Continued)

OTHER PUBLICATIONS

A New Indoor Positioning System Architecture Using GPS Signals; Rui Xu et al.; Sensors 2015, 15, 10074-10087; doi:10.3390/s150510074.

(Continued)

*Primary Examiner* — Leron Beck

(57) ABSTRACT

A search contour, defining at least a two-dimensional geographic area is displayed on a portable, wireless and mobile computing device with a camera and a screen which may be a smartphone and which has positional and orientation devices. The camera is positioned in a direction of the search contour and the search contour is activated. The mobile computing device queries a geographic database that is searchable on geographic coordinates for a presence of one or more objects with geographic coordinates located within the search contour. An object within the one or more objects is selected and information, including an image, of the selected object is displayed on the screen.

20 Claims, 23 Drawing Sheets

Related U.S. Application Data

61/825,069, filed on May 19, 2013, provisional application No. 61/864,632, filed on Aug. 11, 2013.

(56) References Cited

U.S. PATENT DOCUMENTS

| | | | |
|---|---|---|---|
| 5,257,324 A | 10/1993 | Bumgardner | |
| 5,343,243 A | 8/1994 | Maeda | |
| 5,568,192 A | 10/1996 | Hannah | |
| 5,633,946 A | 5/1997 | Lachinski | |
| 5,646,679 A | 7/1997 | Yano et al. | |
| 5,680,649 A | 10/1997 | Akimoto et al. | |
| 6,043,310 A | 3/2000 | Liu et al. | |
| 6,075,875 A * | 6/2000 | Gu | G06T 9/001 |
| | | | 375/E7.04 |
| 6,178,144 B1 | 1/2001 | Huiber | |
| 6,282,320 B1 | 8/2001 | Hasegawa et al. | |
| 6,323,858 B1 | 11/2001 | Gilbert et al. | |
| 6,445,833 B1 | 9/2002 | Murata et al. | |
| 6,574,417 B1 | 6/2003 | Lin et al. | |
| 6,669,346 B2 | 12/2003 | Metcalf | |
| 6,696,198 B2 | 2/2004 | Okahisa et al. | |
| 6,813,100 B2 | 2/2004 | Yamaguchi et al. | |
| 6,727,941 B1 | 4/2004 | Coleman | |
| 6,771,810 B1 | 8/2004 | Zhang et al. | |
| 6,885,374 B2 | 4/2005 | Doyle et al. | |
| 6,901,110 B1 * | 5/2005 | Tsougarakis | H04N 5/145 |
| | | | 348/E5.066 |
| 6,961,055 B2 | 11/2005 | Doak et al. | |
| 6,972,796 B2 | 12/2005 | Katta et al. | |
| 6,975,308 B1 | 12/2005 | Bitetto et al. | |
| 6,992,733 B1 | 1/2006 | Klein | |
| 7,007,888 B2 | 3/2006 | Brunson | |
| 7,020,888 B2 | 3/2006 | Reynolds et al. | |
| 7,085,484 B2 | 8/2006 | Hara | |
| 7,102,686 B1 | 9/2006 | Orimoto et al. | |
| 7,123,745 B1 | 10/2006 | Lee | |
| 7,126,897 B2 | 10/2006 | Takeuchi et al. | |
| 7,136,333 B2 | 11/2006 | Wong et al. | |
| 7,149,178 B2 | 12/2006 | Wong et al. | |
| 7,167,155 B1 | 1/2007 | Albert et al. | |
| 7,194,330 B2 | 3/2007 | Carson | |
| 7,227,893 B1 | 6/2007 | Srinivasa et al. | |
| 7,259,792 B2 | 8/2007 | Terada | |
| 7,280,745 B2 | 10/2007 | Mollie et al. | |
| 7,340,077 B2 | 3/2008 | Gokturk | |
| 7,345,934 B2 | 3/2008 | Guterman et al. | |
| 7,365,787 B2 | 4/2008 | Nobels | |
| 7,365,789 B2 | 4/2008 | Ogino | |
| 7,376,246 B2 * | 5/2008 | Shao | G06K 9/3216 |
| | | | 382/103 |
| 7,389,580 B2 | 6/2008 | Jenson et al. | |
| 7,418,275 B2 | 8/2008 | Yiu | |
| 7,424,175 B2 | 9/2008 | Lipton et al. | |
| 7,616,248 B2 | 11/2009 | Parulski et al. | |
| 7,667,765 B2 | 2/2010 | Turley et al. | |
| 7,676,150 B2 | 3/2010 | Nakashima | |
| 7,688,306 B2 | 3/2010 | Wehrenberg et al. | |
| 7,741,734 B2 | 6/2010 | Joannopoulos et al. | |
| 7,751,650 B2 | 7/2010 | Tada et al. | |
| 7,835,736 B2 | 11/2010 | Larocca | |
| 7,869,117 B2 | 1/2011 | Choi et al. | |
| 7,911,493 B2 | 3/2011 | Sarma | |
| 7,957,565 B1 * | 6/2011 | Sharma | G06K 9/00778 |
| | | | 382/103 |
| 8,000,593 B2 | 8/2011 | Kasama et al. | |
| 8,055,046 B2 * | 11/2011 | Feilkas | G06T 7/50 |
| | | | 345/420 |
| 8,098,888 B1 * | 1/2012 | Mummareddy | G06K 9/00778 |
| | | | 382/103 |
| 8,137,008 B1 | 3/2012 | Mallano | |
| 8,180,410 B2 | 5/2012 | Kim | |
| 8,222,207 B2 | 7/2012 | Wu et al. | |
| 8,265,871 B1 | 9/2012 | Starns | |
| 8,284,254 B2 | 10/2012 | Romanowich | |
| 8,311,513 B1 | 11/2012 | Nasserbakht et al. | |
| 8,355,042 B2 | 1/2013 | Lablans | |
| 8,355,627 B2 | 1/2013 | Pace | |
| 8,428,341 B2 | 4/2013 | Lee | |
| 8,432,430 B2 | 4/2013 | Jun et al. | |
| 8,462,987 B2 * | 6/2013 | Cheriyadat | G06K 9/00778 |
| | | | 348/169 |
| 8,531,521 B2 | 9/2013 | Romanowich | |
| 8,533,266 B2 | 9/2013 | Koulomzin | |
| 8,543,269 B1 * | 9/2013 | Wood | G01C 21/203 |
| | | | 701/21 |
| 8,566,694 B2 | 10/2013 | Proux | |
| 8,581,771 B2 | 11/2013 | Bradley | |
| 8,582,821 B1 | 11/2013 | Feldman | |
| 8,675,060 B2 | 3/2014 | Ghose et al. | |
| 8,676,266 B2 | 3/2014 | Kim | |
| 8,786,581 B2 | 7/2014 | Ishii | |
| 8,866,879 B2 | 10/2014 | Seen et al. | |
| 8,909,300 B2 | 12/2014 | Senoo | |
| 8,937,735 B2 | 1/2015 | Mori | |
| 8,970,960 B2 | 3/2015 | Yu | |
| 9,008,732 B2 | 4/2015 | Kang et al. | |
| 9,020,195 B2 * | 4/2015 | Yamashita | G06K 9/00342 |
| | | | 382/103 |
| 9,275,302 B1 * | 3/2016 | Yan | G06K 9/00201 |
| 2001/0015751 A1 | 8/2001 | Geng | |
| 2003/0030638 A1 | 2/2003 | Astrom et al. | |
| 2003/0053659 A1 * | 3/2003 | Pavlidis | G06K 9/00335 |
| | | | 382/103 |
| 2004/0257436 A1 | 12/2004 | Koyanagi et al. | |
| 2005/0122400 A1 | 6/2005 | Kochi et al. | |
| 2005/0175257 A1 * | 8/2005 | Kuroki | H04N 7/144 |
| | | | 382/278 |
| 2006/0061951 A1 | 3/2006 | Hara | |
| 2006/0262960 A1 * | 11/2006 | Le Clerc | G06K 9/32 |
| | | | 382/103 |
| 2007/0010200 A1 | 1/2007 | Kaneko | |
| 2007/0031062 A1 | 2/2007 | Pal et al. | |
| 2007/0035516 A1 | 2/2007 | Voto et al. | |
| 2007/0120979 A1 | 5/2007 | Zhang et al. | |
| 2007/0247697 A1 | 10/2007 | Sohn et al. | |
| 2007/0248260 A1 | 10/2007 | Pockett | |
| 2008/0002023 A1 | 1/2008 | Cutler | |
| 2008/0024594 A1 | 1/2008 | Ritchey | |
| 2008/0024596 A1 | 1/2008 | Li et al. | |
| 2008/0024614 A1 | 1/2008 | Li et al. | |
| 2008/0106634 A1 | 5/2008 | Masuda | |
| 2008/0136916 A1 | 6/2008 | Wolff | |
| 2008/0239170 A1 | 10/2008 | Klosowiak et al. | |
| 2008/0252527 A1 * | 10/2008 | Garcia | G01S 1/68 |
| | | | 342/450 |
| 2009/0002489 A1 * | 1/2009 | Yang | G06K 9/00771 |
| | | | 348/143 |
| 2009/0086015 A1 | 4/2009 | Larsen et al. | |
| 2009/0122161 A1 | 5/2009 | Bolkhovitinov | |
| 2009/0175323 A1 | 7/2009 | Chung | |
| 2009/0193021 A1 | 7/2009 | Gupta et al. | |
| 2009/0213219 A1 | 8/2009 | Eggert et al. | |
| 2009/0309177 A1 | 12/2009 | Jeung et al. | |
| 2010/0045701 A1 | 2/2010 | Scott et al. | |
| 2010/0050779 A1 | 3/2010 | Pushparaj et al. | |
| 2010/0081452 A1 | 4/2010 | Guo et al. | |
| 2010/0128015 A1 | 5/2010 | Feenstra et al. | |
| 2010/0171708 A1 | 7/2010 | Chuang | |
| 2010/0309225 A1 * | 12/2010 | Gray | G06K 9/00671 |
| | | | 345/633 |
| 2011/0109747 A1 | 5/2011 | Forrester et al. | |
| 2011/0149120 A1 | 6/2011 | Kubota | |
| 2011/0017870 A1 | 7/2011 | Pakzad et al. | |
| 2011/0279475 A1 * | 11/2011 | Ikenoue | G06K 9/6204 |
| | | | 345/619 |
| 2012/0001939 A1 * | 1/2012 | Sandberg | G01C 21/3682 |
| | | | 345/633 |
| 2012/0002056 A1 * | 1/2012 | Nam | G06T 7/254 |
| | | | 348/169 |
| 2012/0105573 A1 | 5/2012 | Apostolopoulos | |
| 2012/0113307 A1 * | 5/2012 | Watanabe | H04N 5/23219 |
| | | | 348/333.01 |

(56) References Cited

U.S. PATENT DOCUMENTS

| | | | |
|---|---|---|---|
| 2012/0120199 A1 | 5/2012 | Ben Himane | |
| 2012/0201472 A1* | 8/2012 | Blanchflower | G06K 9/00671 382/224 |
| 2012/0202514 A1* | 8/2012 | Kadirkamanathan | H04W 64/006 455/456.1 |
| 2012/0219227 A1* | 8/2012 | Osako | G06K 9/4604 382/199 |
| 2012/0232719 A1* | 9/2012 | Salmon | G01C 13/008 701/2 |
| 2012/0293633 A1 | 11/2012 | Yamato | |
| 2012/0314068 A1 | 12/2012 | Schultz | |
| 2012/0327189 A1 | 12/2012 | Muramatsu | |
| 2013/0010081 A1 | 1/2013 | Tenney et al. | |
| 2013/0044042 A1 | 2/2013 | Olsson | |
| 2013/0058582 A1 | 3/2013 | Van Beek | |
| 2013/0114849 A1* | 5/2013 | Pengelly | G06K 9/00979 382/103 |
| 2013/0127980 A1 | 5/2013 | Haddick et al. | |
| 2013/0194298 A1* | 8/2013 | Takabatake | G06T 3/0031 345/629 |
| 2014/0104424 A1 | 4/2014 | Zhang et al. | |
| 2016/0134717 A1 | 5/2016 | McNeill et al. | |

OTHER PUBLICATIONS

Indoor GPS Technology Frank van Diggelen and Charles Abraham Global Locate, Inc. Presented at CTIA Wireless-Agenda, Dallas, May 2001.

Indoor and Outdoor Seamless Positioning using Indoor Messaging System and GPS, by Naohiko Kohtake et al. in 2011 International Conference on Indoor Positioning and Indoor Navigation (IPIN), Sep. 21-23, 2011, Guimarães, Portugal.

A Survey of Indoor Positioning Systems for Wireless Personal Networks by Yanying Gu et al. in IEEE Communications Surveys & Tutorials, vol. 11, No. 1, First Quarter 2009 .

A Survey of Indoor Positioning and Object Locating Systems by Hakan Koyuncu et al. in IJCSNS International Journal of Computer Science and Network Security, vol. 10 No. 5, May 2010.

Measurement Uncertainty Assessment in Remote Object Geolocation, Kuscer et al.Journal of Mechanical Engineering 59(2013)1, 32-40, DOI:10.5545/sv-jme.2012.642.

http://desktop.arcgis.com/en/arcmap/10.3/manage-data/geodatabases/types-of-geodatabases.htm website.

A smartphone-based laser distance sensor for outdoor environments, Gao et al., Computer Science and Artificial Intelligence Laboratory, EECS Department, Massachusetts Institute of Technology, downloaded from "URLhttps://projects.csail.mit.edu/wiki/pub/LSPgroup/PublicationList/PhoneLidarICRA2016.pdf".

A Software Based Sonar Ranging Sensor for Smart Phones by Graham et al., downloaded from URLhttp://www.cs.wm.edu/~gzhou/files/SonarSensor_iot15.pdf.

https://support.google.com/maps/answer/18539?co=GENIE.Platform%3DDesktop&hl=en.

"An Introduction to GNSS GPS, GLONASS, BeiDou, Galileo and other Global Navigation Satellite Systems, Second Edition" published by NovAtel, Calgary, Canada, 2015.

https://automating-gis-processes.github.io/CSC18/lessons/L4/point-in-polygon.html.

"Manual for working with ArcGIS 10" by Amy Hiller, Jan. 2011, University of Pennsylvania, downloaded from https://works.bepress.com/amy_hillier/24/.

* cited by examiner

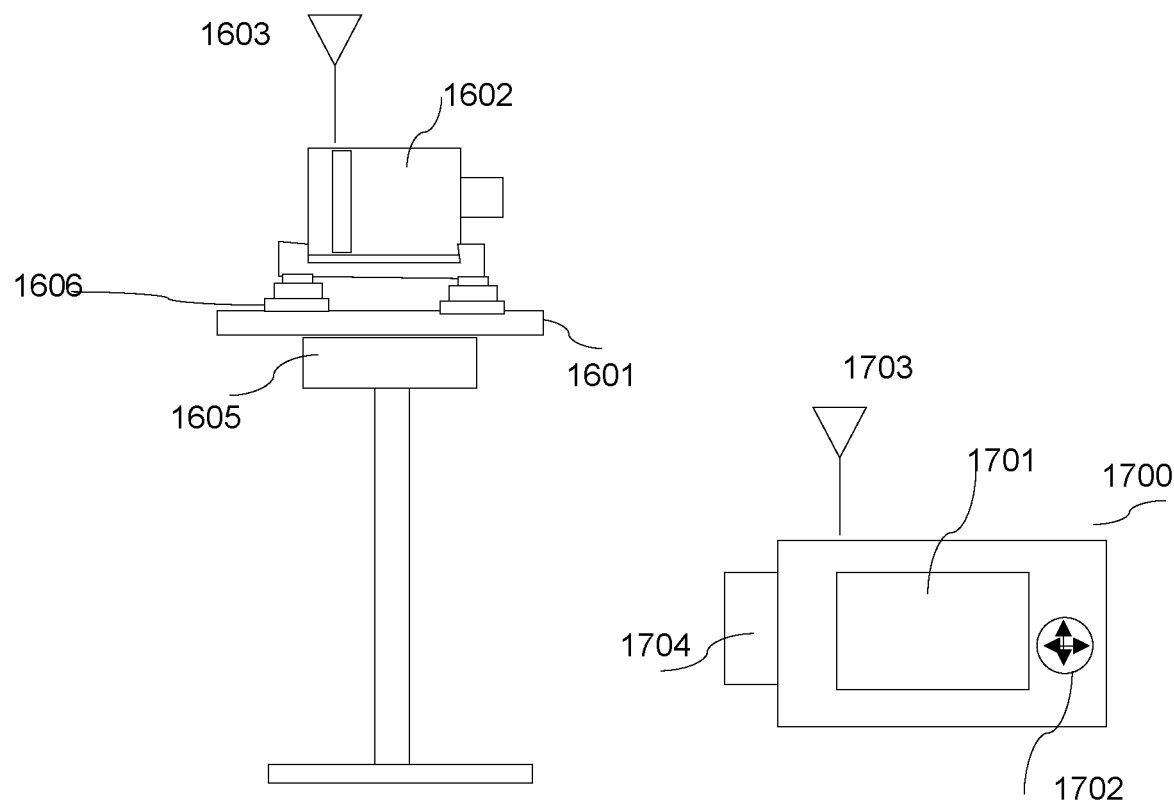
FIG. 16
FIG. 17
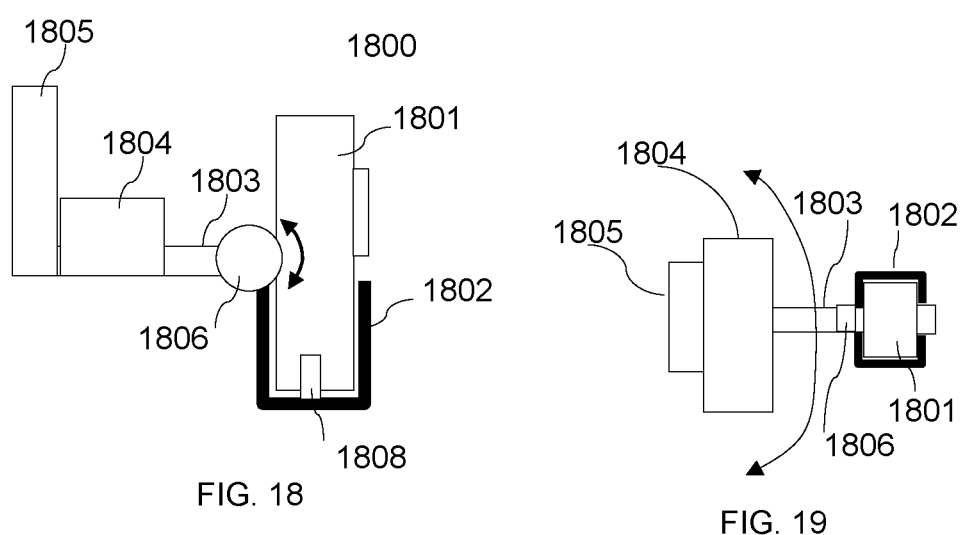
FIG. 18
FIG. 19 head frame with camera display and system equipment a camera display a camera display under the "where are you?" method

US 10,896,327 B1

DEVICE WITH A CAMERA FOR LOCATING HIDDEN OBJECT

CROSS-REFERENCE TO RELATED APPLICATIONS

This application is a continuation-in-part of U.S. Non-Provisional application Ser. No. 15/645,545 filed on Jul. 10, 2017. Application Ser. No. 15/645,545 is a continuation-in-part of U.S. Non-Provisional application Ser. No. 14/147,569, filed Jan. 5, 2014, now U.S. Pat. No. 9,736,368 issued on Aug. 15, 2017, which is a continuation-in-part of U.S. Non-Provisional application Ser. No. 13/844,626, filed Mar. 15, 2013, now U.S. Pat. No. 9,171,221 issued on Oct. 27, 2015, which are all incorporated herein by reference in their entirety. Application Ser. No. 14/147,569 claims the benefit of U.S. Provisional Application No. 61/819,634, filed May 5, 2013, of U.S. Provisional Application No. 61/823,375, filed May 14, 2013, of U.S. Provisional Application No. 61/825,069, filed May 19, 2013, of U.S. Provisional Application No. 61/864,632, filed Aug. 11, 2013. All above recited cases are incorporated herein by reference in their entirety.

BACKGROUND OF THE INVENTION

The present invention relates to digital image devices. More specifically, it relates to a digital device with a camera which is used to detect a presence of an object that is hidden from view by another object or by an obstacle.

There is a need to locate an object or person that is hidden from view or that is difficult to find in a crowd of objects or persons. However, there is a lack of devices, systems and methods that provide locating a hidden object. Accordingly, novel and improved devices and methods are required that locate objects hidden from direct view.

SUMMARY OF THE INVENTION

In accordance with an aspect of the present invention an imaging system is provided to locate an object, comprising: a first computing device including a housing, a processor, a camera, a display with a predetermined part to display at least part of the object, a device that generates geospatial coordinates including an altitude, a digital compass to generate a pointing direction of the camera, a device which determines an inclination of the camera and a communication circuit; a second computing device in a housing attached to the object, the second computing device, which is portable and mobile, includes a processor, a device that generates geospatial coordinates including an altitude, and a communication circuit; wherein the second computing device is configured to receive a request originating from the first computing device to provide data related to the location of the object, and to respond with data that enables the first computing device to guide the camera into a pose that places the object in a field of vision of the camera.

In accordance with a further aspect of the present invention an imaging system is provided, wherein the first computing device is mobile and portable.

In accordance with yet another aspect of the present invention an imaging system is provided, wherein the object includes a device to generate geospatial coordinates. In accordance with yet another aspect of the present invention an imaging system is provided, wherein the object follows a path with known geospatial coordinates.

DESCRIPTION OF THE DRAWINGS

FIGS. 16-19 illustrate a platform in accordance with an aspect of the present invention;

DETAILED DESCRIPTION

Figure 1A:
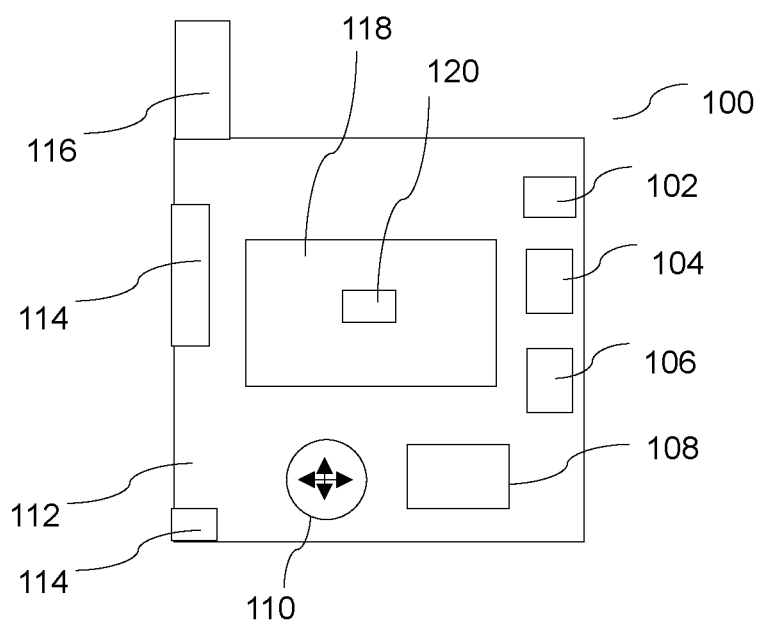
FIGS. 1A and 1B illustrate in diagram of a camera in accordance with an aspect of the present invention.

A wireless, portable and mobile computing device 100 is provided with has a housing 112, which may be a single housing. The device 100 has an antenna 116 for wireless communication to receive and to transmit signals with the outside world. The communication circuitry 114 is included to manage and conduct communication with the outside world, for instance wirelessly through antenna 116 or via a wired connection through a connector 114. The device has a processor 102 with memory 104. Memory 104 is enabled to hold and retrieve data. Data may be instructions, data upon which the processor will operate or data provided by processor or by one or more of the circuits 108 included in the device, including but not limited to GPS circuitry, accelerometer circuitry, magnetometer, digital compass, and MEMS gyroscope as are currently available on the market as digitally readable device which provides data to a memory and are available in systems such as smart phones and mobile tablets.

Figure 1B:
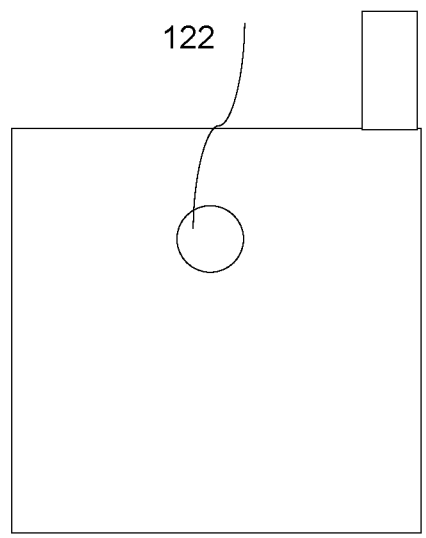

Further included is a display screen 118. Also included is an input device 110 that can control an object or image on the screen 118 and also provides signals that can be transmitted to an external device. A keyboard 108 is also included. FIG. 1A and FIG. 1B illustrate the aspects of the device in different views of the device. FIG. 1B illustrates the device with a lens 122 of a camera included in the mobile device.

Figure 2:
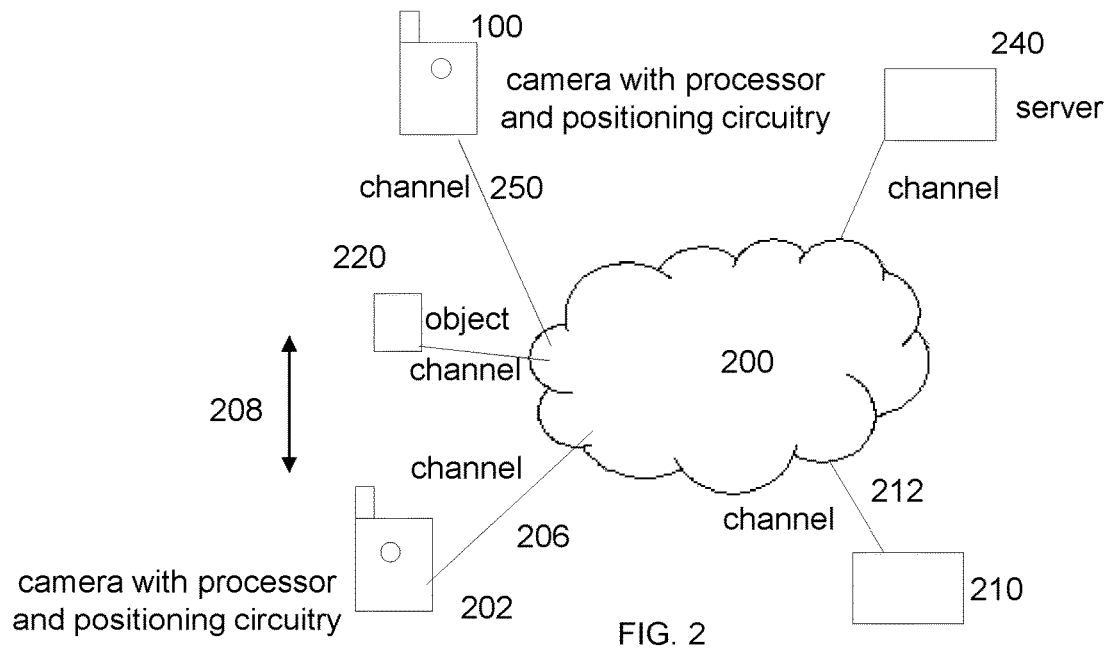
FIG. 2 illustrates a system with a network and connected cameras in accordance with various aspects of the present invention.

The mobile device is enabled to communicate directly, uniquely with a second device 202 via a wired or wireless channel 208 as illustrated in FIG. 2. In a wired communication channel 208 the communication is limited to the two devices 100 and 202 by virtue of a direct cable. In the wireless case a coding or encryption such as in a Bluetooth communication provides the unique exchange of data.

A network 200 is provided wherein the devices 100 and 202 communicate over 200 through connections 250 and 206 respectively. In one embodiment of the present invention, both 100 and 202 have an object 220 in a field of vision of a camera that is part of the respective devices. The cameras of the devices 100 and 202 are identified by the same numerals 100 and 202 of the devices where they belong to. However, at a certain configuration devices 100 and 202 may be out-of-reach for a direct communication. In that case the network 200 is used. Network 200 in one embodiment of the present invention is a cellular phone network. Network 200 in one embodiment of the present invention is the Internet and channels 250 and 206 are for instance Wi-Fi channels that provide the devices access to the network 200. Other configurations are possible and are fully contemplated. Accordingly, device 100 and device 202 are enabled to perform two-way communication which includes exchange of setting date, internal data, instructions, and video and audio data in a wireless manner and in real-time or substantially in real-time, wherein "substantially" means within a delay of preferably less than 1 second, more preferably less than 0.1 send and most preferably less than 0.01 second, wherein an image is a part of a video image and is a frame of such video-image.

In one embodiment of the present invention one or more mobile devices similar to 100 or 202 are connected to the network or in direct communication in real-time or substantially real-time with 100 and/or 202 with object 220 in a field of vision.

In one embodiment of the present invention a device 210 similar to 100 is connected via connection 212 which may be wired or wireless to network 200 to device 202. Device 210 is remote and does not have object 220 in its field of vision. While the communication between 202 and 210 is also substantially real-time a delay may occur and may be as high as 2 seconds or even 4 second or 6 seconds.

In one embodiment of the present invention a server 240 is connected to the network 200. While in one embodiment cameras 100 and 202 may perform the processing required for tracking as explained above and below, the instructions required to calculate intersections points, coordinates and image tracking and detection may be performed on server 240, which is accessible by the cameras via network 200.

In one embodiment of the present invention, an area is an area under surveillance by calibrated cameras. Geospatial coordinates of almost any point on a surface in the area under surveillance and visible by a camera can be determined from images generated by the cameras in the area under surveillance. In one embodiment of the present invention a user has a camera with GPS and camera pose determining capabilities and the user is enabled to view on a screen on the camera an image generated in real-time or substantially in real-time by one or more calibrated cameras that observe the area under surveillance. Because the 2D space of the camera(s) is known, the intersection point of the two cameras (the static camera and the mobile camera) is determined. The 3D space under surveillance is reversibly associated with the calibrated cameras. This means that all surface coordinates in the 3D space under surveillance are associated with the calibrated cameras that cover these coordinates. This means that when the mobile camera tracks an object or a person after a first intersection point has been determined the object which is tracked by the mobile camera can also be viewed on the images of the static cameras. For every image frame, geospatial coordinates of the object are determined. Each set of geospatial coordinates is associated with the 3D-to-2D transformation of one or more cameras.

The camera in one embodiment of the present invention is a calibrated camera and a calibration matrix of the camera has been determined and is stored in the memory. It is well known that a standard camera is a projective system that projects a 3D point in the real world via a non-ideal 3D:2D projection to a 2D point in the coordinates of the image sensor in the camera. The non-ideal projection includes a non-ideal projective lens with distortion and rotational effects of the sensor coordinates relative to the projective plane. The calibration matrix allows the processor to calculate a relationship between a location of an object in the image plane relative to its actual size and distance from the camera.

The literature provides different forms of the calibration matrix. One form is:

$$K = T_{im} S_{pix} P_{cam} R_{cam} T_{cam} \bar{x}.$$

Herein $T_{im}$, $S_{pix}$ and $P_{cam}$ are the intrinsic camera arrays with $T_{im}$ a translation to the image center, $S_{pix}$ a scaling to pixel size and $P_{cam}$ the perspective projection that is performed by the camera. $R_{cam}$ and $T_{cam}$ are extrinsic parameters with $R_{cam}$ a rotation array of the camera center relative to the camera and $T_{cam}$ a translation or camera location relative to the object. The symbol $\bar{x}$ represents the real-world 3D coordinates. The above notation is used from a presentation of University of Jyväskylä at <URL: http://users.jyu.fi/~tro/TIES411_08/camera.pdf which is incorporated herein by reference. How to estimate the calibration components is described for instance in an on-line article at <URLhttp://www.umiacs.umd.edu/~ramani/cmsc828d/lecture9.pdf by Dr. Ramani Duraiswami of the University of Maryland, which is also incorporated by reference herein.

The screen 118 shows an image captured by the camera and acts in one embodiment of the present invention as a viewer of the camera. A window 120 may also be displayed on the screen 118 and for instance highlights or identifies an object captured by the center part of the camera.

At Least Two Cameras are User Operated

Figure 3:
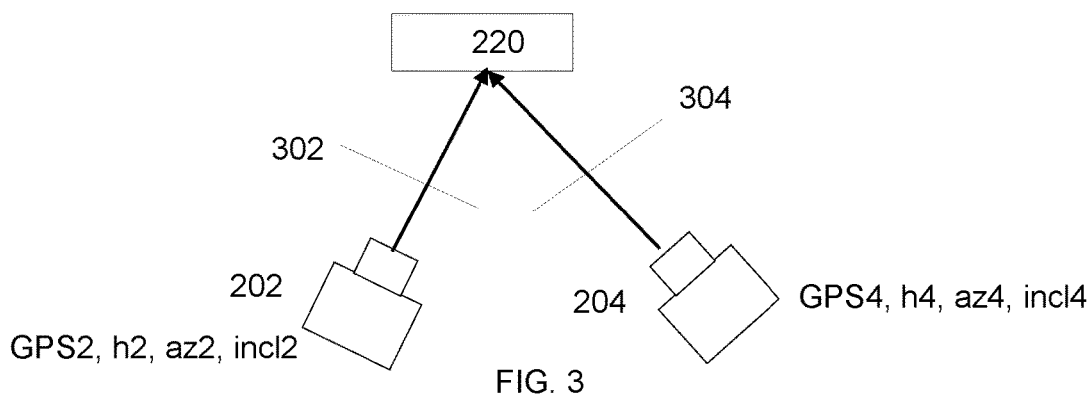
FIG. 3 illustrates two tracking cameras in accordance with an aspect of the present invention.

FIG. 3 illustrates cameras 202 and 204 pointed at an object 220 and 302 and 304 are the imaging planes of the cameras. Camera 202 has GPS coordinates GPS2 (which may include an altitude or elevation of the camera) generated by the GPS unit in the camera; an height h2, which may be measured, estimated or provided by the GPS unit; an azimuth az2 generated by the digital compass; and an inclination incl2 relative to the horizon determined by the accelerometers or gyroscopes or inclinometer. Camera 204 also has known coordinates.

Figure 4:
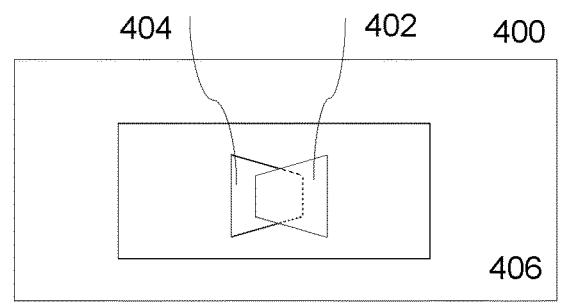
FIG. 4 illustrates a display screen of a camera in accordance with an aspect of the present invention.

The cameras have a screen 400 to view the object as illustrated in FIG. 4. The screen has a window 406 which in one embodiment of the present invention is smaller that the size of the screen. Accordingly, the window 406 captures only a part of the total image generated by the camera of a scene.

The user will move the camera in such a manner that the image of the object appears inside the window. For camera 202 the image of object 220 is 402, for camera 204 the image of object 220 is 404. Each camera experiences a different perspective distortion. Through a communication channel the cameras will also receive and display the image recorded by the other camera. Accordingly, camera 204 displays images from camera 202 and from itself and camera 202 displays images from itself and from camera 204. To distinguish between own images and other images the other images may be displayed in a transparent mode overlaid on an opaque mode of images generated by the camera to which the display corresponds. In one embodiment of the present invention the entire image taken by the second camera, which may be called a remote camera, is displayed on the screen of the first camera.

Figure 5:
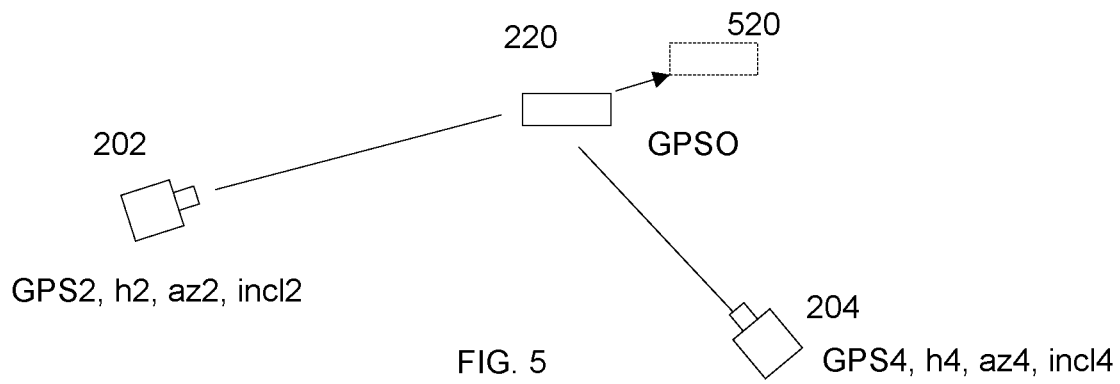
FIG. 5 illustrates two tracking cameras in accordance with an aspect of the present invention.

Scenario 1: the first and second cameras are each operated by its own user and have the target object 220 within a focus window. This situation is illustrated in FIG. 5. For both cameras GPS coordinates are available including an elevation, an azimuth and an inclination which are represented by GPS2, h2, az2, incl2 for camera 202 and GPS4, h4, az4 and incl4 for camera 204. The coordinates GPS0 for object 220 can be easily calculated from by the processor in the camera (=mobile computing device) using simple triangulation using the coordinates of the cameras. It is assumed that both cameras 202 and 204 have an image of object 220 inside the window 406 on the screen of the camera.

Figure 6:
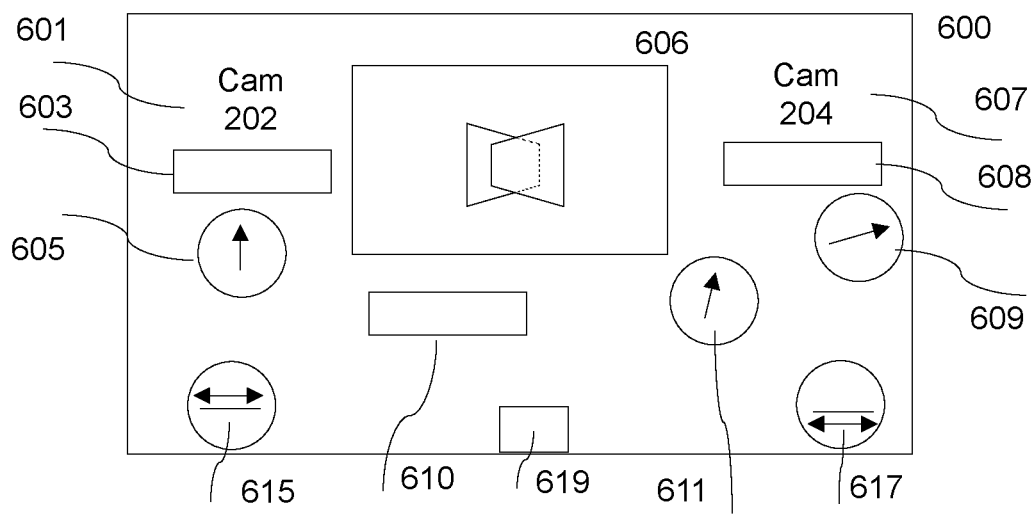
FIG. 6 illustrates a display screen of a camera in accordance with an aspect of the present invention.

It may turn out that the object moves with a certain speed to a position 520 as illustrated in FIG. 5. FIG. 6 illustrates a screen on a mobile device with a camera (either 202 or 204). No camera is in the lead. The screen shows the window 606 on a screen 600 showing the entire images with the image parts of the object inside the window, as the users each point the camera at the object. The own camera has for instance the opaque image and shows the image of the other camera in transparent form. The screen provides further data. At the left side is the data of camera 202, including an ID as item 601, data window 603 showing for instance the coordinates of camera 202 and a gauge type display 605 showing a predicted movement of camera 202. One can see from FIG. 5 that object 220 is moving almost straight away from camera 202, In that case camera 202 should be held by the user in an unchanged position.

In one embodiment of the present invention a screen on a camera displays management and status information as illustrated in FIG. 6. The window 606 shows the images recorded by cameras 202 and 204 in certain stages of transparency. A user may actually set the level of transparency for each of the images, for instance based on the fact if the camera is leading or following.

A user may select or remove icons and data from the screen by a control button 619, which may be a part of the screen if that part is touch sensitive.

On the left side information related to camera 202 is shown also included an inclination gauge 615 which indicates that the camera has to be tilted upward to continue to track object 220 at the estimated speed and direction. A similar set of indicators is provided for camera 204 with ID 607 a predictive turn indicator 609, a window with camera coordinates 608 and an inclination indicator 617, which indicates that the camera has to be tilted down at the estimated speed and direction of object 220. Indicator 611 indicates a slight change in absolute course of object 220. Window 610 shows the estimated new coordinates of the object.

In one embodiment of the present invention at least window 606 displays a map of the area under surveillance by the cameras. A mark shows the position of object 220 on the map. An arrow or another mark shows where the object is expected within a certain time period.

If the movement of the object on the screen is relatively slow, it is easy to cycle between different display screens while still maintaining an image of the object inside window 606. This allows a user to view the management and indicator aspects of the system on the screen in a sequential manner.

Figure 7:
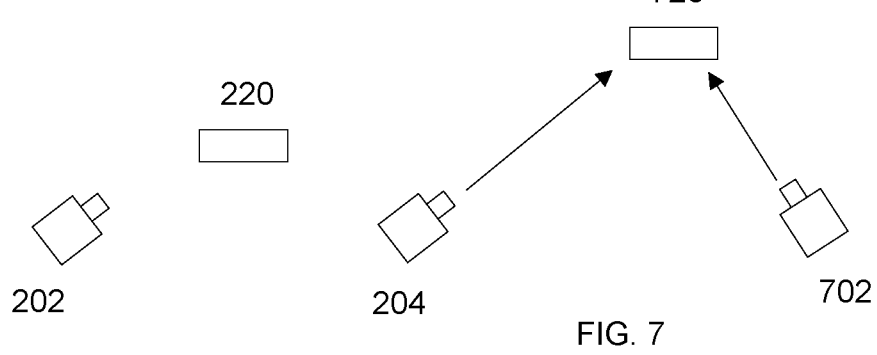
FIG. 7 illustrates tracking cameras in accordance with an aspect of the present invention.

In one embodiment of the present invention object 220 has moved to the right and is in position 720 as illustrated in FIG. 7. At a certain stage object 220 moves out of range of camera 202 and a new camera 702 will start tracking what is now called object 720. In one embodiment of the present invention a hand-off method is provided. For instance when cameras 202 and 204 have a compass angle that reaches a threshold an alert is generated for a hand-off.

Figure 8:
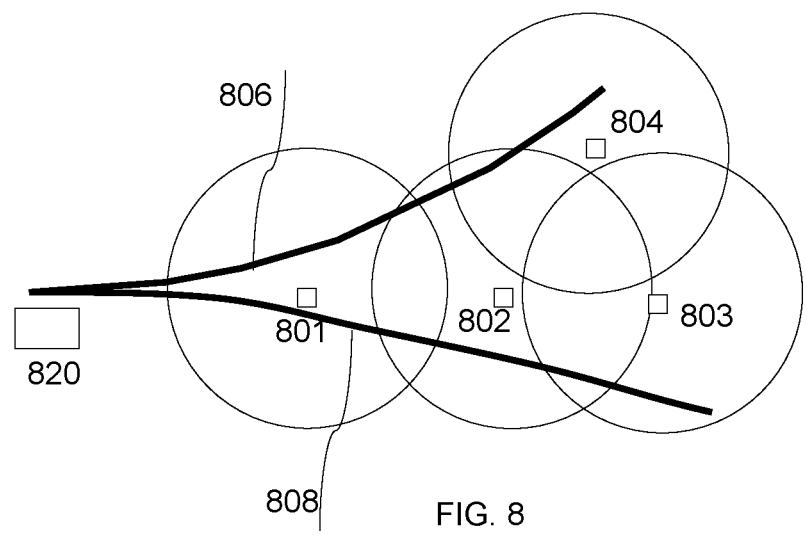
FIGS. 8, 9, 10, 11 and 12 illustrate object tracking in accordance with various aspects of the present invention.

As part of a project cameras are assigned a number of engagement for instance along a route or path that the object is expected to move. Each camera is provided with a circle of operation. Each camera has its own coordinates (GPS, azimuth, elevation, pose or inclination) that are known. The circle has the camera as its center and an operational range as its radius. Based on overlap of the circles and a projected direction or trajectory of the object cameras are dynamically assigned by a computer to one of individual cameras that are part of a system. This is illustrated in FIG. 8. An object 820 can follow one of at least 2 trajectories 806 and 808. The area contains a plurality of cameras 801, 802, 803 and 804 which are spread over the area and which are (as stated before and still maintained) cameras in mobile computing devices with potentially all of the features as required earlier. One can see that cameras 801, 802 and 803 can cover trajectory 808 and cameras 801, 802 and 804 can cover trajectory 806. In one embodiment of the present invention at least one camera in a trajectory gets a management position. This is for instance the last or second to last active camera at a certain time that records the object. The cameras are all "signed-in" to the system and are identified by an identifier as well as their coordinates (such as GPS coordinates). The active camera, which also knows its own location, determines the areas that the object is estimated to traverse and identifies the next camera that is most likely to cover the moving object 820.

For instance camera 801 is active and tracks (or the user of 801 tracks) the object 820. Camera 802 in this scenario was already engaged to be the next active camera. Based on the estimated trajectory, assume it is trajectory 806, the processor in 801 calculates that camera 804 is the most likely able to track 820 along 806 and a message is sent to 804 to alert that it will become one of the active cameras. It will receive all relevant data about the trajectory and speed. And it will receive a pointing direction and an inclination where to point the camera to correctly point at the oncoming object 820. A time alert, based on the calculated speed of the object may be provided or calculated, indicating the user of 804 to point the camera at the right point at the right time a start recording the object. Furthermore, the alerted camera receives updated information where to point the camera, for instance using the screen of FIG. 6.

Figure 9:
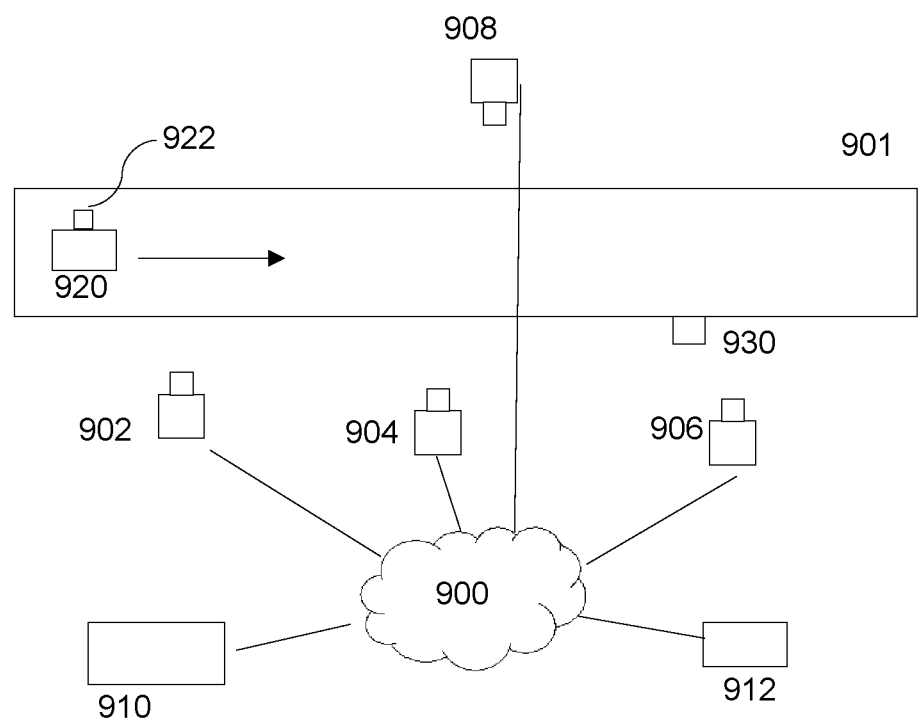

In one embodiment of the present invention a server based system is provided which is illustrated in FIG. 9. A plurality of cameras including 902, 904, 906 and 908 which are cameras in mobile computing devices as described earlier is connected to a network 900. Preferably the connection is a wireless connection, but a wired connection is also possible. The network 900 includes the Internet. Also connected to network 900 is a server 910 which runs at least a sign-up program for a camera tracking system and may have the request, alert and assigning capabilities that are available in distributed form in the system illustrated in FIG. 8.

The system of FIG. 9 is applied in different situations including when the route 901 that an object 920 will follow is known. Such situations are known, for instance in situations of running a marathon or a parade. The server 910 hosts the required software and is configured to share software for the cameras with the cameras or with other devices. The server 910 may be part of a social network with members or a specific tracking service. Connected to a network is also a computer 912.

A person may sign-up individually with a camera or with a plurality of cameras such as 902, 904, 906 and 908 to be part of a tracking system. The sign-up takes place for instance via computer 912 or via one of the cameras, which is in essence a computing device. Computer 912 may request a tracking service from 910, for instance related to a specific event. In response to such a request for a specific race on a specific date a unique identifier is generated and assigned to that requester. The requester submits a request for "tracking cameras" related to a racer on the social network web site. Friends of that person can see the request and can sign-up to participate, preferably via their mobile device with the camera. Each signed up camera receives the proper software from the server and a unique identifier associated with the requester's unique identifier.

During the event, the first camera in a series of cameras starts recording object 920 and alerts or activates the next cameras in the series of cameras. Video images generated by the cameras of object (or person) 920 are transmitted to servers 910 and are available, preferably in a combined form, on the social network website.

Cameras such as 902, 904, 906 and 908 are pre-installed along a route 901. The cameras have a field-of-view that keeps a moving object in view for at least 5 seconds, 10 seconds or 30 seconds or longer. The cameras are calibrated so that the 3D space of the route, or at least the part where the object or person is moving can be correctly identified on the 2D screen. A computing device that has the calibration data and receives the 3D location of an object in the field-of-view of the calibrated camera, thus is enabled to draw a box in screen space identifying an area related to the 3D coordinates.

The object 920 has a transponder 922 with a unique identification which may be a GPS transponder or a positional RFID device. In one embodiment of the present inventions a series of receivers 930 along the route receive real-time and accurate location information about the position of the object or person carrying the GPS device.

Each camera along route 801 has associated with it its location coordinates and the coordinates of the area its field-of-view it covers. Each image of a camera is associated with a timing moment and with coordinates it covers. Concurrently, server 910 records the GPS data and time of the GPS device or location transponder 922.

Figure 10:
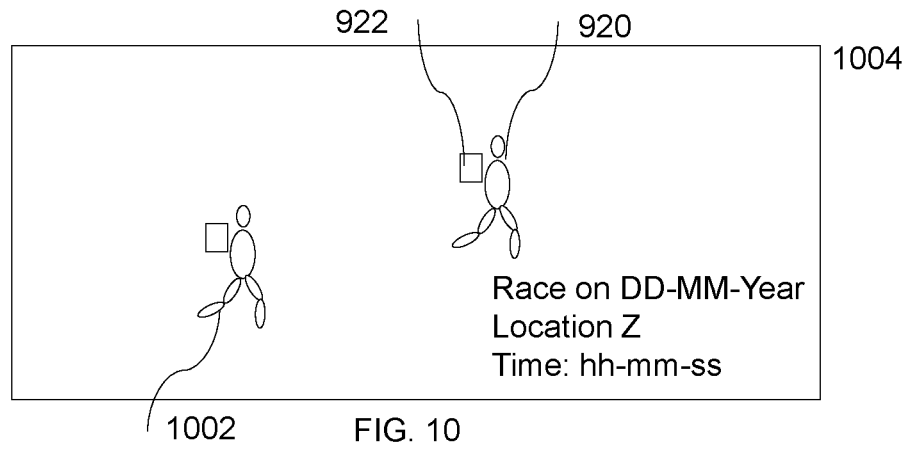

A user retrieves, for instance on computer device 912, images of the race that were stored. By applying the unique identification of the transponder, the server retrieves only images that contain 920 (and thus 922) in the field-of-view of a camera. This is illustrated in FIG. 10 in an image 1004 generated by camera 904 at a defined race at a defined location at a defined time. Person 920 is carrying location device 922. A person 1002 is also in the field of view of the camera. By defining the ID of 922 and a time, the proper images of camera 904 are identified as having 920 in it. Alternatively, by defining an ID and a location server 910 also retrieves the correct images.

Figure 11:
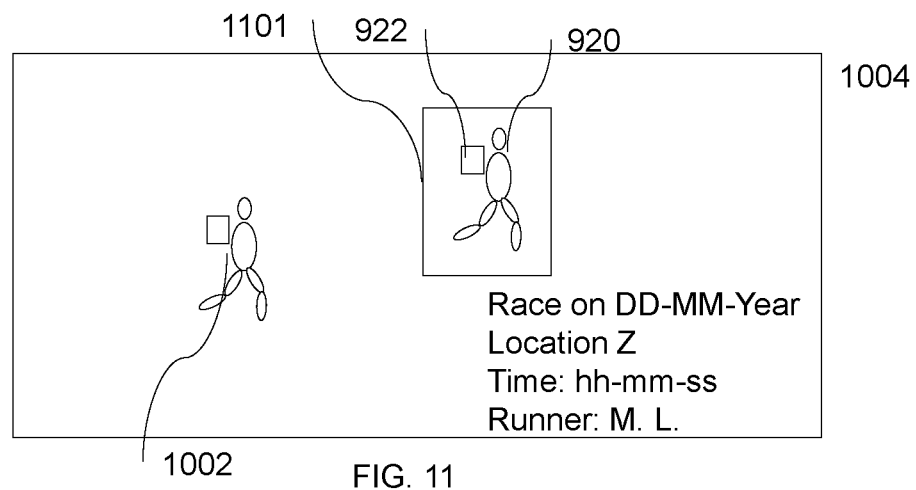

The server 910 identifies the runner 920 by selectively drawing a box 1101 around the correct person based on stored GPS data as is illustrated in FIG. 11. Device 922 may be a phone such as a cellular phone and a location is determined by triangulation of the device from signals that device 922 emits.

Figure 12:
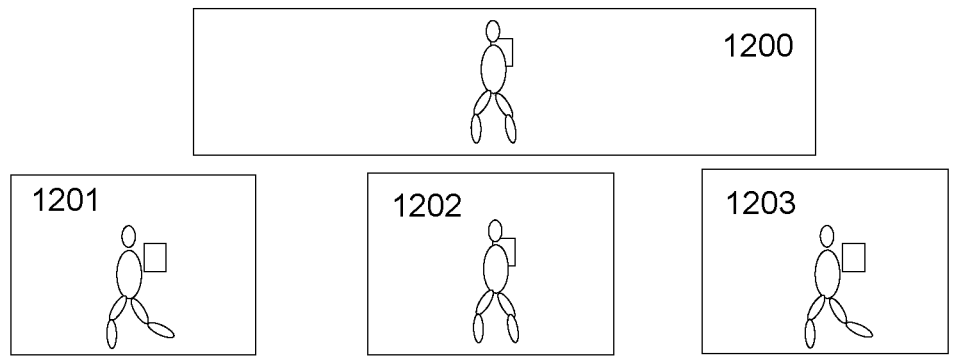

Participants in a ceremony are carrying a transponder that identifies their location in a field of view of a calibrated camera. The camera may be a wide-field camera generating an image as illustrated in 1200 of FIG. 12. The scene may also be covered by a plurality of cameras to generate 2 or more images. For instance an image 1203 while a person approaches the center of a stage, image 202 when at the center of a stage and image 1201 while leaving the stage. The images may be stored on a server, for instance of a social network and are retrieved by applying an identification.

One camera has an image of an object within a window and has to guide another user with a camera to obtain the same object in the window. This is illustrated in FIGS. 3-5.

Figure 13:
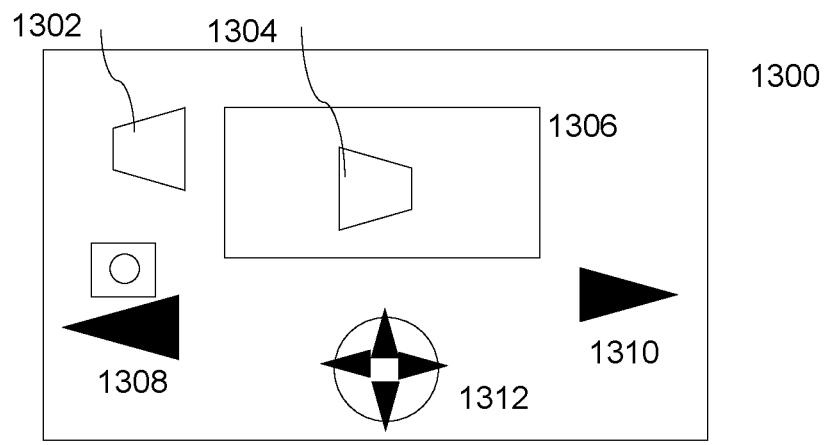
FIG. 13 illustrates a camera in accordance with an aspect of the present invention.
Figure 42:
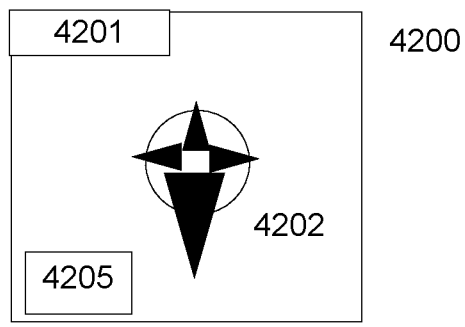
FIG. 42 illustrates a camera controller in accordance with one or more aspects of the present invention.

A camera 204 has an object 220 in a window 406 on a screen of the camera. A user of camera 202 points the camera in generally the right direction, but is unable to identify the correct object. The user of camera 204 guides the user of camera 202 to the object. This is illustrated in FIG. 13. The screen 1300 of camera 204 has image 1304 of the object in window 1306. It shows that image 1302 of the object taken by camera 202 is outside and to the left of the window 1306. This means that the pose of camera 202 has to be adjusted by moving camera 202 into the direction of the object. Camera 204 is provided with a control 1312 which may also be used to control a cursor on the screen of the device 204. The user of camera 204 pushes on the left arrow of control 1312 which will highlight indicator 1308 (which may be provided with a camera indicator) indicating to the user of camera 202 to rotate camera 202 to the left. An indicator 1310 indicates if the camera 202 has to be rotated to the right. Also up and down rotation indicators may be provided. In accordance with an embodiment of the present invention, guidance may take place with a separate guidance device 4200 in remote contact with the camera and with the remote camera. This is illustrated in FIG. 42 and will be described later.

By pressing on the center of 1312 or on any other pre-assigned control such as 4200 an "object in focus" indicator on the screen of camera 202 is activated indicating to the user of camera 202 by the user of camera 204 that the camera 202 is placed in the correct and desired pose. The user of camera 202 also confirms the correct pose and the coordinates of the crossing of the two viewing directions of cameras 202 and 204 is calculated based on GPS and other coordinates such as azimuth and elevation.

Figure 14:
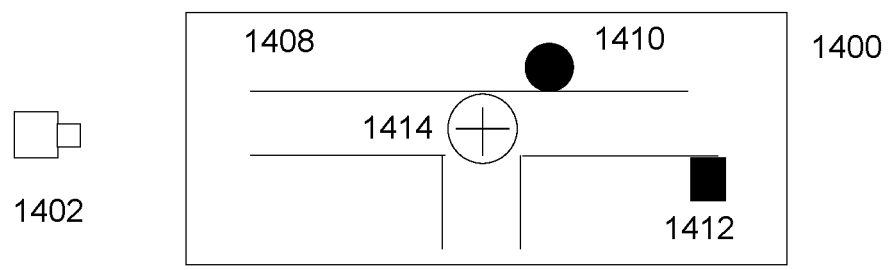
FIGS. 14 and 15 illustrate a tracking scene in accordance with an aspect of the present invention.

In one embodiment of the present invention a map 1408 of the environment is stored on the camera and can be made visible on the screen. This is illustrated in FIG. 14. An object 1414 may be spotted on a crossing of a street. Because a map is calibrated against GPS coordinates the coordinates of 1414 are known and can be calculated by a camera 1404 which can share them with 1402.

In a further embodiment of the present invention known objects 1410 and 1412 with known coordinates are within a neighborhood of object 1414. For instance one can via an input mechanism inform the processor of 1404 that object 1412 is closer to the camera than 1414 and object 1410 is farther away. Camera 1404 determines the azimuth of 1414 and an estimate (for instance a circle) of a distance to the camera 1404.

Figure 15:
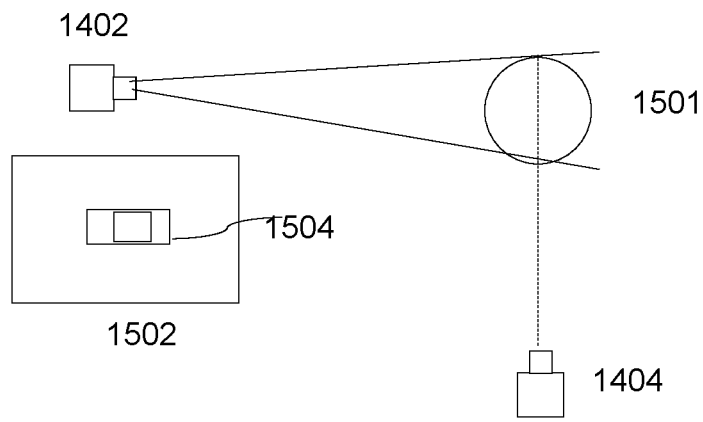

This is further illustrated in FIG. 15. The estimated distance is illustrated by the circle 1501. This translates for the camera 1402 into (in this case) an uncertainty in azimuth which is indicated on the screen of 1502 by a widening of the window 1504. One can be reasonably certain that the object 1414 based on the estimated distance to camera 1404 is located within the window 1504 of camera 1402 when the camera 1402 has an azimuth pointed at the center of the circle 1501. Such estimates are helpful when camera 1402 or a user of 1402 has trouble locating or identifying 1414 and has to rely on camera 1404. When object 1414 starts to move or gets close to a known object such as 1410, more precise coordinates can be determined.

In a further embodiment of the present invention an estimate can be made of the size or height of the object. The camera 1404 is a calibrated camera. Accordingly, a size of an object inside a window (for instance in number of pixels) can be immediately translated to a distance. In case of a linear calibration a height of 40 pixels may correspond to a size of 2 meter. A change in image size to 20 pixels immediate indicates a change in distance of the object to the camera with a factor 2. It is known that lens calibration may not be linear. A processor is programmed to adjust for non-linear lens distortion.

In one embodiment of the present invention a location with GPS coordinates including an altitude for an object are determined and are provided to two cameras. The screens of the cameras as illustrated in FIG. 6 show that a camera can be pointed in the right direction when the correct azimuth and inclination or pose are provided to the camera, even if a user of the camera does not know at what object he is looking. It may be that the user of the other camera knows what he is looking at. In one embodiment of the present invention the control of one camera may be provided to the user of the other camera. As long as the user of the first camera points the first camera in the correct pose, the user of the second camera may apply other first camera controls for instance via the second camera.

In one embodiment of the present invention a computer controlled platform 1601 enabled to hold the mobile computing device with camera 1602 containing at least one lens/sensor unit, the computing device having at least a wired or wireless communication device to communicate with another computer device with camera 1700 illustrated in FIG. 17 with a screen 1701. In case of a wireless communication connection the computing device 1602 has an antenna 1603 and the device 1700 has an antenna 1703. The structure 1605 supports the rotatable or movable platform 1601. The platform 1601 has at least one remotely controlled actuator such as an electrical motor, which may be a stepping motor or any other remotely controllable motor or actuator, which enables the platform 1601 to be rotated in a remotely controlled fashion by device 1700.

In one embodiment of the present invention the platform has integrated on it: GPS, inclinometer (such as gyroscope or accelerometer) and compass capabilities. In one embodiment of the present invention the device with camera 1602 has those capabilities. In one embodiment of the present invention the camera 1700 has those capabilities. In a further embodiment of the present invention the platform 1601 has capabilities to communicate with device with camera 1700. The computing device with camera may communicate with the platform, for instance for transmitting images in real-time from the camera to the platform.

In one embodiment of the present invention the platform, for instance device holder 1802 has a connector 1808 to make a connection with computing device with camera 1801 as illustrated in FIG. 18, wherein an actuator controller in the platform receives a control signal via 1801. Thus, by applying a remote controller a device holder attached to a platform which in one embodiment contains a computing device with a lens/sensor unit is instructed from another a computer device to follow an object. In one embodiment of the present invention a computing device on a platform rotates substantially in one plane relative to a structure the platform is attached to. A computing device on a remotely controlled platform may be enabled to rotate in a second plane, for instance by using a vertical actuator such as a telescoping actuator 1606, or any other actuator that can change the orientation of the platform.

In one embodiment of the present invention a remote controller 1702, which may be a joystick, is incorporated in the device 1700. In a further embodiment of the present invention one or more sensors such as accelerometers 1704 are attached to the display or are incorporated in the device 1700. Such a display with accelerometers is disclosed in U.S. Pat. No. 7,688,306 to Wehrenberg et al. issued on Mar.

30, 2010 which is incorporated herein by reference. The purpose of the sensors is to determine a position or a change of position of the device 1700. Based on the detected change in position a signal which is associated with the difference of position of the device 1700 is generated and is used to control or drive a motor or an actuator in the platform. Positional sensors and positional difference sensors are known and include accelerometers, magnetic sensors, MEMS with mechanical components, gyroscopes such as optical fiber gyroscopes, Hall sensors, inertial sensors, vibrational sensors and any other sensor that can be applied to determine a positional or angular difference or angular rate change or angular velocity or a linear rate change or linear velocity change of the display. These sensors will be called a positional sensor herein. Many of these positional sensors are available in very small formats, for instance integrated on one or more chips, which can easily be fitted inside a display, even in an ut/ul display. A change in position or angle of the display causes the actuator in the platform to be activated.

Gyroscopes and accelerometers in MEMS circuits are marketed by Analog Devices, Inc. of Norwood Mass. Complete attitude circuits are marketed by Navtek Technologies of Richardson, Tex. Digital compass circuits are marketed by STMicroelectronics. Complete GPS chips that communicate with related pose devices are manufactured by Sony, for instance in the D5600 and D5601 chips.

In one embodiment of the present invention, the actuator in the platform is activated based on the amount of change in the display from a neutral position. To stop the actuator from being activated the display has to be returned to its neutral position. A larger change in position by the device 1700 from its neutral position can create a faster activity by the actuator. In a further embodiment of the present invention, activity of the actuator depends on the rate of change of the position of the device. Also because the sensors are directionally sensitive and the actuator is, in a further embodiment of the present invention, a control element such as a button is provided on the device, which allows the actuator to respond or stop responding to a change of position of the device. This allows a user to return the device to a neutral position without activating the actuator.

In a further embodiment of the present invention the device with camera 1700 has a control element, such as a button, to reverse the moving direction in a horizontal plane or a substantially horizontal plane based on a movement of the device. Substantially horizontal is within a range of preferably not more than 45 degrees, more preferably not more than 30 degrees, most preferably less than 15 degrees from the horizon. When the device is moved from left to right the platform also moves from left to right. This is useful when a user of the device 1700 and the camera 1801 in the device holder 1802 face in the same direction. By activating a control on the device 1700 a user can reverse the direction of the platform, so that when the device 1700 moves from left to right the camera, seen from the direction a lens is facing, moves from right to left. This is useful when the camera and the user are facing each other. Activating the control again reverses the direction of the actuator as a result of a movement of the device 1700.

A user confirms in a certain position a zero position which corresponds with a zero position of a computing device. By moving the device 1700 with the positional sensors, the user can cause the movement of the platform and thus of the computing device with a camera and track an object or pan an area. A fixed tracking plane for the platform may be set or programmed. The platform may be provided with a third movement, for instance in a vertical plane.

Accordingly, a platform 1800 is provided which can permanently or removably hold with a holder 1802 a computing device with camera 1801. The holder 1802 is movably connected to an arm or second part 1803 of the platform via one or more actuators 1806 which can rotate and/or move 1802 relative to 1803. A housing 1804 is part of or attached to arm 1803 and holds all relevant circuitry. The camera 1801 is communicatively connected to circuitry in 1804 via 1808 which may be wireless or wired communication circuitry. Circuitry in 1804 controls actuators 1806. Controlling signals may be provided to 1804 via 18008 via the device 1801 which receives data from an external source. In a further embodiment of the present invention housing 1804 contains all circuitry to transmit and receive data and may contain a processor and memory and GPS and pose determining circuitry. The platform 1800 can be permanently or removably attached to a structure 1805. The structure 1805 may be a static structure such as a building, a movable structure such as a stand or tripod, or a moving structure such as a vehicle, a car, a boat or an aircraft such as a drone.

The actuators may be a controlled mechanism that provides rotation in three planes for azimuth, pitch and roll. In general two planes (azimuth and pitch) may be sufficient. Rotation in one embodiment is provided by stepper motors which are preferably bidirectional stepper motors. The platform has at least one neutral position which can be achieved by giving a "go to neutral" command. Preferably the platform can be rotated over a range of plus and minus 60 degrees azimuth and plus and minus 30 degrees in pitch from the neutral positions and more preferably from plus and minus 90 degrees azimuth and plus and minus 60 degrees pitch. In one embodiment of the present invention additional stepper motors are provided to correct the roll of the platform to zero horizon form a deviation which preferably is not greater than 30 degrees from neutral to the horizon but may be greater. In one embodiment of the present invention the roll can be corrected manually by allowing the platform to be manually rotated about an axis with sufficient resistance so that the platform does not roll spontaneously from its neutral position.

When the platform is attached to a moving structure such as a vehicle or a drone, the platform based camera is provided with an orientation in such a way that the sum of the vector in real space determining the position of the drone and the vector directing the platform based camera results in a vector that points to the object that is being tracked.

Figure 20:
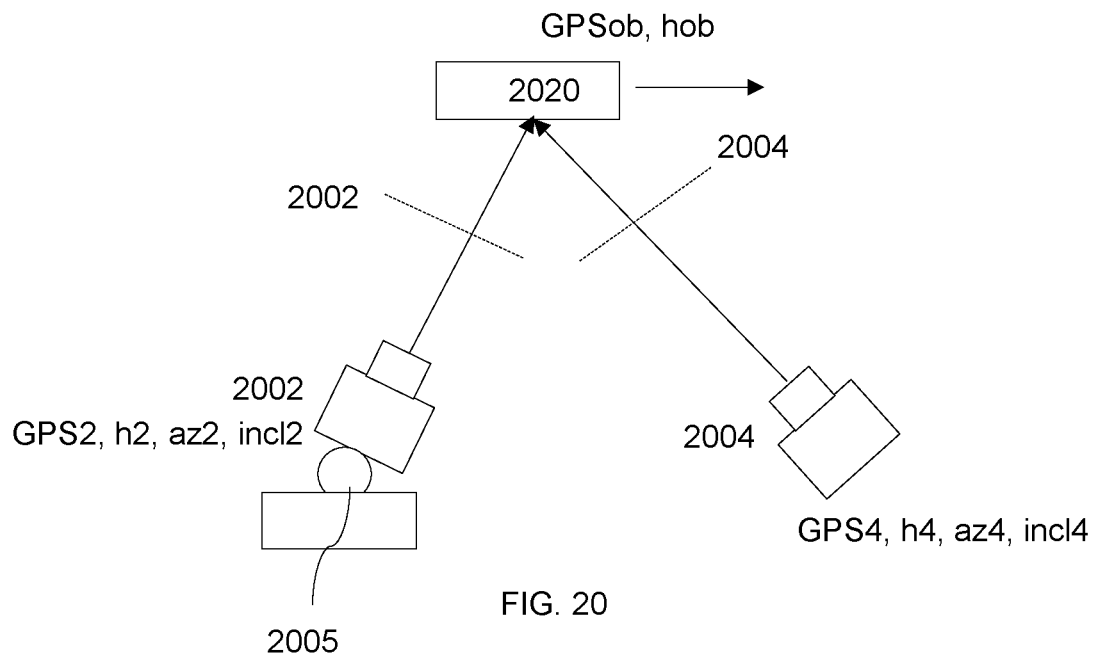
FIG. 20 illustrates a tracking scene in accordance with an aspect of the present invention.

In one embodiment of the present invention a user of mobile computing device with a camera 2004 tracks an object 2020, which may be a moving object as illustrated in FIG. 20. A movable platform with a camera 2002 is configured to also track the object 2020 after, if required, an initialization process. Both 2002 and 2004 have the facilities to determine a GPS location of the respective devices, an azimuth of the lens orientation and an inclination as was already described earlier above. Camera 2004 has a screen as described earlier and for instance illustrated in FIG. 6.

In a first scenario a GPS location 'GPSob' of the object, including an altitude 'hob', is known to device 2004. Camera 2004 is focused on object 2004. In accordance with one aspect of the present invention the operation of the camera, including focus and shutter settings, are automatically controlled by the processor once the distance to the object has been determined or estimated. The camera 2002 is informed of the 'GPSob' of the object and the camera 2002 is turned in the correct direction of 2020 by the actuator(s) 2005. The correct GPS coordinates including altitude of 2020 may be derived from a map, or from two cameras like 2004 or from an estimate by 2004 or by manually rotating 2002 towards 2020. When cameras 2002 and 2004 with known orientation are focused on 2020, the coordinates of 2020 can be calculated.

In another scenario camera 2002 is directed to the object 2020 by the camera 2004 or the user thereof. In that case the camera 2002 is turned in the right direction by controls on camera 2004 which control the actuators 2005. It has already been explained that a user of 2004 can instruct a user of another camera where to direct by using indicators on the screen. The indicators that were intended for the user of the other camera may be applied to the actuators 2005, thus allowing a user of 2004 to point the camera to object 2020. The user of camera 2004 can see the image taken by 2002 on the screen of camera 2004 and thus knows when the object 2020 is captured by 2002 when the image taken by 2002 appears inside a window on the screen of 2004 and for instance coincides or overlaps with an image of 2020 taken by 2004 inside the window. The moment the images of 2020 taken by 2002 and 2004 overlap inside the window the cameras are both correctly directed and 'GPSob' and 'hob' can be calculated.

Once the GPS coordinates (including altitude) of the object is determined the pose (azimuth and inclination) of the cameras is fixed to track the object. There are several ways to track the object. In one embodiment of the present invention the user operated camera is leading and the platform bound camera follows. There are several ways to achieve this. At least two embodiments will be provided.

In a further embodiment of the present invention control signals for the actuators are determined based on predictive filtering techniques like Kalman filtering or particle filter techniques. For instance U.S. Pat. No. 8,222,207 to Kenji Baba issued on Jul. 17, 2012 which is incorporated herein by reference teaches particle filter based tracking. US Patent Application Publication 2009/0213219 to Eggert et al. published on Aug. 27, 2009 which is incorporated herein by reference discloses object tracking using a Kalman filter.

Figure 21:
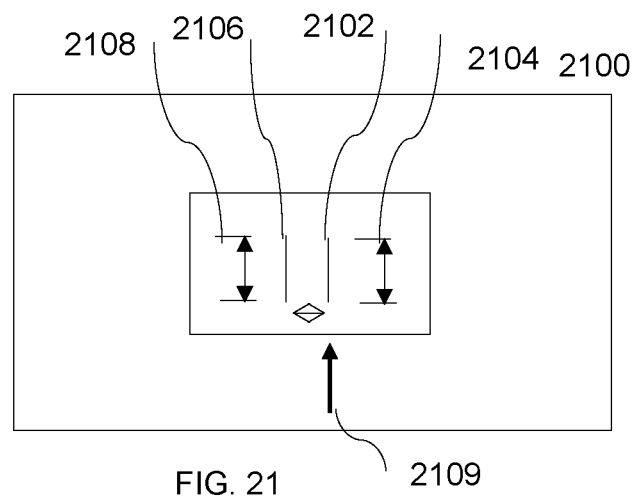
FIG. 21 illustrates a camera screen in accordance with an aspect of the present invention.

FIG. 21 illustrates one embodiment in accordance with an aspect of the present invention. The processor of the hand held camera determines a height 2104 of the object. This may be done from an extracted feature 2102 of the image of the object. However, the height may be adjusted manually by the user if required. The feature 2102 may be an edge or corners or any other feature extracted from the image of the object taken by the hand held camera. The change in height 2104 of 2102 in consecutive images indicates if the distance between the object and the camera is changing and an estimate can be made of the distance and the rate of change of the distance.

The distance determined by the camera, combined with the GPS and azimuth of the hand-held camera allows to provide an estimate of the new position in GPS coordinates of the object. These estimated GPS coordinates of the object are used to calculate an azimuth and an inclination of the platform based camera and are translated into instructions for the actuator to direct the camera into the newly calculated direction. A feature 2106 of the object corresponding with feature 2102 is extracted from the image of the object recorded by the platform based camera. The hand held camera and the platform based camera are synchronized when 2106 and 2102 are aligned or have some predetermined distance. The actuators of the platform are instructed to minimize the distance between 2106 and 2102. A height 2108 of the object 2106 as seen by the platform based camera is applied to determine a change of distance between the platform based camera and the object.

Figure 22:
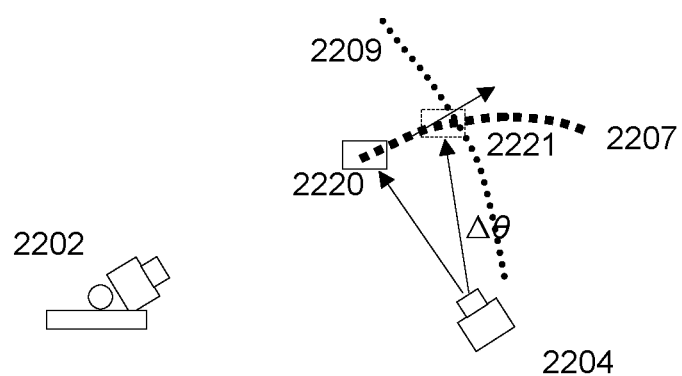
FIGS. 22 and 23 illustrate a tracking scene in accordance with an aspect of the present invention.

FIG. 22 illustrates situations wherein the size of an image of the object 2220 is applied. In one embodiment of the present invention, an initial position of object 2220 is determined, including distances of the object to the cameras 2202 and 2204. A size of the object, at least in pixels, is determined by each camera. The object moves to position 2221. The change in pixel size of the object reflects a change in distance to the camera. The change is distance and new distances are calculated for each camera. The processors on the cameras determine that 2221 is at a distance determined by circle 2209 from 2202 and a distance 2207 from 2204. Position 2221 is at the crossing of the circles 2209 and 2207 which can be calculated with simple analytic geometry.

Object 2220 moves in a straight line away from platform based camera 2202 but moves at an angular speed AO for camera 2204. That means that extracted feature 2106 remains in place but grows smaller while extracted feature 2102 moves to the right inside the window. Because 2106 stays in place in the 2D window space the platform of 2202 does not have to rotate to keep 2106 in place. However, camera 2204 has to turn at an angular speed of AO to keep 2102 in place inside the window space. In general a user will lag in speed in following an object. The processor in one embodiment of the present invention creates a mark 2109 to assist a user to bring the camera 2204 in alignment with the moving object 2220 in such a way that the features 2106 and 2102 are properly aligned when 2220 has reached position 2221. It is noted that feature 2106 follows feature 2102 or camera 2202 follows camera 2204.

In one embodiment of the present invention camera 2202 tracks object 2220 autonomously for a very brief period after being initialized to the correct positioned by the hand held camera. It does so by tracking the feature 2106 in its own 2D space and activating the actuators so that the feature 2106 maintains its position in 2D space of the screen of camera 2202. At intervals, for instance at regular intervals of 10 ms, 50 ms, 100 ms or 1 sec, difference between features 2106 and 2102 in 2D screen space is determined. In a preferred embodiment of the present invention the features 2106 and 2102 overlap or coincide in 2D screen space when both cameras have the object properly within the screen window.

Accordingly, a difference in location of the features in calibrated 2D screen space indicates that the camera 2202 is not in synchronization with camera 2204. The platform camera in that case can be ahead of the object and thus has to at least slow down rotation or even reverse direction. The platform camera also can lag the hand held camera and has to catch up (or increase its rotation speed) if the hand held camera maintains its speed. Or the platform camera has to maintain its speed for a calculated time if the had held camera is slowing down until the platform camera has caught up. A Kalman filter can be applied to estimate a required rotation speed of the platform camera. Operationally one can create a feedback system such as a PID system that minimizes an error angle between the hand held camera and the platform camera, wherein a feature in 2D screen generated by the hand held camera is considered the actual position.

Figure 23:
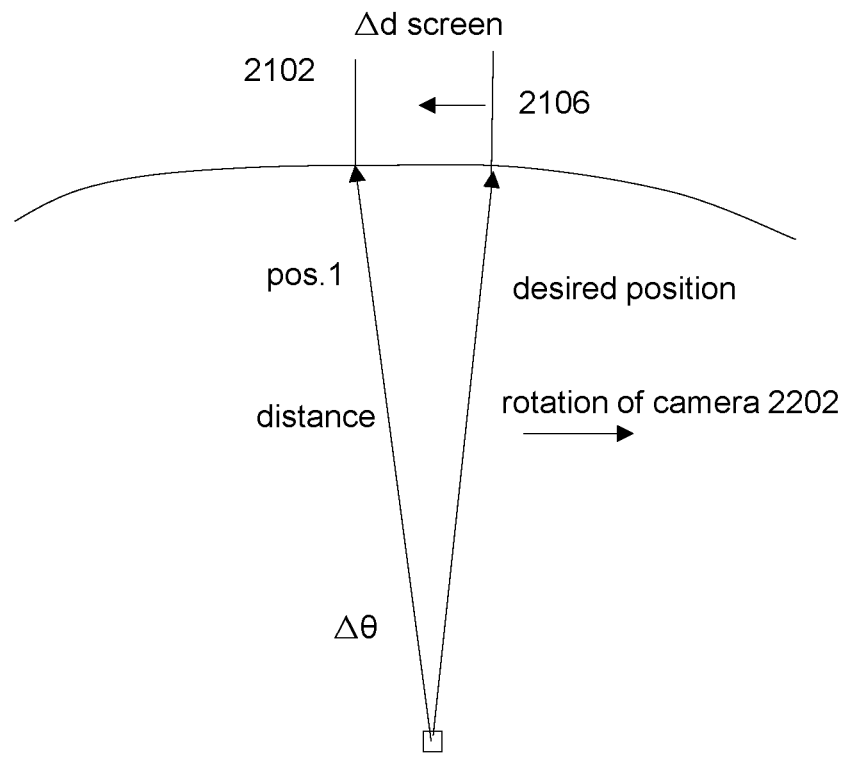

Accordingly, the processor will match the position of feature of 2106 from an image of platform camera 2202 in 2D screen space with feature 2102 of hand-held camera 2204 in 2D screen space. This is illustrated in FIG. 23 which illustrates that camera 2202 is rotated to the right. Assuming some delay by the actuators of the platform it may be that feature 2106 appears temporarily to the right of 2102 and the actuators have to move the camera to move feature 2106 to the left to align with 2102 again. A difference between an actual azimuth and a desired azimuth of the platform based camera is determined and used to activate the actuators of the platform. The speed of the actuators, which may be pulse controlled stepping motors depends on the size of the difference angle AO. If the angle is large, for instance 5 degrees or 10 degrees or larger a faster sequence of pulses will be generated by the controller. If the angle is mall, smaller than 5 degrees or close to 1 degree pulses for the stepping motor that rotates the platform in a certain plane will be generated at a lower rate to prevent overshoot.

Figure 24:
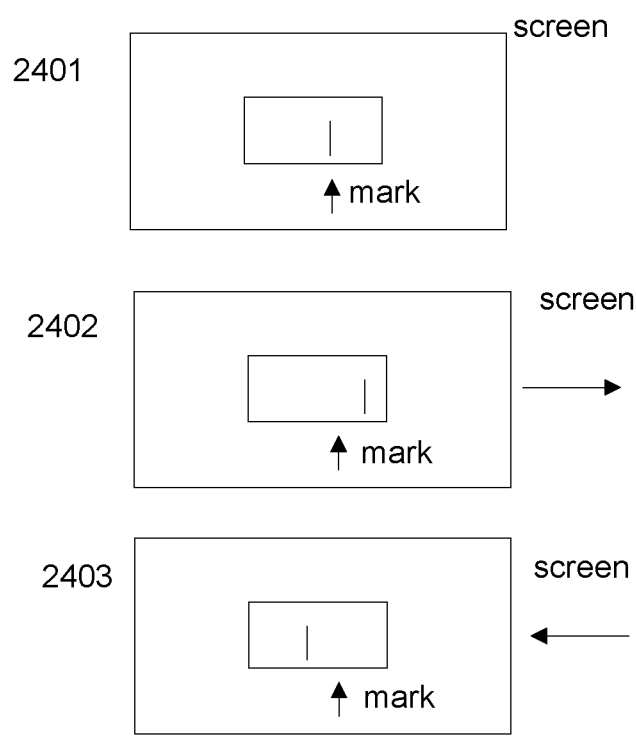
FIG. 24 illustrates camera screens in accordance with an aspect of the present invention.

This is further illustrated in FIG. 24. It is noted that both cameras operate in their own 2D screen space. The screen spaces in one embodiment of the present invention are normalized so that a user can see on the screen of hand held camera if and how the platform camera is tracking. The user keeps the object in a fixed or substantially fixed position (for instance within 1 mm, 5 mm or 10 mm variance) on the screen. This creates a mark on the screen or at least for the processor in 2D screen space. The 2D screen space also has image of the object or a feature of the object as generated by the platform camera. The processor can easily determine if the platform camera is in sync (screen 2401) is lagging (screen 2402) and the platform has to rotate to the right or the platform camera is leading (screen 2403) in which case the platform has to rotate to the left.

Figure 25:
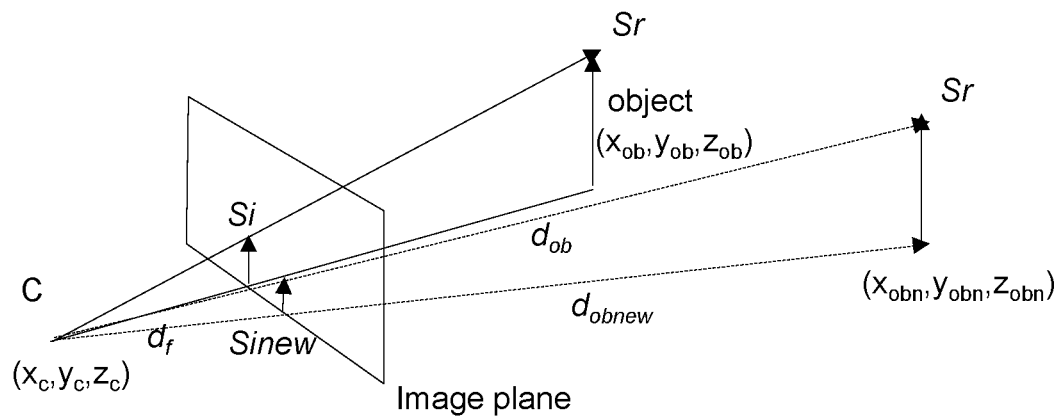
FIGS. 25, 26, 27 and 28 illustrate a tracking scene in accordance with an aspect of the present invention.

The use of a size of an object for tracking is further illustrated in FIG. 25. A camera with camera node has an image plane that is normal to the azimuth direction towards an object with a size Sr and GPS coordinates $(x_{ob}, y_{ob}, z_{ob})$. The camera is located at $(x_C, y_C, z_C)$. From that one can make an accurate determination of distance $d_{ob}$ from the camera to the object. This can take place, for instance in an initial phase of tracking wherein both the hand held and platform cameras have known coordinates and are appropriately directed at the object so that for instance the screen of the hand held cameras shows overlapping matching images inside the window on the screen. Even in a simple approximation using the pin-hole camera equation $$\frac{S_i}{f} = \frac{S_r}{d_{ob}}$$

with $S_i$ the determined size of the object image in the image plane of the camera, $S_r$ the to be calculated size of the object, $d_{ob}$ the previously determined distance of the camera to the object and f the focal length of the camera, one can make a good estimate of the real size of the object.

One can also apply a more detailed transformation of real-space to camera space based on the camera calibration to adjust for lens distortion. Accordingly, one can with a preferred accuracy determine the actual size of the object with preferably an accuracy of 10% better or more preferably at least a 5% accuracy. In most cases the accuracy of the object determination will depend on the accuracy of the GPS location units, which in standard equipment is about 10 meter or better under good conditions. A horizontal accuracy of 2-3 meters can be obtained with GPS SPS receivers. Augmented GPS such as High Accuracy NDGPS (Nationwide Differential GPS) allows for an accuracy in the 10-15 centimeter range.

Broadcom® of Irvine, Calif. has announced a new Location Architecture with BCM4752 with Multi-Constellation acquisition with sub-meter accuracy and fast acquisition.

Accordingly, a change in image size can be translated into a change of distance of the object relative to the hand held camera and to the platform based camera. This is further illustrated in FIG. 25. The object with length Sr moves to a new position, to the right of its previous position and away from the camera. The user will turn the camera so that the new image of the object with diminished image size Sinew is within the preset window on the screen and the image plane is again perpendicular to the viewing direction (not shown). The processor in the camera (or a remote processor in communication with the camera) calculates the new distance $d_{obnew}$ of the object to the camera.

The GPS coordinates $(x_C, y_C, z_C)$ in one embodiment of the present invention remain the same. It is contemplated that the camera moves with the user. This still allows for an accurate determination of the coordinates. The compass orientation or azimuth of the camera pointed towards the object is known and the distance to the object is known. This allows the new GPS coordinates of the object to be calculated as $(x_{obn}, y_{obn}, z_{obn})$. Based on the new GPS coordinates of the object and the known coordinates of the platform based camera an azimuth of pointing the platform based camera to the object is calculated and the actuator(s) of the platform are activated to rotate the platform into the correct pointing direction towards the object.

Figure 26:
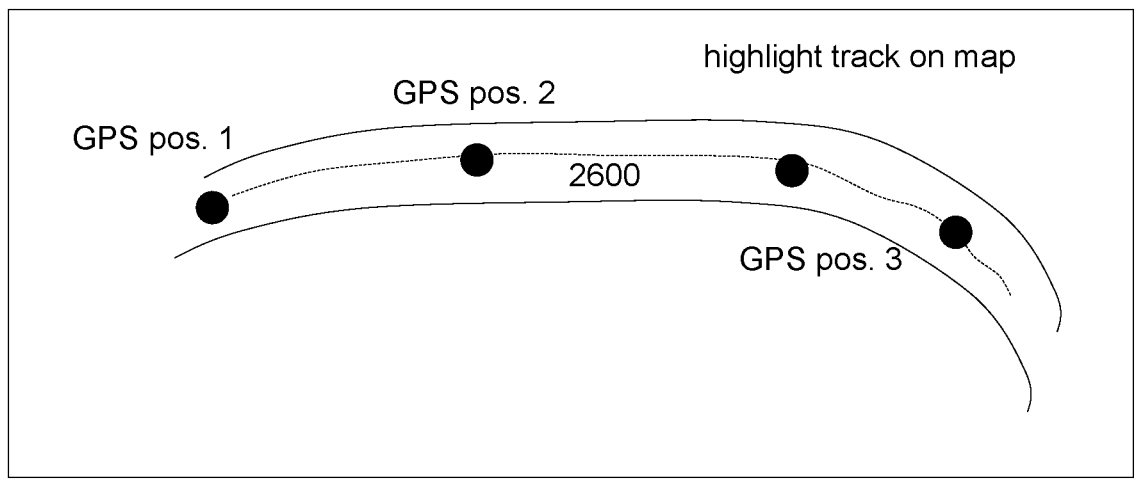
Figure 27:
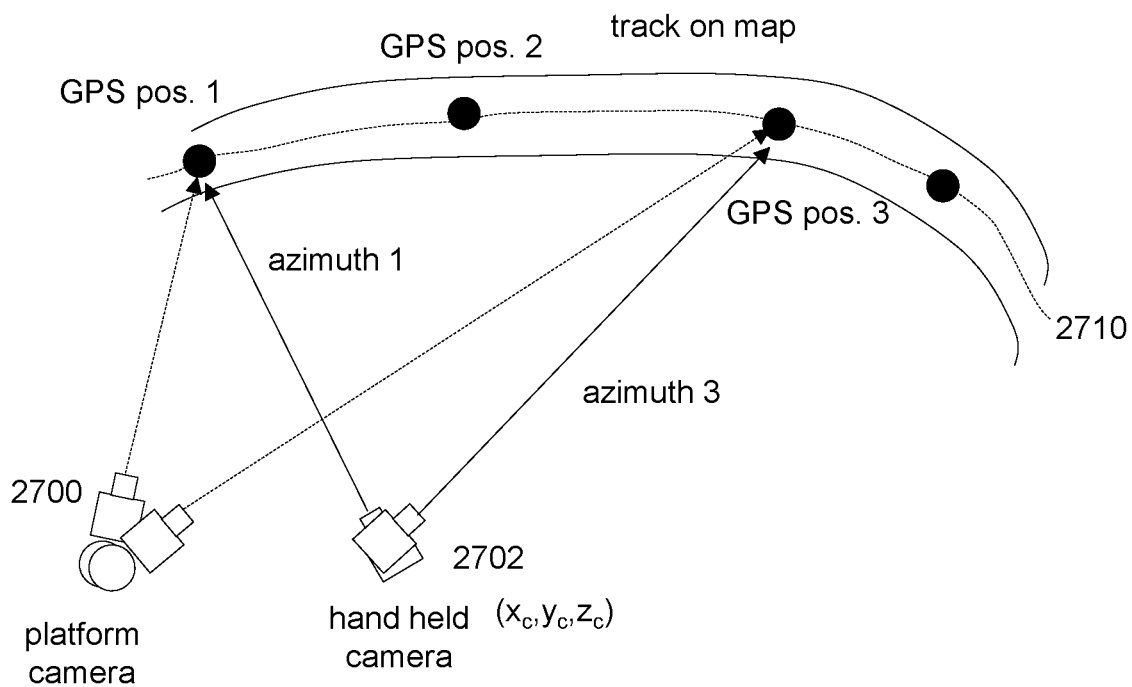

In one embodiment of the present invention a map is provided on a screen of a computing device and a track 2600 is highlighted which may be along a road or a path as illustrated in FIGS. 26 and 27. An actual road or path is not required as long as points on the track are identified and are provided with GPS coordinates. The track is either identified on the screen of the hand held camera or on another computer device and the track is loaded into a memory on the hand held camera.

The user of the hand held camera has the track 2600 in view from a position $(x_C, y_C, z_C)$ and an application is activated on the processor of the camera. For instance, the hand held camera 2702 is pointed at a point on the track. The processor of the camera uses the azimuth 1 of the camera 2702 and its GPS position $(x_C, y_C, z_C)$ to calculate the intersection of its viewing direction with track 2600. It determines the GPS coordinates of the intersection point which in this example is GPS pos. 1. The GPS coordinates of this position are associated with a viewing direction of platform based camera 2700 with its own known GPS coordinates and the related required azimuth of the camera 2700 which will activate the actuators of the platform to rotate and point camera 2700 to GPS pos. 1 of the track. In that case camera 2700 tracks camera 2702 potentially without having a moving object to track. Camera 2702 can be pointed to a point on the track with GPS coordinates GPS pos. 3 with an azimuth 3 angle forcing the platform camera 2700 to rotate also to this point. Camera 2700 may be a handheld camera, wherein signals including audio, visual, vibratory or touch signals direct the user to the correct direction.

While for coordinates the term GPS coordinates are used it is to be understood that any world coordinates related to a 3D location system can be used.

Figure 28:
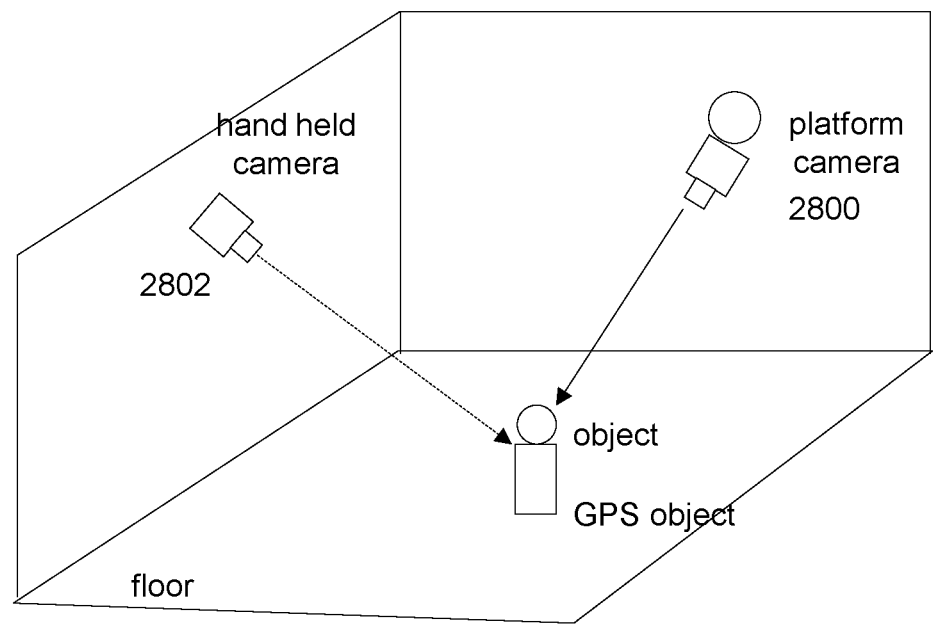

It is contemplated that the pre-programmed approach also works in a 3D space. For instance the hand held or user operated camera 2802 as illustrated in FIG. 28 is in a position above an open space where objects or people are moving. The space is calibrated so that all coordinates inside the space are known to both cameras or to a system connected to both cameras. The calibrated space includes at least a floor of the space and a predetermined space above the floor, for instance a space up to 9 feet above the floor. An operator which operates the hand held or operator operated camera 2802 at an object in a location "GPS object." The orientation or pose and the location of camera 2802 determine the intersection of the viewing ray and the floor of the space and thus the "GPS object" coordinates of the object. This allows a platform camera 2800 to be directed by actuator into the correct direction to have a viewing ray also intersect with "GPS object." This allows having a camera 2802 to track a moving object on a floor in a space and have one or more cameras 2800 with a different pose than 2802 also track the object by following directions of 2802.

The roles of the platform camera and the hand held camera may be reversed. A platform camera is tracking an object and a processor alerts a human operated camera to track the same object or person. The platform based camera provides the geo-spatial coordinates of the object to the other camera. The other camera knows its own coordinates and with the received object coordinates can calculate the desired pose of the camera to locate the object. Indicators as illustrated in FIG. 6 guides the user to place the user operated camera in the correct pose to direct it to the object.

In one embodiment of the present invention the object is provided with a position locator like a GPS device. The position of the GPS device is transmitted to the hand held camera allowing a user to direct the hand held camera to be directed in the correct pose to the object with the GPS device. The handheld camera provides the GPS coordinates to the platform camera, instructing the platform camera to point at the object.

The calculations may be performed by a processor on the handheld camera and the processor provides actuator instructions to the platform camera. Desired coordinates are provided to the platform camera, allowing a processor on the platform camera to calculate the desired pose and to generate instructions to its actuator to point the camera in the platform towards the object.

An object inside an area in the 2D image space of the handheld camera is marked, for instance with an oval to identify at least part of the object. The processor segments the identified part of the object from the background or extracts features from the object such as edges or corners or performs any other of known image processing steps, including determining a histogram of pixel intensities and the like. The processor then marks the center of the object with a blob that may be semi transparent. A user can thus track the object by making sure the blob stays inside the window on the screen by appropriately changing the pose of the handheld camera. A user may place a blob over the object, forcing the processor to track the object.

Figure 29:
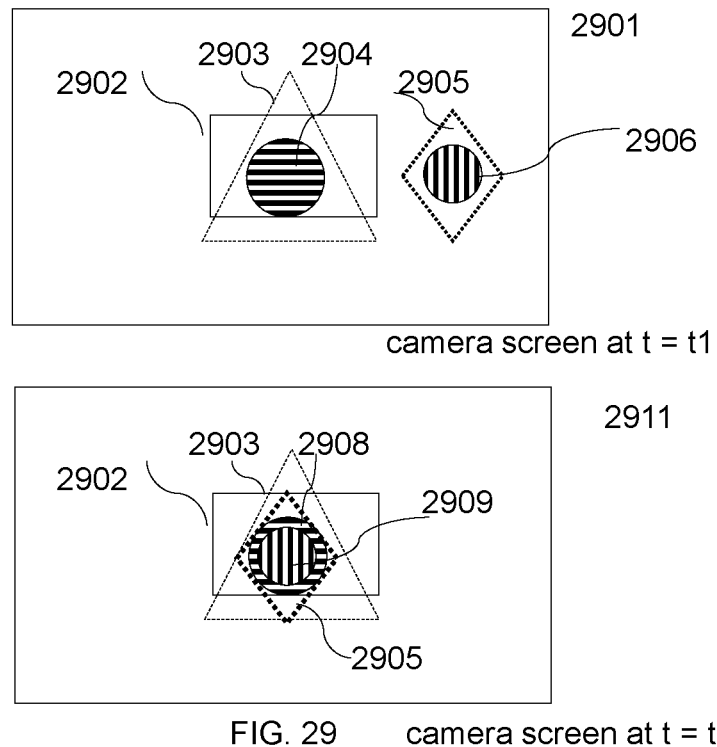
FIGS. 29 and 30 illustrate camera screens in accordance with an aspect of the present invention.

The advantage of using blobs is that it is not required that the two cameras "see" the same side of a part of an object. Two cameras may even face each other in a pose with the object between them. This is illustrated in FIG. 29. It illustrates a screen 2901 on a camera or related to the camera that manually tracks an object and keeps an image 2903 of the object inside a window 2902. The processor of the camera calculates a blob 2904 of the image 2903, for instance a circle blob with a defined radius that falls inside the window 2902 and a center of the blob that coincides with the center of gravity of the image 2903. The image 2903 in one embodiment of the present invention is the shape that tracks the object, such as the earlier mentioned ellipse. The calculation of the blob provides an indication to the user to place the camera in a pose as to keep the blob inside the window 2902. Screen 2901 is illustrated at time t=t1.

The screen 2901 also displays an image 2905 of the object taken by the second camera on a platform with actuators controlled by signals that originate or are initiated by actions from the processor in the first camera. Images may be displayed as opaque or as transparent. A processor, which may be the processor of the first camera but also the processor on the second camera, calculates a blob 2906 with a size that allows it to fit inside window 2902. In the diagram of FIG. 29, image 2903 and image 2905 are shown as different shapes. That is because the first and second cameras in general observe the object in a different pose creating different projections of the object in 3D space on the 2D space of the respective cameras.

Screen 2911 is the screen of the manually tracking camera shown as 2901 at a later moment t=t2. The screen has the same window 2902. It shows also images 2903 of the object recorded by the first camera and image 2905 taken by the second camera. The user has kept image 2903 inside the window and new blobs 2908 and 2909 have been calculated. A processor for instance on the first or the second camera compares the positions of the blobs in a common 2D space. A common 2D space is the screen space of the first camera, wherein the screen space of the second camera has been calibrated against the screen space of the first camera. That means that the screen space or the calibrated 2D projective space of the second camera is similar or identical to the 2D projective space of the first camera. One consequence is that when an object is centered in 2D space of the second camera it is also centered in 2D space of the first camera. That means that minimizing the distance between the blobs of the object in the 2D space of the first camera means that both cameras are in a pose towards the object.

Because the pose of both cameras may have changed during tracking the blobs may have become different at time t=t2 which is indicated by the changed numerals of the blobs.

In a further embodiment of the present invention the first camera which was called the handheld camera is also provided on a platform with actuators. A user points the first camera through actuators at the object and marks the object for tracking by the first camera. The processor in the first camera or related to the first camera then takes over and tracks the object, for instance by creating a blob and keeping the blob inside the window or inside a predefined area in the 2D projective space of the first camera. The processor then tracks the object with the first camera and collaborates with the second camera as described above.

Figure 30:
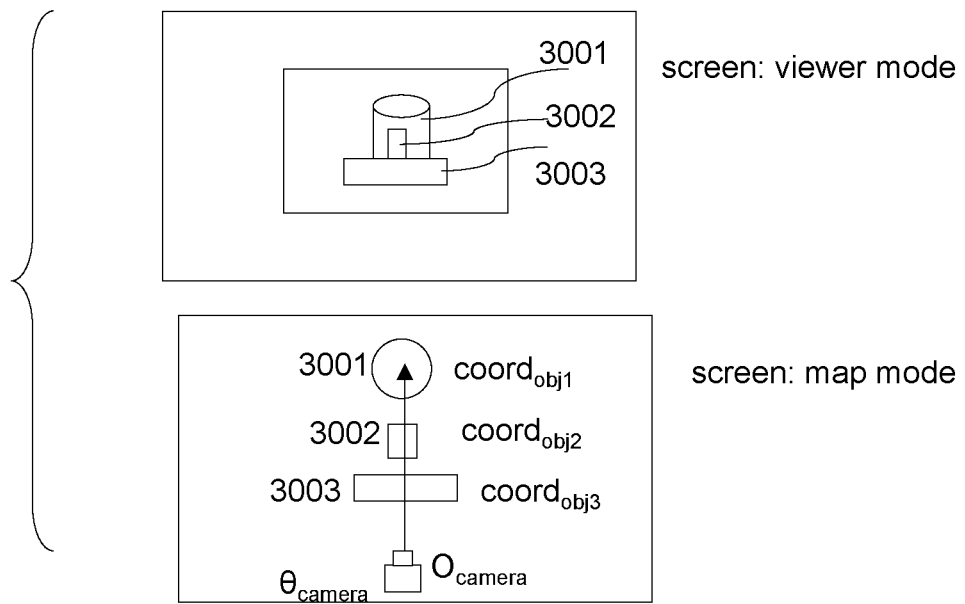

In one embodiment of the present invention the camera has access to a map of its environment, either through a network or by having a geo-map stored in its memory. In one embodiment of the present invention the screen of the camera is placed in one of two modes a camera viewer mode, showing in real-time what the camera is recording and in a map mode, showing a map of the environment based on the location of the camera (determined by GPS geo-spatial coordinates) and the pose, including the compass direction of the camera. In one embodiment of the present invention both the viewer and map screen are displayed on the screen display concurrently, either next to each other as illustrated in FIG. 30 or overlaying each other wherein at least one mode is transparent. A user can also switch between the two modes.

In the viewer mode the screen displays in an illustrative example three objects 3001, 3002 and 3003 that are viewed in one line. The map mode shows on a map where the objects are located as each object is associated with a set of geo-spatial coordinates, respectively by: $coord_{obj1}$, $coord_{obj2}$, and $coord_{obj3}$. The coordinates $O_{camera}$ and the pointing direction or compass orientation $\theta_{camera}$ of the camera is also known. A user can see on the map what the orientation of the camera relative to the objects is.

Each time the location of the object is determined a new sweeping radius is determined and provided to the second camera and a new iterative cycle to align the images of the object inside the window or 2D image space of the first camera allowing the second camera to track the object as it is being tracked by the first camera.

Pose determination using sensors such as GPS sensors, digital compass, accelerometers and gyroscopes are aspect of the present invention. In the absence of these sensors or in addition to these sensors a difference in pose between two cameras is determined by applying known image processing methods.

In one embodiment of the present invention each camera draws a box, an ellipse or any other closed contour around the object as is currently known in cameras. A user may place the contour around the object or part of the object to instruct the processor of the camera to track that part or object.

An orientation of a camera has been established. A relative orientation of the cameras can be established by determining the relative position or angle between the cameras by analyzing edges or lines by applying projective geometry as is known to one of ordinary skill. Edges do not need to be straight lines. However, one can also extract corners of an object and calculate a line through corners. Furthermore, line estimating techniques like the Hough transform can also be applied. The processor can be initialized for a known maximum angle between the two cameras. The azimuth is known of camera by the digital compass. Using a previous setting, this allows an actuator to follow the movement of another camera by minimizing an error angle between the two cameras that is calculated based on the information as explained earlier above.

In accordance with an aspect of the present invention the platform as disclosed earlier with a housing contains a digital compass to provide data to a processor in a camera with also a digital compass.

Accordingly, methods and systems have been provided that allow a movable platform with an actuator and a holder holding a first camera to track an object and record an image of the object based on a second camera located on a different spot than the first camera that tracks the object. The first camera in fact tracks the second camera.

In one embodiment of the present invention a path is read from a digital map or recorded, for instance by a GPS device that follows the path. A device that is enabled to determine GPS coordinates (including an elevation) is taken to a location. The GPS coordinates are recorded on a storage device, which may be part of a camera as provided herein. The recorded coordinates may be used to create a map. For instance, GPS positions as illustrated in FIG. 27 were first recorded with a device such as a camera and then applied to create a map. A map in this context is a line, which may be a curved line, a straight line or a jagged line of GPS positions or a contour of positions. The line or contour in one embodiment of the present invention is created by interpolation of a finite number of recorded GPS locations. For instance the line 2710 can be created by interpolating and extrapolating recorded GPS positions.

Figure 31:
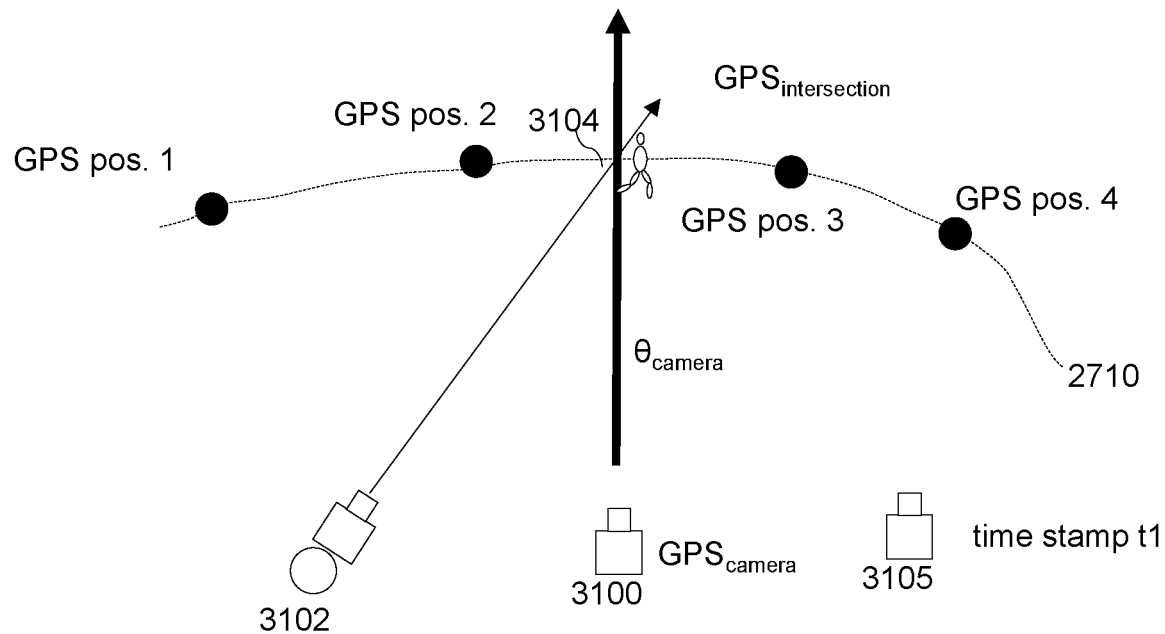
FIG. 31 illustrates a tracking scene in accordance with an aspect of the present invention.

The line 2710 with its related GPS positions or at least the intermediate positions that allow to calculate the line 2710 are stored in a memory, for instance on a server on a network or on a camera. The path 2710 may be a path at which a moving object or person is expected to be present or move. Such a path may be for instance a road over which runners are expected or a path going up on a podium, past a receiving line and down from a podium. This allows an object or person to be tracked along the path by a camera and a second camera without requiring the object or person carrying a GPS device. This is illustrated in FIG. 31. The path is available either on a server or on a camera 3100 or even a second camera 3102. The position of camera 3100 is known as $GPS_{camera}$ and has a compass orientation $\theta_{camera}$. A processor can determine the GPS coordinates of the viewing direction from 3100 towards line 2710 as intersection point 3104. This allows the camera 3102 to be directed towards 3104. For instance camera 3100 is directed towards 3104 when a known person or object is at position 3104 at time stamp t1.

Figure 32:
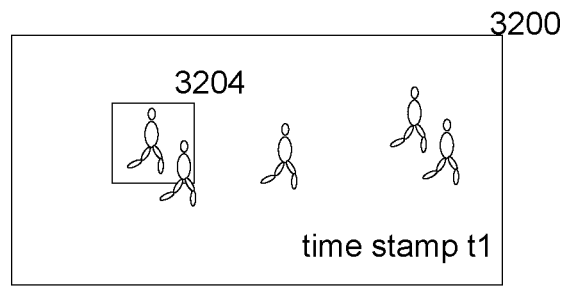
FIG. 32 illustrates an image frame in accordance with an aspect of the present invention.

In a further embodiment of the present invention a calibrated camera 3105 which may be a static camera is recording the path. All images are provided with timestamps that are preferably synchronized. All images recorded by the calibrated camera allows for determining and marking 3D locations in the real world as 2D markings in the image space of the recorded image. One can thus mark with a square in the image recorded by 3105 a 3D location such as point 3104. This is illustrated in FIG. 32 which shows a video frame 3200 of an image recorded by calibrated camera 3105.

The video images recorded by 3105 are recorded and stored on a server that is accessible for instance via the Internet. By providing the server the timestamp t1 and the coordinates 3104 or equivalent data the frame 3200 can be retrieved by the server and a box 3204 can be superimposed by the server to mark the location 3104 at time "time stamp t1."

In a further embodiment of the present invention the image of object or person inside box 3204 is marked and is tracked inside the viewing angle of camera 3105 by the processor for the duration that the object is inside the viewing angle of camera 3105.

Figure 33:
FIGS. 33-34 illustrate tracking aspects in accordance with various aspects of the present invention.

In one embodiment of the present invention a camera records with an image the GPS coordinates $GPS_{camera}$ (which include an elevation or height of the camera) and its azimuth or compass orientation. With the current high accuracy location capabilities, it allows the user of any camera with the same capabilities to assume the camera pose towards an object at a different time. This is illustrated in FIG. 33. The object has GPS or location coordinates $GPS_{object}$. In one embodiment of the present invention the object coordinates are acquired, for instance from a map, from another source that publishes coordinates of an object, or by determining the coordinates of the object by taking a picture of the object with the camera from two different locations by standard triangulation. For instance by moving the camera so that a rotation of preferably 5 degrees relative to the object is realized or more preferably at least 15 degrees or even more preferably of at least 20 degrees, and recording the new camera coordinates and azimuth allows a processor for instance on the camera or on a server to calculate the coordinates of an object. In one embodiment an owner or manager of an object or a person publishes its geospatial coordinates via a server through a network to a camera. Applying methods described above, the camera on a screen can provide a user with instructions to direct the camera to the correct coordinates of the objects. If the camera is a platform camera with actuators, a processor activates the actuators to direct the camera.

Figure 34:
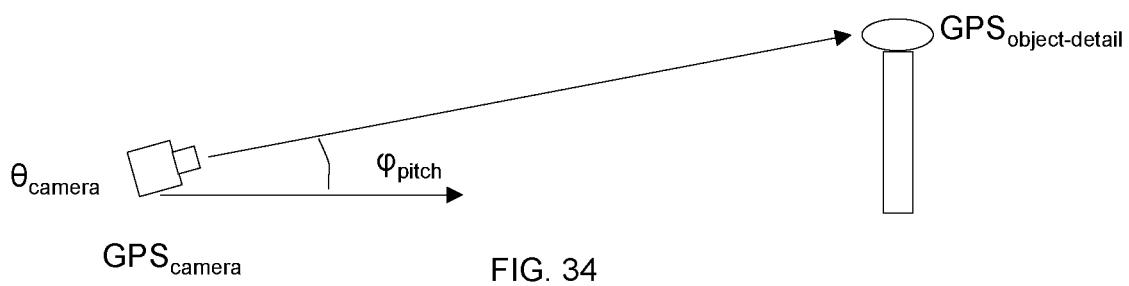

For simplicity, the term GPS or geospatial coordinates is used herein. It is noted that cameras are often rotated in one additional plane to be directed to a detail of a large object as part of a camera pose. This plane may be called the pitch plane and the pitch pose is relative to a gravitational center of the earth or to the horizon. The angle is indicated as $\varphi_{pitch}$ and can be detected with accelerometers or gyroscopes on the camera as explained earlier. FIG. 34 illustrates a situation wherein a detail of an object (a top) is determined by its geospatial coordinates $GPS_{object-detail}$. A camera at $GPS_{camera}$ has to be directed with azimuth $\theta_{camera}$ and pitch $\varphi_{pitch}$ to be directed at the object detail.

Figure 35:
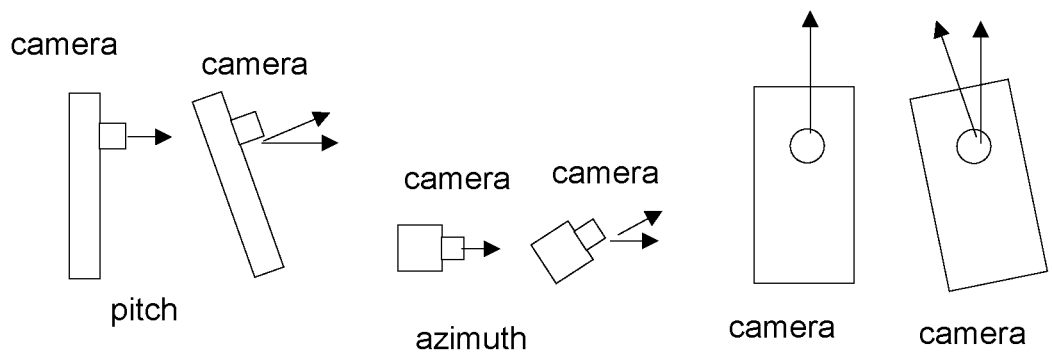
FIG. 35 illustrate camera rotation planes in accordance with various aspects of the present invention.

Next to the pitch and azimuth the camera may also have a roll angle as illustrated in FIG. 35. One would in general prefer to take pictures with a camera that is aligned with the horizon. If not aligned with the horizon it is assumed that two cameras are at least aligned with their roll angle. This can easily be achieved by drawing a horizontal and/or vertical alignment line on the screen allowing users to align their cameras.

The term signal is used herein. Signals are processed by circuitry and represent data in digital systems. In most cases the term signal or signals can be replaced by the term data which is processed by a processor.

Figure 36:
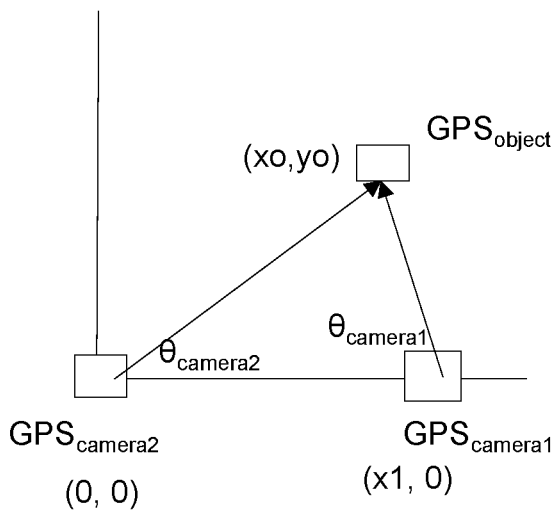
FIGS. 36-37 illustrate calculation of intersection coordinates in accordance with various aspects of the present invention.

FIG. 36 illustrates for the 2D case how to calculate the coordinates of an object (xo, yo) when the coordinates and the orientation of two cameras directed towards that object are known. The origin of the coordinates is placed in one of the cameras and the coordinates are rotated so that the second camera is now located on the x-axis. Such coordinate transformation is well known. When angles are known the tangent of these angles are also known. Because the coordinates of the cameras are known the distance between the cameras and thus x1 is known. from that it is easy to determine the coordinates (xo,yo) which in the rotated system will be:

xo=x1*(d1/(d1+d2)) and yo=x1*(d1*d2/(d1+d2)) with d1 and d2 the tangent of the angles as illustrated in FIG. 36. It is easy for one of ordinary skill to expand this to the 3D case and to program this calculation on a program for a processor. Additional factors such as elevation and potentially lens distortions are also taken into consideration.

Figure 37:
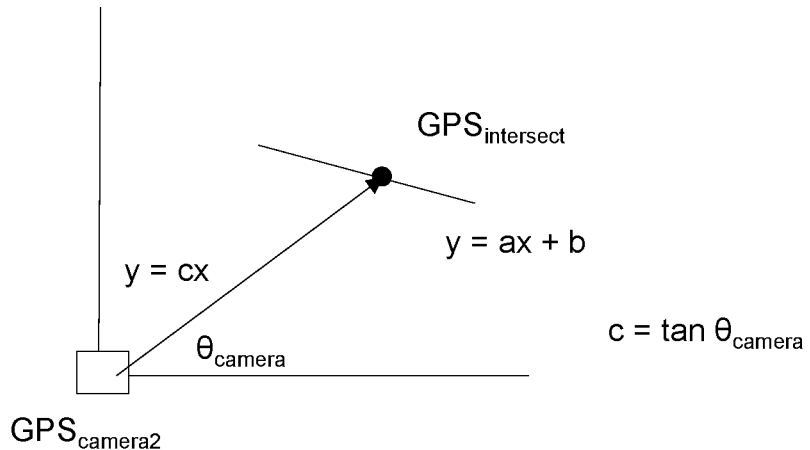

FIG. 37 illustrates the calculation of an intersection point when the geospatial coordinates of the camera and an orientation are known as well as a line or contour from which an intersection point is to be calculated. In this simple 2D example the intersection point (with origin in the camera) is x0=(b/(c−a)) and yo=ab/(c−a), which can be modified for the 3D case and programmed on a processor.

Figure 38:
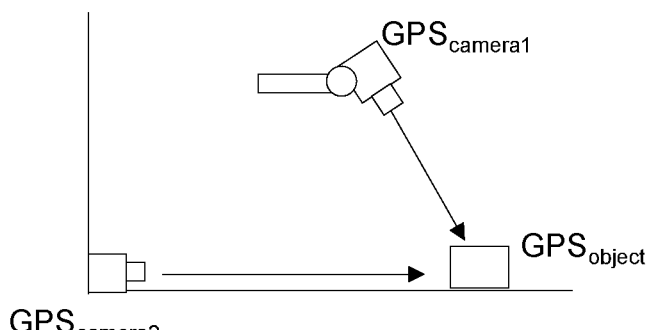
FIG. 38 illustrates tracking of an object with an aircraft in accordance with various aspects of the present invention.

In one embodiment of the present invention the platform camera is attached to a moving structure as illustrated in FIG. 38. For instance the structure is an aircraft on a significantly different elevation than the first camera. This requires to have a GPS device and other devices that determine the geospatial coordinates of the aircraft. An aircraft does not have to rely only on GPS data, but also has other instruments that allow a quick and accurate determination of its position relative to earth or to a beacon.

Determining geospatial coordinates from other acquired coordinates for instance in geographic information systems (GIS systems) is known and is for instance disclosed in U.S. Pat. No. 8,428,341 to Seongho Lee on Apr. 23, 2013, U.S. Pat. No. 5,633,946 to Lachinski on May 27, 1997, U.S. Pat. No. 8,265,871 to Starns on Sep. 11, 2012 and US Patent Application Publication Ser. No. 2012/0314068 to Schultz on Dec. 13, 2012 which are all incorporated herein by reference.

The object in accordance with an aspect of the present invention is a static object. In accordance with an aspect of the present invention the object has a speed that is less than 1 m/sec, more preferably the speed is at least 0.5 meter/sec., even more preferably the object speed is at least 1 meter/sec., even more preferably the object speed is at least 5 meter/sec. and even more preferably the object speed is at least 10 meter/sec.

In accordance with an aspect of the present invention at least one camera is rotated with an angular speed of less than 1 degree/sec. In accordance with an aspect of the present invention at least one camera is rotated with an angular speed of more than 1 degree/sec; in accordance with an aspect of the present invention with at least an angular speed of less than 30 degrees/min; in accordance with an aspect of the present invention with an angular speed of more than 30 degrees/min.

The terms real-time and substantially real-time are used herein. Real-time display of an image means at the same time or substantially the same time that an image is recorded and is made available by a sensor of the camera.

In one embodiment of the present invention the hand held camera is a calibrated stereo camera which is enabled to determine a distance to an object. Such cameras are known and are for instance disclosed in US Patent Application Publication Ser. No. 20120327189 to Muramatsu on Dec. 27, 20102 and U.S. Pat. No. 8,355,627 to Pace et al. on Jan. 15, 2013 which are both incorporated herein by reference. Such stereo cameras, also provided with GPS coordinate determining devices and digital compass and pose determining devices make it easier to determine the geospatial coordinates of an object in view of the stereo camera.

A camera in one embodiment is a smart phone such as an Apple® iPhone® or a tablet such as an Apple® iPAD®. A platform camera in one embodiment of the present invention is a distributed system wherein camera, controllers, platform housing, processor, communication systems, actuators and other relevant devices are part of the platform or of the camera and in some cases both.

In one embodiment of the present invention, a camera is attached to or integrated into a wearable computer in a head frame. Such head frames are known and are for instance disclosed by Google® as Google GLASS and as Google GLASS Explorer Edition and are disclosed on <www.google.com/glass/start>.

Figure 39:
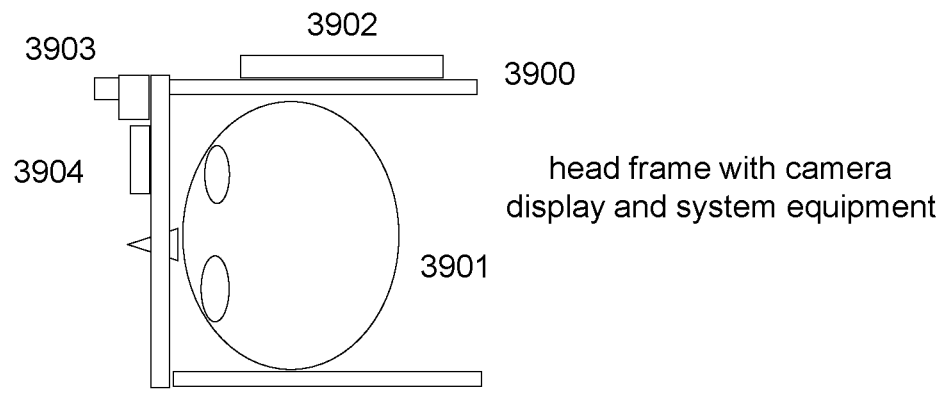
FIG. 39 illustrates in diagram a headframe based camera system.

A diagram of a similar headframe 3900 for performing steps of object tracking provided herein in accordance with one or more steps of the present invention is provided in FIG. 39. The headframe 3900 can be worn by a user 3901 as a set of glasses. The headframe includes a camera 3903 which in one embodiment of the present invention is forward looking, but can be directed in any viable direction, a display 3904 for the user 3901 and system equipment 3902. Equipment 3902 includes a processor, memory, communication equipment, an antenna, pose determining devices like digital compass, accelerometers and/or gyroscopes and GPS or high accuracy geospatial coordinates determining equipment and a power source. The frame forms an integrated system that is enabled to perform instructions and to send and receive data to and from a network like the Internet, WiFi networks or a cellular phone network or a small network like a Bluetooth network for instance in a wireless or wired manner. Data entry devices such as a microphone, a touch pad and a remote controller are also provided.

In one embodiment of the present invention the headframe is provided with a second camera 4001 and a second display 4002.

Figure 40:
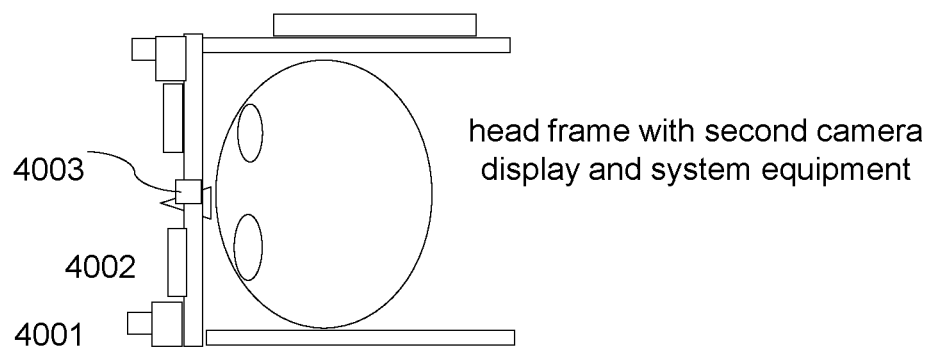
FIGS. 40 and 41 illustrate in diagram a headframe based camera system in accordance with one or more aspects of the present invention.

In one embodiment of the present invention a camera, either a hand held camera or a headframe camera, or the headframe holding a camera is provided with a ranging device 4003 to determine a distance to an object as illustrated in FIG. 40.

Figure 41:
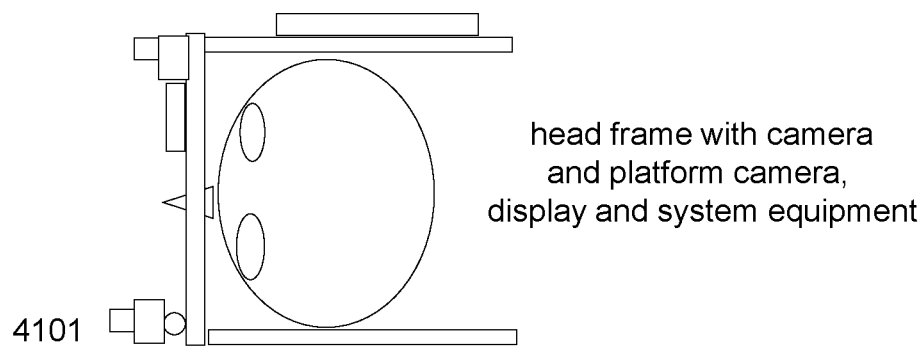

In one embodiment of the present invention a camera in the headframe is a platform camera 4101 that can be actuated to be moved relative to the headframe as illustrated in FIG. 41.

Accordingly, a first user wearing the headframe has the geospatial coordinates and the pose of the headframe and camera determined. In one step of the present invention the pose of the camera and the pose of the headframe are calibrated. A distance to the object may be determined with the device 4003 which determines the geospatial coordinates of the object or person that is being tracked. A second camera is a different pose than the headframe camera may also be directed on the object in such a way that the object image created by the first camera and by the second camera displayed on display 3904 overlap inside a window, allowing the geospatial coordinates of the object to be determined. When the object moves it will be tracked by the headframe camera and in accordance with methods describes earlier above, the object is also being tracked by the second camera.

In some cases it may be required for the user of the headframe camera to direct the second camera to the object. In accordance with various aspects of the present invention this can be done in several ways. It can be done by voice by touchpad or by eye-winks or eye-movements detected by a third camera (not shown) in the headframe focused on an eye of the user. Or directions are provided by head movements of the user that may be quick head movements in the direction wherein the second camera has to be moved. In one embodiment of the present invention a remote controller 4200 that may be wireless is used to provide instructions. For instance the controller 4200 has a central control 4202 that can be pushed or otherwise touched to provide directions which are transmitted via a wireless transmitter 4201 in collaboration with the headframe system. One part of the control 4202 has a tactile detectable different form from the other parts (for instance a bottom part). This allows a user to find the correct orientation of the control without having to look at the control.

The control 4200 in one embodiment has a control button that suspends the active tracking of the object when activated and stores the last tracking data in a memory, for instance by pushing 4202 for a period of time or by activating a button 4205 or by any other means such as touch, a head movement or a sound or voice command, when the headframe includes a microphone. This allows the user to turn the head with the headframe or remove the headframe without confusing the tracking system. A restart command is provided to retrieve the last known position and indicators on the display will guide the user's head to the right pose and orientation. When restarting the tracking the camera in the headframe in one embodiment of the present invention gets up to date data from the second camera if that camera was successful in tracking the object.

Figure 43:
FIG. 43 illustrates a camera screen in accordance with one or more aspects of the present invention.

In one embodiment of the present invention the first camera loses track of the object because it disappears behind a barrier, another object, a part of a building, but at least another camera continues to track the object. According an object is tracked by a first and a second camera and the first camera loses track of the object, but the second camera continues to track the object. In that case the second camera continues to provide its image of the object to the first camera. In one embodiment of the present invention the second camera (in fact its processor) continues to determine the geospatial coordinates of the object and transfers these coordinates to the first camera. The first camera may determine that tracking has been lost, because for instance the known contour of the object have disappeared, or a user for instance using control 4200 provides a signal to the processor of the first camera that the object has been lost. In that case the processor of the first camera shows on its screen 4300 as illustrated in FIG. 43 which may be a screen in the head frame or a separate display or a screen on a hand held camera a shape 4301, either with or without a label which contains identifying data which may include time stamps and geospatial stamps, that identifies the object as tracked by the second camera. This then appears as shape 4301 on a moment t1 and as a shape 4302 on the screen as the object is moving behind the barrier and is still being tracked by the second camera.

The object shape of the hidden object may be represented as a special icon or an oval or rectangle or any appropriate indicator on the screen. Preferably some color and/or transparency or another property is provided to the shape indicating that it is hidden from direct sight. Preferably the size of the shape changes with the distance of the object relative to the first camera. The shape may also be the image of the object or person as recorded by a remote camera, and preferably adjusted for size.

It is noted that a barrier may be a physical object or objects like a wall, a fence or trees. However a barrier can also be people. The first camera may lose track of a person because he is hidden by a group of people, but is still being tracked by one or more other cameras. In that case the tracked person is made visible on the display of first camera as a shape that is being tracked. In a further embodiment the image of the barrier such as the group of people may be displayed in a transparent manner.

In one embodiment of the present invention the user of the first camera continues to track the shape of the object by keeping it inside a window on the screen. The diagram of FIG. 43 in one embodiment of the present invention is not preferred as the first camera remains focused on one point while the shape of the object moves over the screen.

In one embodiment of the present invention at least a third camera remote from the user camera and the second (remote) camera is also tracking the object or person. The at least third camera is positioned in such a manner that during a period of time of preferably at least 1 second, more preferably at least 5 seconds, even more preferably at least 10 seconds, even more preferably at least 30 seconds, and even more preferably at least 1 minute, at least two of the at least three cameras are tracking the object in real-time.

It is again pointed out that the term camera herein is a digital camera, with at least one lens, an image sensor, memory, a processor, a screen or display and communication equipment. Additional equipment associated with the camera are pose determining devices such as a compass, an accelerometer, a gyroscope and high accuracy GPS or spatial coordinate determining equipment. A camera may also include a loudspeaker and a microphone and a distance ranging device. All equipment may be part of a single body or housing or it may be part of several housings wherein the processor has access to all devices through internal networking. Furthermore, the processor of the camera is connected with an external network to exchange data with other devices, such as cameras over an external network or over a communication channel between the camera processor and the external device. Unless stated differently, a camera herein is a camera that includes and/or has use and access to all these devices.

A camera can be fixed or portable. A platform may have actuators that can be selectively activated by a processor, which is the own camera processor or by an external signal, in preferably at least one rotational plane or in preferably at least two rotational planes, or in preferably three rotational planes.

Figure 44:
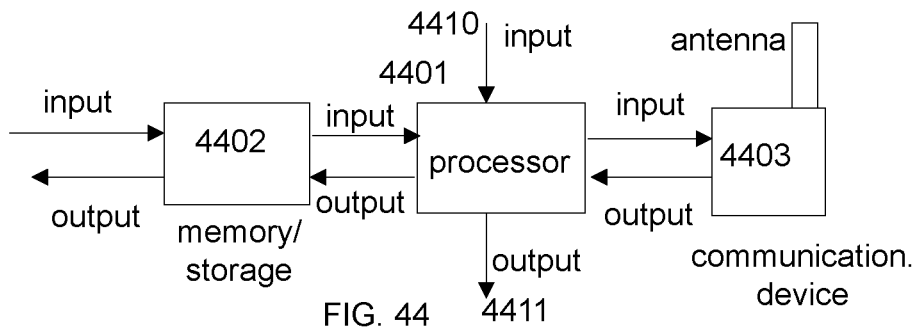
FIG. 44 illustrates a processor based system to perform steps and process signals in accordance with various aspects of the present invention.

The steps and processing of signals are performed by a processor 4401 as illustrated in FIG. 44. Instructions a data to the processor are provided via an input from a data storage or memory device 4402. Data generated by the processor is provided to the memory/storage 4402. Data can be locally read from the memory via an output. Data and instructions can be provided to the memory via an input. The processor can receive input signals on an input 4410 and can provide for instance control signals on an output 4411. Connection of the processor with a network or a wireless channel is provided by a wired/wireless communication device 4403 that transmits data from the processor as well as provides data to the processor 4401. Not shown but assumed is at least one camera in contact with the processor.

As explained herein above, it is beneficial if one can identify a location of an object or a person, for instance for tracking that person or object with a camera. It is also beneficial if one can remotely identify a person or object and/or to obtain information without touching the object or directly physically interacting with a person. For instance, in a large crowd it is often difficult to identify a location of a person, even if one can call that person on a mobile phone. In accordance with an aspect of the present invention a first person or object wears or carries a devices that accurately for instance within preferably a range of 1 meter, more preferably within a range of 50 cm and most preferably within a range of 10 cm determines geospatial or GPS coordinates of that device and thus of the person or object that wears or carries it.

Figure 45:
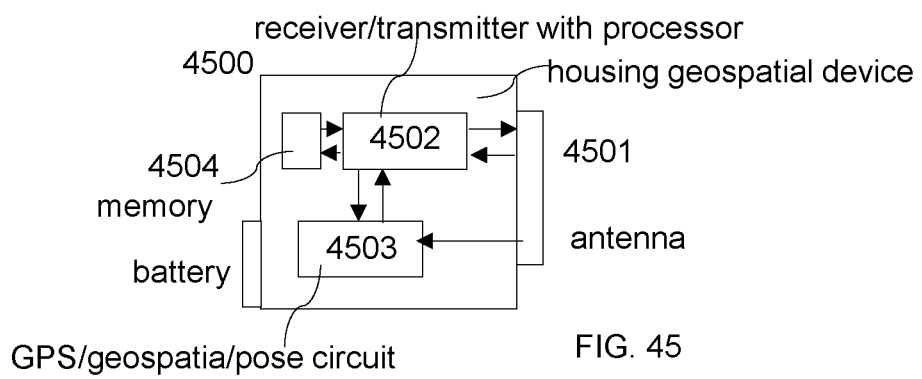
FIG. 45 illustrates in diagram a device to provide geospatial coordinates and pose coordinates in accordance with various aspects of the present invention.

In one embodiment of the present invention the geospatial coordinate device on an object or person is a stand-alone device as illustrated in FIG. 45. The device in one embodiment of the present invention has a housing 4500 with an antenna 4501 for receiving and transmitting and a battery for power. It has circuitry 4503, for instance including the earlier mentioned BCM4752 with Multi-Constellation acquisition with sub-meter accuracy and fast acquisition marketed by Broadcom® of Irvine, Calif. Circuit 4503 in one embodiment of the present invention also includes pose determining circuitry such as accelerometers, gyroscopes and a digital compass. A user may decide to allow 4502 sending the geospatial coordinates determined by 4503 to the outside world. A user may also instruct the device not to transmit that information or only selectively to pre-selected targets or in response to pre-authorized requesters which may be stored in the memory 4504. The device inside 4500 may be controlled wirelessly through another uniquely authorized device like a smart phone or the headframe system as disclosed herein.

In one embodiment of the present invention the geospatial coordinates are transmitted in combination with an identifying code which may be retrieved from memory 4504. In one embodiment the device of FIG. 45 transmits its position on a regular basis to a server in a network or a processor in direct connection server, which may selectively transmit it to another device in the network. In one embodiment of the present invention, the device in FIG. 45 transmits position data to a server or a device based on a request that may be vetted by the processor in 4502 to assure that the requester is authorized to receive the information.

In one embodiment of the present invention the device illustrated in FIG. 45 is a stand-alone device. In one embodiment of the present invention the device of FIG. 45 is part of or even integrated into a camera as disclosed herein, in a smart phone, in a computing tablet, in a RFID device, or in a headframe system as illustrated in FIGS. 39-41 or any other computing device, mobile or static that is enabled to perform the tasks of the device of FIG. 45.

Figure 46:
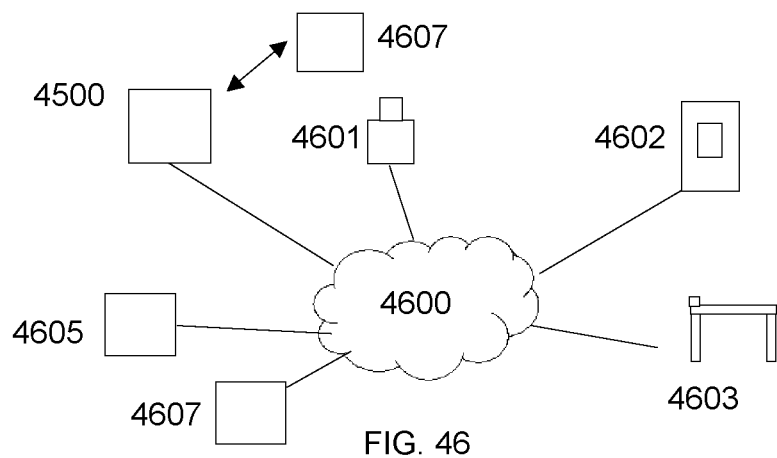
FIG. 46 illustrates a network.

A device as illustrated in FIG. 45 may be connected to a network 4600 as illustrated in FIG. 46, which may be a wireless network, an Internet, a switched network, a WiFi network, a local area network, a micro network, or any other network that allows the device to connect to another device preferably wirelessly. A device 4500 as illustrated in FIG. 45 may also connect directly wirelessly to another device, for instance to a mobile or static computing device 4607. Other devices that may be connected preferably wirelessly to a network 4600 are for instance a camera 4601, a smart phone, mobile phone or tablet computer 4602, a headframe device 4603 as described herein, any computing device 4605, and/or a server 4607. All of the devices on the network are enabled to receive and to send data. The server 4607 in particular is enabled to receive geospatial end identifying data from 4500 and transmit it to any of the other devices. A tablet computer is a mobile, portable and wireless computer device, usually with a touch screen and commonly larger than a smartphone. A well known example of a tablet computer is the iPad® marketed by Apple Inc. of Cupertino, Calif.

The memory 4504 in one embodiment of the present invention also holds additional data that can selectively be sent to requesters or the server. Such information can be a message, such as a text, audio or video message. It may also be a URL referring to a website with for instance a background or resume of the wearer of 4500, or relevant data related to a content or packaging if 4500 is attached to a box or a container.

Figure 47:
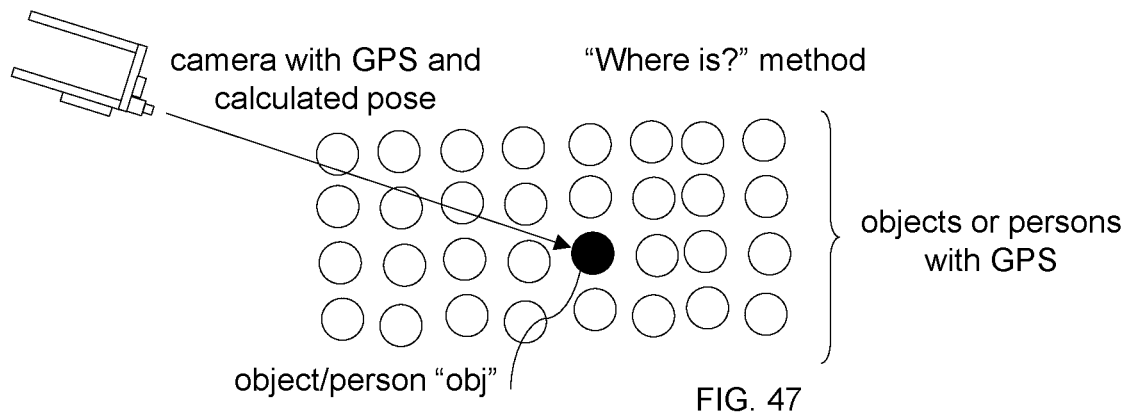
FIG. 47 illustrates a scene reviewed by a headframe camera in accordance with one or more aspects of the present invention.

FIG. 47 illustrates this "where are you?" method provided in accordance with one or more aspects of the present invention. A camera, for instance operated by a user, but it also may be a platform camera, itself or a connected computing device such as a smart phone puts out a request for the location of an object 'obj'. Such a request may for instance be transmitted over a network to a server. The server matches the name 'obj' with an ID of a corresponding device as provided in FIG. 47 and may send a request for geospatial coordinates to that device. In one embodiment the device automatically updates its position to the server. The server checks an authorization to provide that information to the requesting party.

In one embodiment of the present invention the "requester" is also a portable and mobile smart phone. In that case a user has to move the smart phone in accordance with instructions (such as directional arrows on the display) provided after calculations based on geospatial coordinates to put the smart phone of the "requester" in a correct pose which includes azimuth and inclination and the geospatial coordinates including an height or altitude to have the camera capture an image of the object.

If the requester is authorized one of several things can happen. In an embodiment of the present invention the server combines the geospatial coordinates of the requester and of the target object 'obj' to determine a camera pose that will direct the camera to the object 'obj.' The server may also transmit geospatial data to the camera or related processors allowing the processor with the camera to calculate the required pose.

In a further embodiment of the present invention, the current pose of the camera is known and the processor provides instructions how to change the pose of the camera to move toward the correct direction. It is repeated that a pose has a pitch angle and an azimuth and possibly a roll angle. Geospatial coordinates include an altitude or at least a relative altitude between target and camera.

FIG. 47 shows a group of objects or people (white circles) among which one object (identified by a dark circle) has to be identified. In this case the camera is above the objects or persons, for instance in a large audience of 100s or 1000s of people. Even if the target object is in some way marked (wearing a red hat) in general one would not be able from a distance of 25 m, 50 m or 100 m or more to identify the object.

In one embodiment of the present invention the housing of the headframe contains a plurality of vibratory devices, which may be micromotors, buzzers or the like. The vibratory devices are controlled devices that can be switched on and off at different times or can be operated at different vibratory frequencies. By activating the vibratory devices in a predetermined order a wearer experiences sensations via the skin that tells which way to turn the head and thus the headframe, which may be up or down and/or left or right.

Figure 48:
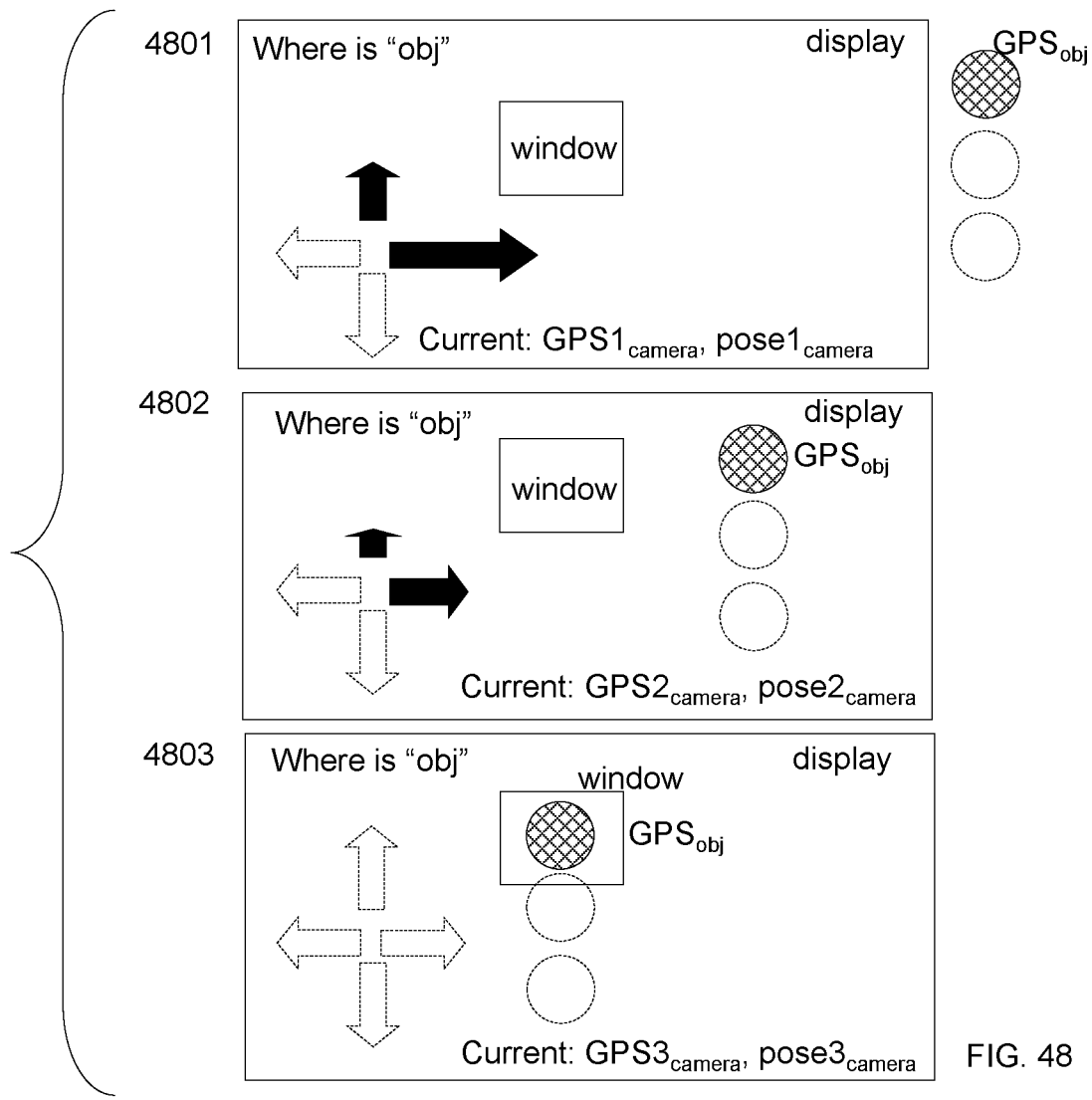
FIG. 48 illustrates consecutive screens on a display in accordance with one or more aspects of the present invention.

FIG. 48 illustrates the display of the camera as part of executing the "where are you" method. It is assumed that the camera has received instructions of the pose to be placed in to capture the object. In screen 4801, the object 'obj' is outside the screen space, which is preferably a calibrated screen space, of the camera. The object obj' is shown as the marked circle. The dashes circles are the surrounding objects to the object 'obj'. One purpose is to get the object inside the screen. Another purpose is to get the object inside a window on the screen. Indicators on the display, herein illustrated as dark arrows provide a user with a signal how to turn the camera in the correct pose. The size of the dark arrows indicates how much the camera has to be turned to the right and up to move the object 'obj' into the screen space.

Screen 4802 shows the display at a later moment, wherein the object 'obj' is now inside the screen space but not yet inside the window.

Screen 4803 shows the object 'obj' inside the window. If the object and the camera are static no further movement of the camera is required and the arrows turn blank or another indicator is provided that indicates that the object is located inside the window. Zoom can be applied to enlarge the image inside the window. Another alert may be triggered if the image of the object leaves the window.

However, the camera as well as the object may move, indicated by for instance the different coordinates of the camera at each screen. The camera may be a platform camera wherein the actuators are automatically activated to move the camera in a pose wherein the object 'obj' is captured inside the window.

Figure 49:
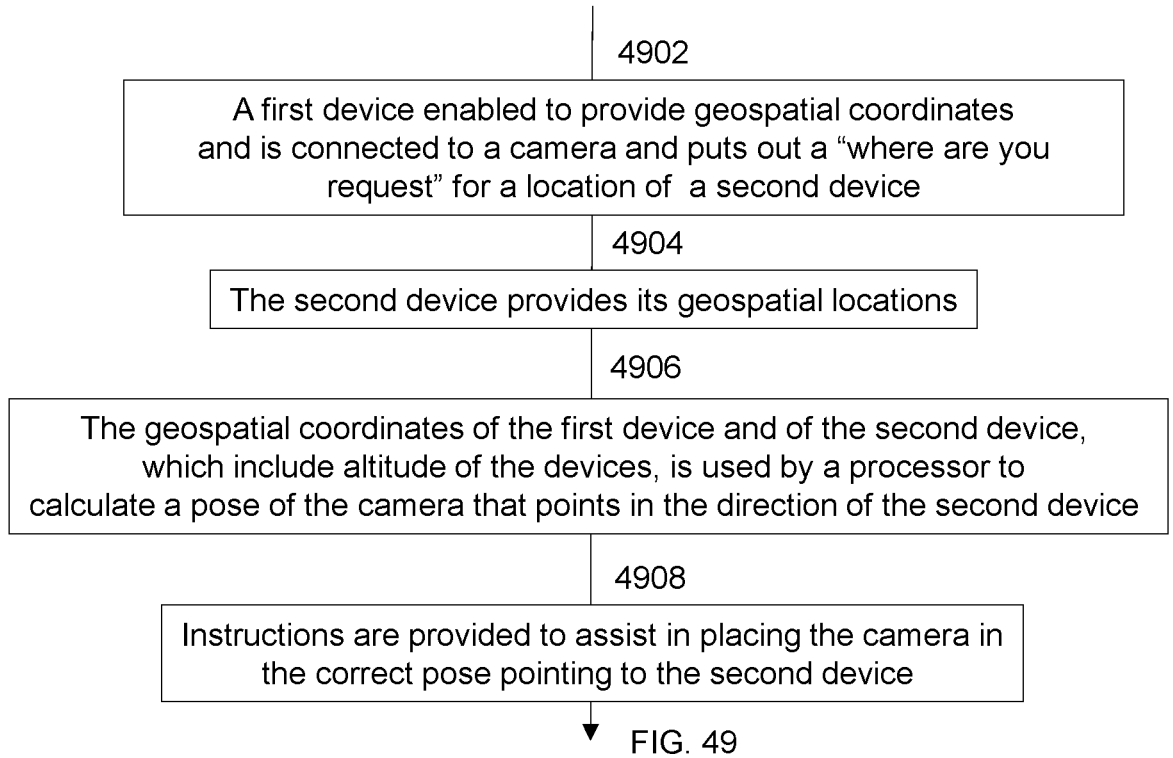
FIG. 49 illustrates steps performed in accordance with one or more aspects of the present invention.

The steps of the method are further illustrated in FIG. 49. In step 4902 a 'where are you request' is generated by a first device with a camera having its own geospatial coordinates and pose data. In step 4904 the second device provides its geospatial coordinates. In step 4906 the spatial coordinates of the first and second device are used by a processor, either in a server or with the camera, to calculate the pose of the camera to focus on the 'obj'. Instructions to reach that pose are also provided by a processor in step 4908.

In one embodiment of the present invention a smart phone or tablet computer has high precision GPS coordinates determination capabilities. In such an embodiment, a person can register on-line for being recorded and installs an authorized application on the device such as smart phone.

A person who is the recipient of a "where are you" request may have the circuit of FIG. 45 in a headframe or has equipment connected with the headframe. The person may want to know where the requester is located. In that case in a manner similar to the requester the target is informed of the pose (azimuth and elevation of the camera) to locate the requester and is guided as was described above.

The "requester" and the "object" both have communication devices to connect preferably wirelessly the respective computing devices, preferably via a network that can be wireless, wired or a mix or wired and wireless connections. However, the devices can also be connected via a direct connection either wirelessly or via a wired connection.

In one embodiment of the present invention communication between the "requester" and "object" includes a server that for instance performs authentication, storage and data retrieval and calculations of a required pose of the requester. In another embodiment of the present invention the computing device of the requester receives via a communication circuit the geospatial coordinates of the object and calculates a pose to get the object inside a viewing window of a display related to the camera of the "requester." In yet another embodiment of the present invention, the computing device on the "object" requires to receive via a communication circuit the geospatial coordinates of the "requester." The computing device of the "object" using also its own geospatial coordinates and the geospatial coordinates of the "requester" calculates the pose of the camera of the requester that would place the "object" within the field of vision of the camera of the "requester" and transmits this "pose" to the "requester." The computing device of the "object" (which may be a person), can deliberately provide some uncertainty, so that the pose determines a range rather than a precise location. The actual location of the object may be near a border or boundary of a window of a display at a provided pose and not at the center of a window. A server, not obligated to the "requester" may also calculate a pose for the "requester" without sharing a precise location of the "object."

Figure 50:
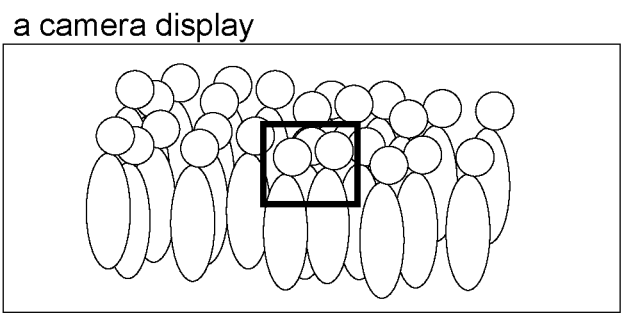
FIGS. 50, 51, 52 and 53 illustrate screens on a display in accordance with one or more aspects of the present invention.
Figure 51:
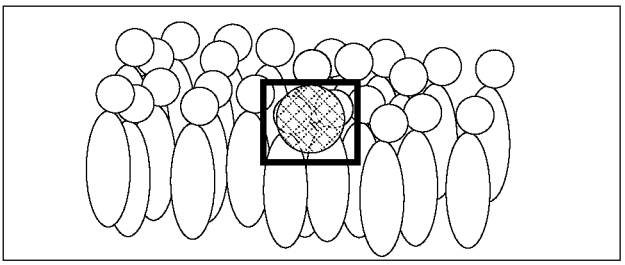

In the illustrated example in FIG. 48 a camera is located above the objects. This is not required. FIG. 50 illustrates in an image 5000 a situation wherein the camera is facing a group of objects or persons forming a barrier to the target object 'obj'. FIG. 51 illustrates one embodiment of the present invention in a screen 5100 following steps of the 'where are you' method and wherein the image of the group of people is made transparent and a mark indicates where the target object 'obj' is located.

Figure 52:
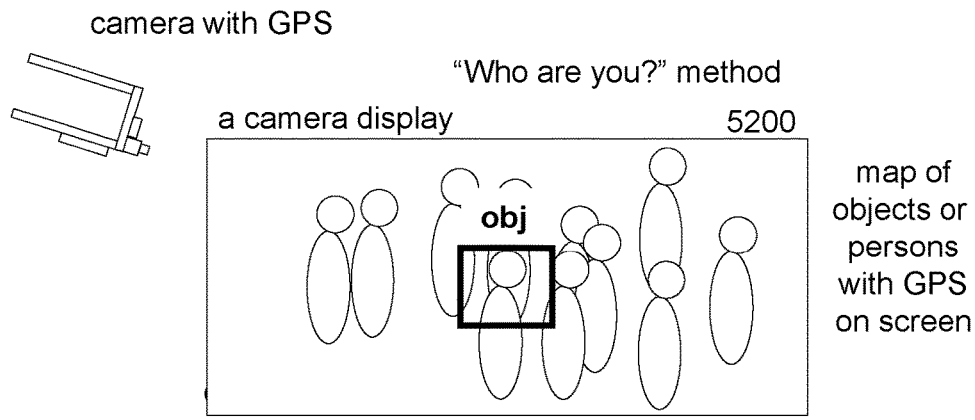

The "who are you?" method is to determine with a camera an identity of an object or a person. Under the "who are you?" method, a person or object carries a device as illustrated in FIG. 45 and provides a signal with its geospatial coordinates as well as a public or a secret name, for instance a series of numbers that is meaningless to unauthorized users. In a group of objects or persons, each is provided with a geospatial coordinates generating device that transmits the coordinates and an identifier to a server. The server creates a map which is transmitted to participating cameras which modifies the map relative to the position of the camera on a display. A user directs the camera, which may be part of a headframe, towards the person or object. In one embodiment of the present invention the person or object is inside a window on a display 5200 as illustrated in FIG. 52. The display shows a text 'obj' which may be an actual name of the object or a codename.

Figure 53:
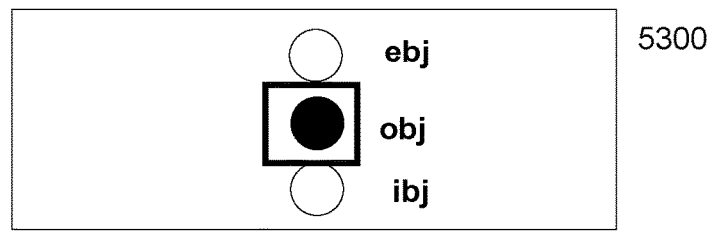

The requester may point the camera at a target which is shielded by other objects. In that case the requester can change the mode of the display from camera view to map view as illustrated in FIG. 53 as display 5300. The map shows three objects identified as ibj, obj and ebj on the map in the direction of view of the camera. Clearly the object obj is obscured by ibj and ebj is obscured by obj and ibj. The requester then moves the map or a window of the map, for instance by a separate control or head movement or voice with the headframe until the indication or icon of obj on the map is inside the window on the screen and this situation is confirmed. The processor can confirm that an object inside the window can be identified by changing a color or other property of the window or by highlighting the representation of the object. At that state the other steps of the 'who are you' request as described above are followed.

The objects may not be persons. In that case authorization of the requester is done based on a code that is associated with the request and that is for instance transmitted by the camera of the requester.

Yet another method that is provided with the cameras as provided herein is the "where am I" request. This request may apply omnidirectional images obtained with a camera of an environment at an earlier time. Such omnidirectional camera is known and is disclosed in for instance US Patent Application Publication 20010015751 to Geng on Aug. 23, 2001 which is incorporated herein by reference. Google operates such a camera for its Google Street View which is attached to a vehicle driving in an environment. The images are associated with geospatial coordinates, allowing a user to view a scene on a computer based on a location on a map.

In one embodiment of the present invention a person wears a headframe camera as described herein above and is located in an area. The wearer wants to know what the environment looked like from a current head pose at an earlier time. For instance, the current environment may be dark and a wearer wants to know where obstacles are. It may also be that landmarks have disappeared and a wearer needs to obtain orientation relative to such (now gone) or perhaps invisible landmarks. It may also be that one wants to see the environment under different conditions from a certain perspective.

The "where am I request" works as follows. A camera on a user has geospatial coordinates and a pose. Based on the request an omnidirectional image associated with the current geospatial location is selected and provided to the headframe or camera. Based on the pose of the camera the display shows only that part of the omnidirectional image that corresponds with the pose of the camera, especially the azimuth. The pose in one embodiment of the present invention also includes a pitch. Especially when the geospatial coordinates are determined on a cm scale accuracy or better, one can use the headframe camera to walk through a darkened or even pitch dark environment with obstacles or an environment with covered obstacles and still allow a wearer to avoid all obstacles, or find obstacles by providing previously taken images that show the obstacles.

In one embodiment of the present invention directional video can be used in the "where am I method." However, that requires that a user is oriented with a camera pose in the direction of the directional video.

In one embodiment of the present invention there may be an offset between the actual geospatial coordinates of the camera and the geospatial coordinates at which the omnidirectional or directional image was recorded. An appropriate 3D-2D transformation corrects the displayed image for the offset.

An omnidirectional image may be a full spherical field of vision in one embodiment of the present invention. In one embodiment of the present invention an omnidirectional image is 360 degrees in a horizontal plane but limited to a vertical field of vision not greater than 90 degrees. In one embodiment of the present invention the omnidirectional image is in one direction of movement with a horizontal field of vision that may be smaller than 360 degrees. A field of vision may be smaller than 180 degrees or smaller than 100 degrees and is no longer called omnidirectional.

In one embodiment of the present invention a user held or user worn camera, for instance in a headframe, is provided with a unique identifier that is transmitted to a server on a network as illustrated in FIG. 45. The headframe has a system part, a camera, a display and in accordance with an aspect of the present invention an identifier part 4501.

Several chips (in particular FPGA chips) are available that perform real-time distortion correction in video image. Those chips can be emulated on a processor or can be added as an add-on image processor in the head-frame. It is noted that aspects of the present invention do not require to correct distortion of an entire image taken by a wide-angle lens, but only a part that will be displayed. processing of a smaller number of pixels will generate results faster at a much higher image rate, ranging from 1-6, to 6-12, to higher than 12 images per second of corrected images that will be displayed on a display.

The Broadcom BCM4752 chip with Multi-Constellation acquisition, which was provided earlier above, is applied in one embodiment of the present invention to determine a location of a device based on GPS (Global Positioning System) signals. As stated earlier, the BCM4752 chip includes inertial sensors. Inertial sensors in this chip or in other available devices allow the determination of a position, including an altitude, starting from a known position. This is generally known as dead reckoning and is known to one of ordinary skill. Accordingly, positioning systems with chips like the BCM4752 with inertial navigation capability and with access to GPS data to create an anchor-point enable the determination of an accurate position, including an altitude not only when GPS data can be received by the system, but also when GPS data is weak or not directly available, such as inside structures that substantially screen-off GPS satellite signals.

There is an increasing interest in generating accurate indoor positioning and tracking data, especially as it relates to wireless devices such as cellphones, smartphones, tablets and the like in indoor positions. These indoor positions or locations may be outside a sufficient reach of GPS signals. A position of an object may be inside a private environment wherein a controlling authority wishes to control and manage location data and/or add specific and potentially proprietary data to a geo-location request. Several technologies exist that address indoor positioning, among them GPS or satellite signal derived systems, as described for instance in "Indoor GPS theory & implementation" by Rui Xu et al. in Sensors 2015, 15, 10074-10087; doi:10.3390/s150510074, and by pseudo-satellites as described in U.S. Pat. No. 8,791,857 to Mo et al. which are both incorporated herein by reference. Certain methods apply, what is known as, Assisted GPS or A-GPS, and may apply positioning data from cellphone towers or from local stations or base-stations and may apply high sensitivity receivers and digital signal processing techniques such as described in Indoor GPS Technology Frank van Diggelen and Charles Abraham Global Locate, Inc. Presented at CTIA Wireless-Agenda, Dallas, May 2001 which is incorporated herein by reference. IMES is an indoor messaging system that works seamlessly with satellite navigation systems and is described in "Indoor and Outdoor Seamless Positioning using Indoor Messaging System and GPS" by Naohiko Kohtake et al. in 2011 International Conference on Indoor Positioning and Indoor Navigation (IPIN), 21-23 Sep. 2011, Guimarães, Portugal, which is incorporated herein by reference. Other known indoor positioning technologies apply repeaters, beacons, or stations with known reference coordinates and are based on WiFi, Bluetooth, NFC, RFID, Ultra Wide Band (UWB), ultrasound, light or other technologies to calculate a position of a mobile wireless device. Wireless devices may include barometers or other altimeters to determine an altitude. Inertial navigation determination or dead reckoning by a device starting from a known position may also accurately determine a position of a device. An overview of existing indoor wireless positioning technology is provided in "A Survey of Indoor Positioning Systems for Wireless Personal Networks" by Yanying Gu et al. in IEEE COMMUNICATIONS SURVEYS & TUTORIALS, VOL. 11, NO. 1, FIRST QUARTER 2009, in "A Survey of Indoor Positioning and Object Locating Systems" by Hakan Koyuncu et al. in IJCSNS International Journal of Computer Science and Network Security, VOL. 10 No. 5, May 2010. Circuitry like the earlier provided Broadcom BCM4752 chip with Multi-Constellation acquisition works outside building and indoors environment as positioning device.

Many of the indoor positioning systems rely on GPS data as disclosed earlier above. In one embodiment of the present invention this includes a use a known GPS location, followed by a portable device calculating with the help of devices such as MEMS, gyroscopes, accelerometers and the like of an actual position as disclosed earlier above. In one embodiment of the present invention, certain indoor devices act as virtual GPS satellites or beacons and allow portable devices by additional signals related to these virtual satellites or beacons to determine their relative position related to a known device and their actual GPS position, if required, related to GPS coordinates. Positioning systems that determine actual GPS coordinates including an altitude of a device are called GPS positioning systems herein. To indicate that additional processing takes place related to known GPS coordinates, these positioning systems are also called GPS-based positioning systems herein.

In one embodiment of the present invention an owner/operator of a location or positioning system in a building or structure or campus does not provide positioning coordinates in relation to a GPS system, but only in relation to one or more landmarks of the structure, building or campus. Such a structure or building may be a shopping mall or a campus like a theme park, an amusement park, or a resort, or a university or a research institution or a government campus, or a sports complex, or a cruise ship with multiple decks and entertainment areas, or a hospital or a large warehouse with multiple aisles and stacked storage levels. A landmark point may be an entrance to a campus or a building, a dedicated monument, or a well positioned device relative to which coordinates, often GPS coordinates and including an altitude, are known. Dedicated monuments may act as relative origin for positioning coordinates, including an altitude. Those systems that do not rely on GPS data and do not use GPS data are called non-GPS positioning systems. Non-GPS positioning systems may be indoor as well as outdoor systems. The term GPS herein is used for a system that relies on signals from one or more positional satellites.

The use of positioning systems on positioning devices, including cell-phones, smart-phones, tablets and dedicated positioning devices, allows a smartphone or mobile wireless device with a camera to determine a pose of the camera from positioning data, including altitudes, provided by the target positioning device and the smartphone, that directs the camera at the target device.

For the definition of pitch herein one is again referred to earlier description above and to FIGS. 33, 34 and 35 which shows that the pitch of the camera is the angle of the lens in vertical direction and is also known as tilt or inclination.

Figure 54:
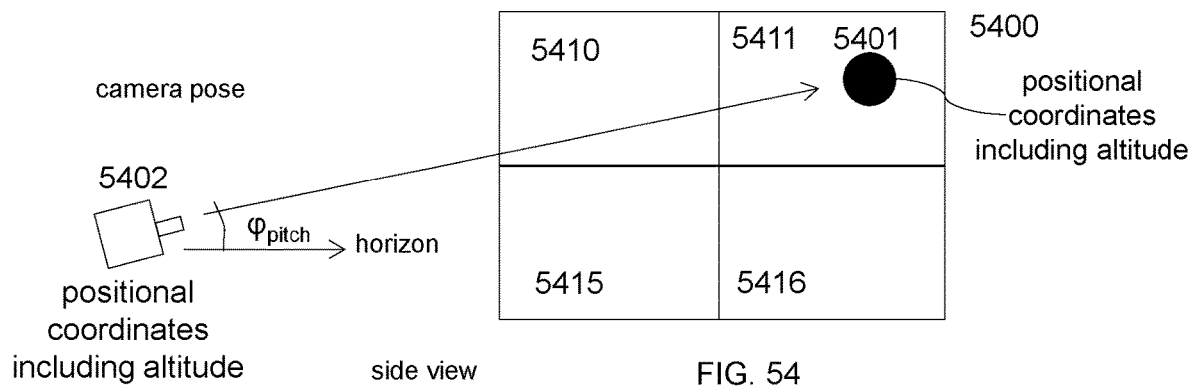
FIGS. 54, 55, 56 and 57 illustrate one or more scenes being reviewed with a device in accordance with various aspects of the present invention.
Figure 55:
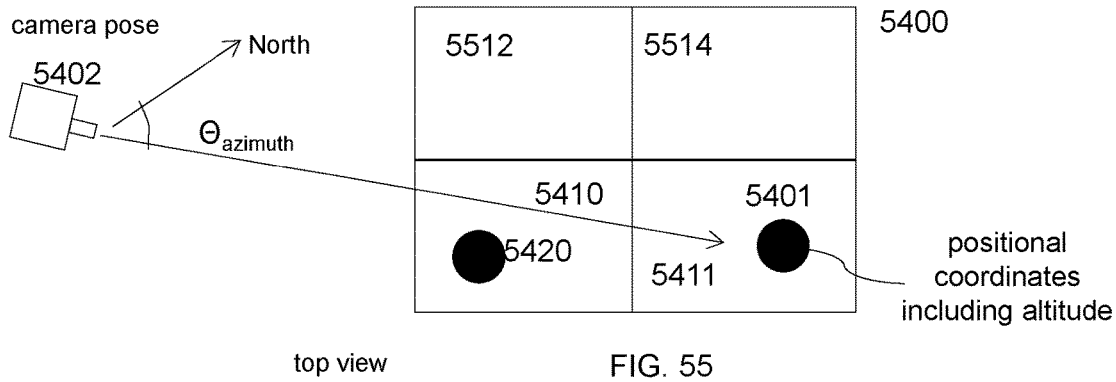

Visual instructions on a screen, such as arrows, as illustrated in FIG. 48, instruct a user to direct the camera to place an object in a field of view. Arrows on a screen with certain length, color or other emphasis indicate how a camera should be moved or rotated to place the object in for instance a center window. A situation wherein a camera 5402 is outside a walled structure 5400 with an object 5401 is illustrated in FIG. 54, which illustrates a side view. The object 5401 is not directly visible by camera 5402 because it is shielded by the structure 5400. Camera 5402 and object 5401 may be in the same horizontal plane, they may also be in different horizontal planes. The camera 5402 has a pose wherein it has to "look up" to point at 5401. FIG. 55 shows structure 5400 and camera 5402 in a top view. Device 5401, which is in walled environment 5411 is hidden from view of camera 5402 by partial structures 5410, 5512 and 5514. FIG. 55 also shows an azimuth angle of 5402 that determines a pose. The azimuth angle is defined as a compass angle, for instance for a digital compass, in relation to north. The camera 5402 is also in a pitch angle relative to a horizon, but this is not visible in FIG. 55 as it is a top view.

In accordance with an aspect of the present invention, the device that includes camera 5402 also is enabled to display a map of its environment relative to the position of 5402. The device can switch from camera view (that may show the outside of structure 5400 and a mark that indicates presence of 5401) and a map view that shows a position of 5401 on a map. In one embodiment of the present invention camera 5402 is an infrared camera. In one embodiment of the present invention camera 5402 includes a rangefinder which may be a laser range finder.

In one embodiment of the present invention a map displayed to a user of 5402 or on a screen of 5402 is a map from a perspective of 5401. This allows a user of 5402 to provide instructions to a user on the location of 5401 to for instance safely leave structure 5400 and it prevents confusion about taking left and right turns. In one embodiment of the present invention the device 5401 also has a camera and a user of 5402 can see on a screen which may be a screen of 5402 images generated by a camera on 5401.

In one embodiment of the present invention devices 5402 and 5401 are pre-paired in the sense that device 5401 automatically authorizes requests from a particular device 5402, for instance because a code sent by 5402 is pre-authorized. In one embodiment of the present invention a first device such as device 5402 illustrated in FIG. 54 is a smartphone or a tablet and a second device such as device 5401 illustrated in FIG. 54 is also a smartphone or a tablet. The second device with positioning capabilities, including altitude, may be attached to an object or person, like a young child, unable to operate the second device. In the case that the first device is already pre-paired to the second device, the second device still has to receive a request, but recognizes for instance a code that identifies the first device as authorized and permits and enables data exchange of positioning data between the devices. In one embodiment of the present invention the second positioning device has no camera and/or certain other capabilities that standard smartphones have such as a microphone, or a loudspeaker, or a large screen. Its main purpose it to generate positioning data, including altitude upon request and to wirelessly exchange data with another device. In such an embodiment the second device can be quite small and attached or part of clothing or attached to clothing or to a body of an object or a person or an animal and has only the required components, circuitry, antenna and power source to act as a wireless location/positioning device with communication capabilities and may have a small screen to display status data.

In one embodiment of the present invention the first and the second positioning device both receive satellite navigation signals and use a common GPS or satellite navigation system coordinate system. In one embodiment of the present invention at least one of the two devices, as illustrated in FIG. 54 for instance, operates in an indoor positioning system that operates with its own coordinate system while another device operates in a satellite navigation system coordinate system. In accordance with an aspect of the present invention a translation of one coordinate system into another is enabled. Such enablement may be on one of the two devices. The coordinate translation may also be provided on a server in a network that can be contacted over a network as illustrated in FIG. 2.

One may call aspects of the present invention: seeing through walls or seeing through crowds or seeing through objects. In one embodiment of the present invention a data file which may include image and/or sound data is associated with a device such as device 5401. Part or all content of the data file related to the object or person 5401 is provided to the requesting device 5402 where it may be displayed. Both the requesting device 5402 and the searched device 5401 have their positional coordinates, including an altitude, which allows a processor in 5402 to determining a pose that puts 5401 in the field of view of a camera on 5402. In one embodiment of the present invention, the object is a storage container among a plurality of storage containers that may be stacked and obscuring each other in a stacked fashion. This is illustrated in FIG. 54 wherein object 5401 with an ID and positional device is inside or attached to a storage container 5411. Container 5411 is part of a stack of storage containers 5400 that includes containers 5410, 5411, 5415 and 5416. The containers may be boxed, drums, chests, shipping containers that may be stacked in a warehouse, a yard, a ship, a truck or any place else where containers may be stacked. A container that is present in a stack and has a positional device can easily be found with a corresponding searching device. Before one starts moving containers out of the way to remove the identified container one can check on the requesting device the data file that describes a content of a container.

In one embodiment of the present invention a positional device is attached to a vehicle like a car or a truck. The vehicle may be stored or parked on a site with many vehicles. The positional device in the vehicle is paired with a requesting device like a smartphone. The requesting device transmits a request to the positional device in the vehicle and the user of the requesting device can find the vehicle with the requesting device which may be a smartphone. This is useful in finding a vehicle on a parking lot for instance at an airport after a trip and the user may have forgotten a location of a vehicle. A similar problem may arise with locating a rental vehicle. A rental vehicle may be parked on a parking lot or on a street and the color, make and exact location of the vehicle have been forgotten. An image of the vehicle may be displayed on the smartphone. The disclosed aspects of the present invention are helpful in locating the vehicle. This is safer than one method that is often used by activating a door opener which often activates outside lights. However, if one misses finding the vehicle it may be left with its doors unlocked. In accordance with an aspect of the present invention a smartphone of a user is paired or authorized for a location request with a positional device in or attached to a vehicle by an authority that is authorized to perform such a pairing. Such an authority may be an authority that authorizes a rental or use of a vehicle to a user, for instance for a certain period. In accordance with an aspect of the present invention the authorization of a location request between a user requesting device such as a smartphone and a positional device (for instance on a vehicle) expires after a predetermined period or by an action of the authority and the pairing is disabled.

A vehicle may be parked in a multi-level parking garage. Forgetting the parking location, especially the level of the parking spot in the garage is very inconvenient. In accordance with an aspect of the present invention a location, including the level of the parking spot can easily be retrieved by applying one or more aspects of the present invention. In one embodiment of the present invention a user determines if the vehicle is located on a higher or lower or at the same level as the requesting device. In one embodiment of the present invention a parking authority or management operates a parking specific location system wherein each parking spot has its specific coordinates which may be GPS coordinates or GPS-based coordinates or may be provided as parking specific coordinates (level X, aisle B, spot 7 for example). When a vehicle is parked on a spot, its coordinates are translated and/or stored as local coordinates on the positional device of the vehicle based on a connection with a local parking system. A location request from a smartphone to a positional device will receive as a response the pose instructions but also the local coordinates such as level, aisle and parking slot number.

In one embodiment of the present invention a presence of a positioning device needs to be located (or its absence confirmed) after a location of an object has been determined. This is in some respects a reverse of previous aspects of the present invention where a location is unknown to a searcher but an ID of a searched device is known. Earlier above, it was shown that a location of an object can be determined by two cameras as illustrated by for instance in FIG. 3. In certain cases one may have only access to one device such as a smartphone and there is a need to find information about a device with location capabilities including an altitude which may be located among other devices with similar capabilities. For instance a device is attached to a container and the container is stacked and perhaps even obscured by other containers. One may be in need of information about a certain container. In one embodiment of the present invention a device like a smartphone with positioning capability is directed at a container with a positioning device (potentially obscured by another container, also with a positioning device). This is illustrated in FIG. 55. Camera 5402 that is part of a computing/communication device that can determine a pose and coordinates (orientation at a location) with devices like MEMS, gyroscopes, accelerometers, digital compass, outdoor GPS and/or indoor positioning when pointed in a direction of the container. For instance camera 5402 is pointed at container 5411 in a stack with positioning device 5401. Container 5411 is obscured in the stack from the camera 5402 by container 5410 with positioning device 5420. One way to find out the identity of a container at the position of 5401 is to interrogate all containers in the area to ID themselves.

Figure 56:
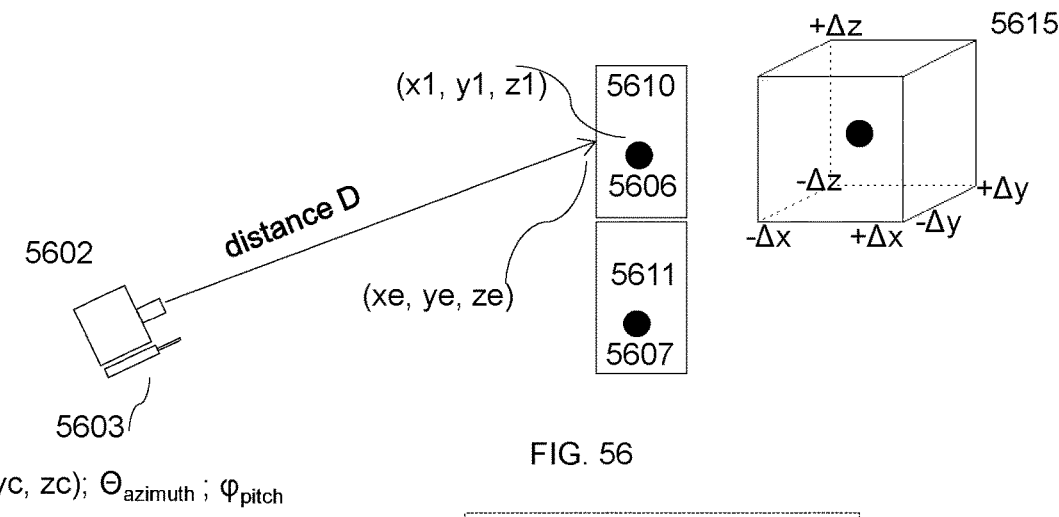

A more efficient way to find out about the containers is find out the identity of containers that are in the field of view, even when obstructed, of camera 5402. In accordance with an aspect of the present invention the positioning devices 5420 and 5401 are associated with their actual position (GPS or indoor coordinates) in a database. Assume that 5420 presently has horizontal coordinates (x1, y1) and altitude z1 (or general coordinates (x1, y1, z1)) and 5401 has coordinates (x2, y2, z2). It is assumed for an embodiment of the present invention that the ID of the object such as a container and the correct ID of the corresponding positional device is unknown or uncertain to a device such as a smartphone with camera or the user thereof. The smartphone is in contact with a database, which may be stored on the smartphone or on a locally accessible device or on a remote database that can all be accessed from the smartphone as illustrated for instance in FIG. 2. The challenge for the smartphone is to determine or at least estimate a location of the object (coordinates, including an altitude). Based on the determined or estimated coordinates, the database is searched to find the object or objects that are occupying coordinates that are identical or at least close to the determined or estimated coordinates. Only one object can occupy specific coordinates. To address potential inaccuracies, one may set an area of uncertainty around the estimated or determined coordinates. The database will provide all stored objects that are located within that area. In accordance with an aspect of the present invention also a time frame is defined that instructs the database to provide a history of objects that have occupied the area. The problem to be solved is to determine or estimate a location of an object with the smartphone with camera of which a location and a pose are known. One of ordinary skill knows how to determine coordinates of a point relative to a camera or smartphone, when the coordinates of the camera or smartphone (xc, yc, zc), additional pose parameters ($\Theta_{azimuth}$ and $\varphi_{pitch}$) and distance D from smartphone/camera to point are known or estimated. This is illustrated in FIG. 56 where a distance D from camera/smartphone 5602 to a visible point on an object 5610 is measured or estimated. The object 5610, which may be a container or a person or an object has attached or inside it a positional device 5606 with position coordinates (x1, y1, z1) which may be positioned above object 5611 which contains or has attached a positional device 5607. How to calculate coordinates (xe, ye, ze) of a visible spot on object 5610 based on the available data by standard geometric calculations is known in the literature. It is explained in for instance Kuscer et al.: Measurement Uncertainty Assessment in Remote Object Geolocation, Journal of Mechanical Engineering 59(2013)1, 32-40, DOI:10.5545/sv-jme.2012.642, which is incorporated herein by reference.

A database as provided above is in one embodiment of the present invention a Geographic Information System (GIS) database for instance such as marketed by Esri of Redlands, Calif. under brandname ArcGIS for accessing and processing positioning data and described in URLhttp://desktop.arcgis.com/en/arcmap/10.3/manage-data/geodatabases/types-of-geodatabases.htm which is incorporated herein by reference. A database for storing location information of shipping containers is disclosed in U.S. Pat. No. 7,194,330 to Robert Carson issued on Mar. 20, 2007 which is incorporated herein by reference.

The determination of the distance of between the camera/smartphone and object requires a rangefinder or at least a rangefinding method. In case of objects that have known sizes (such as shipping containers) one may apply Mil-dot Range Estimation as is known in the art. Furthermore range finding applications that apply the camera in a smartphone (and that are generally applied in the game of golf). In accordance with an aspect of the present invention a dedicated range finder tool 5603 is used by the smartphone 5602. One rangefinding tool that works with a smartphone is a laser based rangefinder of which an example is manufactured/marketed under the brand name Ryobi Power Tools marketed by One World Technologies, Inc. of Anderson, S.C. Other types of rangefinders apply radar or ultra-sound. An affordable LIDAR rangefinder that works with a smartphone is provided in "A smartphone-based laser distance sensor for outdoor environments," Gao et al., Computer Science and Artificial Intelligence Laboratory, EECS Department, Massachusetts Institute of Technology, downloaded from "URLhttps://projects.csail.mit.edu/wiki/pub/LSPgroup/PublicationList/PhoneLidarICRA 2016.pdf" and which is incorporated herein by reference. A sonar based range finder is provided in "A Software Based Sonar Ranging Sensor for Smart Phones" by Graham et al., downloaded from URLhttp://www.cs.wm.edu/~gzhou/files/SonarSensor_iot15.pdf which is incorporated herein by reference. Radar based rangefinders are also known.

A rangefinder may be close to the camera. The rangefinder may also be a short distance away from the camera. The rangefinder (if a device different from the camera) is substantially close to the camera, wherein substantially close is preferable within a radius of 5 meters, more preferably within a radius of 2.5 meters and most preferably within a radius less than 1 meter. The distance that is determined between object and rangefinder is substantially, including variations as provided above, the distance between camera and object.

Rangefinders have an uncertainty in their results which translates into an inaccuracy. Furthermore, the distance to a visible outside point is usually determined by rangefinding devices that rely on cameras or "flight-of-time" principle. The actual position of a positioning device 5606 may be on the back or rear of a container and may provide a variation of a length or depth of a container. In accordance with an aspect of the present invention an estimated location (xe, ye, ze) is calculated by the computing device or smartphone based on the available data. Based on other data, such as size and density of objects and accuracy of the calculations and measurements a "location box" 5615 is determined. The "location box" is defined as a location search box that is based on the calculated or estimated coordinates (xe, ye, ze) and with boundaries defined by a preset variation around (xe, ye, ze). In FIG. 56 'location box' 5615 is illustrated as a cube with symmetric variations ±Δx, ±Δy and ±Δz. This is for illustrative purposes only. The preset variation may be asymmetric, different in each major axis and direction. The "box" may also not be a cube, but can be any shape that is appropriate, including a sphere or an ellipsoid. What is important is that the boundaries of the 'box' are well defined.

In accordance with an aspect of the present invention, a smartphone or computing device determines, based on a distance between itself and an object and a pose that places the object in a field of view of a camera of the device, a "location volume" with boundaries, the boundaries being defined by positional coordinates, which may be GPS coordinates or indoor coordinates. A pose herein is a directional pose determined by tilt or pitch and azimuth or pan direction. In one embodiment of the present invention, the device or smartphone has records or a database of objects with their spatial or position coordinates. The computing device searches its records or database to identify and/or list or display and/or make available for review all objects that are located within the "location volume." In the illustrative example of FIG. 56 there are two objects with positioning devices in each neighborhood. The camera is clearly pointed at object 5610 and there is for now no interest in 5611. As an illustrative example the "location volume" is set at for instance not more variation than 30% in the z-direction. Because the location device 5606 may be at the back of object 5610, a preferred variation in the x-direction may be 150% of the known depth of object 5610. Similar reasons may be applied to the y-direction, if the y-direction is the length of a container for instance. The database or records search in one illustrative example returns with one positioning device being identified within the "location volume." This indicates that the found ID likely pertains to 5610 and the smartphone is instructed to display data related to this device. If no ID is found then the "location volume" is extended.

Figure 57:
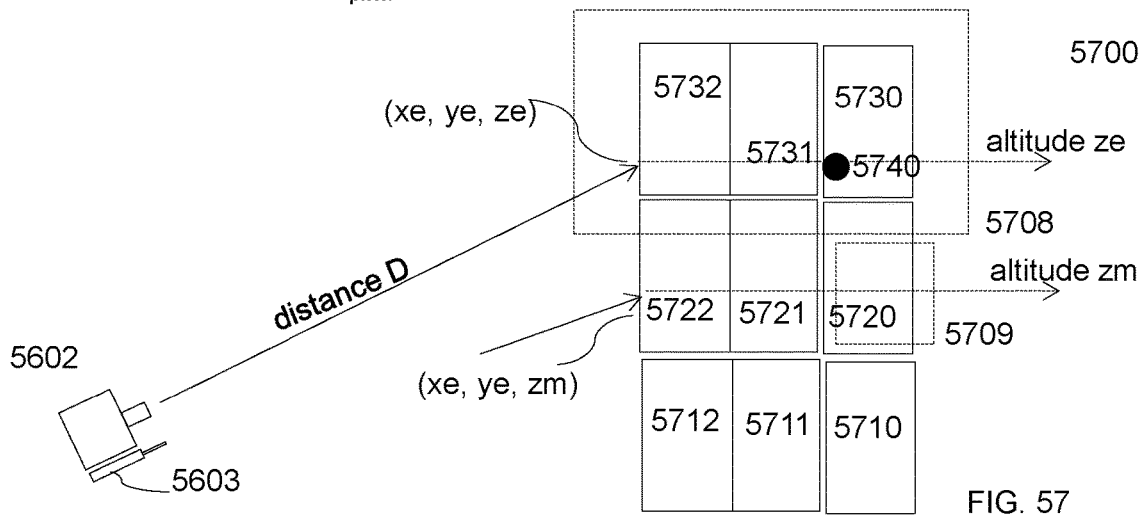

In one embodiment of the present invention it is desirable to limit a size of the "location volume" for instance to limit a number of objects that may be found. This is illustrated in FIG. 57 wherein a stack of 3 rows and 3 columns of containers is illustrated. A surveyor is aware of a structure of the stack and is interested in the top row and in particular the 'hidden' container 5730. It would be confusing to get information about all containers in the stack. To limit the retrieved data found in a database and displayed on a screen in the device that includes camera 5602 the "location volume" is preset and limited in size, for instance as size 5708. The area outside the "location volume" is called an "exclusion zone." Both the "location volume" and the "exclusion zone" are based on a size of an object, a number of expected objects and an expected accuracy of the determined "location volume" to capture the object that is searched for. In accordance with an aspect of the present invention the "location volume" is adjusted or modified based on a search result. The stack of containers 5700 has containers 5710, 5711, 5712, 5720, 5721, 5722, 5730, 5731 and 5732. Assume for this example that all containers coordinates and other data are stored in a database searchable on positional coordinates of the containers. All objects or containers occupy a volume. The positional coordinates of a container may be determined by the positional coordinates of a positioning device such as 5740 or by the coordinates of one or more marks or identifying features of a container or a calculated point like a center of gravity of an empty container. A "location volume" that is too short may find container 5732 and even 5731 but not 5730. Based on other information a surveyor knows that the stack has at least 3 columns and by re-sizing (enlarging in depth) of the "location volume" will be able to find 5730. A "location volume" that is too high may also generate 5712, 5711 and 5710 which may be considered as clutter in a search result. In that case the height of a "location volume" should be diminished. If the location coordinates of an object in a stack are well defined (such as upper right corner facing the camera or center of gravity of an object) then a much narrower "location volume" can be used as such a "location volume" is most likely to capture or cover the location coordinates of an object such as a container. This is further illustrated in FIG. 57. Assume a pose and coordinates of 5602 and a distance measured by 5603 identifies a point (xe, ye, zm) on container 5722 in the second row. Assume that the center of a container determines its location. If one is only interested in the last object or container 5720 in this row then a "location volume" 5709 will lead to a proper find in the database. This is a form of "looking" behind objects by placing the locations that obscure a particular location in an "exclusion zone."

An object generated in a database location search may have a positioning device which may have a particular ID. When the ID of a device is provided as a result of a search and there is authorization or pairing, one may apply the earlier above described steps and/or devices to place (a potentially hidden) object in a field of view of a camera.

In accordance with an aspect of the present invention an object is a structure or a part of a structure such as a room, a hospital room, an office, an apartment, a cell, a part of a boat and the like. A surveyor who is operating device 5602 may be a security officer who notices suspicious activities in a warehouse or another building with rooms or walled spaces 5710 to 5732 as illustrated in FIG. 57. Assuming that data of such walled spaces is stored in a coordinate searchable database, steps and apparatus as provided herein can assist in finding more information about a specific space. A positioning device 5740 may be detected and may be contacted as described earlier.

In one embodiment of the present invention the camera is pointed at an object like a person, a shipping container, a vehicle, a building or any object that acts as a facade that may be opaque and that obscures one or more objects or rooms or structures in a location volume from view by a camera. In accordance with an aspect of the present invention a transparency of the image of the facade object is increased and objects identified to be in the location volume are drawn in a wireframe or contour by the processor on the display, based on information in the database. Objects may also be identified as blobs, contours or shapes such as rectangles and ellipse to provide a viewer context of orientation of hidden objects relative to the facade that obscures the location volume. This is called "drawing an outline" or "drawing an outline of a hidden object" or "drawing an outline of an object in the location volume."

Figure 58:
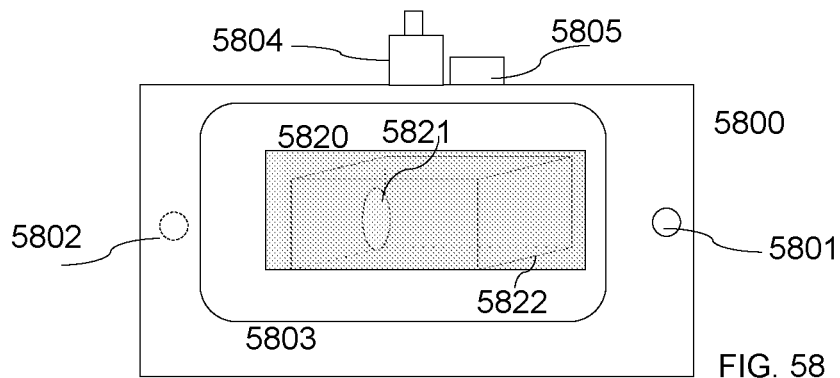
FIGS. 58, 59A, 59B and 60 illustrate cameras and computing devices in accordance with one or more aspects of the present invention.

This is illustrated in FIG. 58 where on screen 5803 an image of a wall 5820 of an object recorded by camera 5804 displayed in a transparent mode. Drawn into the image based on available data are the contours of a room/space/object 5822 and an ellipse identifying an object 5821 with a positioning device. The processor may also draw contours of a location volume, which is not shown herein as to not overcrowd the drawing with too many details. A position on a screen of an outline of an object is commensurate with its positional coordinates and a size of an outline is commensurate with its actual size in an embodiment of the present invention. An outline of the location volume may also be provided on a screen.

In defined environments, including warehouses or container yards, position device readers are placed and facilitated (for instance by ad-hoc networks) in such a way that all positioning devices can be communicated with. Also, cameras may be attached to a movable gantry or arm or a moving or static pole to facilitate viewing of objects by the camera, like 100s of new cars in a parking lot, each with their own positioning device.

In one embodiment of the present invention the camera is movable as to be at least rotatable. In one embodiment of the present invention the camera is movable as to be translatable in the x-y plane. In one embodiment of the present invention the camera is mobile, portable and movable such as a camera in a smartphone. In one embodiment of the present invention the camera is earthbound as being attached to an earthbound structure which includes a building or a car or truck or a boat or other earthbound vehicle or structure or operated by a person on earth who is not flying. In one embodiment of the present invention the camera is not earth bound as being attached to an aircraft including an airplane, a helicopter or a drone or a person flying in an aircraft.

In one embodiment of the present invention the searching device with camera is one of the group consisting of 1) a smartphone; 2) a tablet computer; 3) a laptop computer; 4) a mobile computing device in a wearable headframe such as illustrated by FIG. 39; 5) an assembled computing device including a) a programmed processor with memory configured to perform steps of the present invention b) power source c) communication circuitry d) at least one antenna d) a camera e) connectors or connecting equipment such as Bluetooth wireless circuitry f) a screen; g) a housing h) controlling circuits which may include buttons and/or touch screen controls or other controls i) a digital compass j) GPS circuitry k) circuitry such as accelerometers and/or gyroscope 1) an on/off control m) positioning circuitry like the Broadcom BCM4752 chip with Multi-Constellation acquisition and n) range-finding circuitry and/or devices.

In one embodiment of the present invention the camera 5602 is part of a smartphone or tablet computer which has been modified as illustrated in FIG. 58. FIG. 58 is a diagram of a tablet computer or smartphone 5800, which is shown in landscape orientation but is also used in portrait orientation. It has a screen 5803, which in one embodiment is a touchscreen from which instruction to the processor can be provided. In general a smartphone and tablet have two cameras: a rear camera on the opposite side of the side with the screen of which lens 5802 is shown in dashed lines because it is not visible in this view and a front camera with lens 5801 on the side with the screen. Using the camera with lens 5802 for aspects of the present invention is a bit awkward because the tablet or smartphone has to be held up and it is difficult to enter instruction on the touch screen 5803. It is more convenient to have a camera on an edge of the smartphone or tablet. This is illustrated as camera 5804 which is attached as an illustrated example on the top edge of the smartphone or tablet in landscape mode. Also shown is a rangefinder 5805 which is also attached to the edge of a body of the device 5800. A body of 5800 has a length, a width and a thickness. The edge of 5800 is the side usually designated as having the thickness. The camera 5894 substantially lies in the plane of screen 5803 or parallel to 5803 and is perpendicular to front and rear camera lenses 5801 and 5802. The camera 5804 and the rangefinder 5805 may be integrated into a body of the smartphone or tablet 5800. This allows a pre-use, factory directed, calibration of the camera and rangefinder to integrate with sensors such as pose sensors and GPS sensors in device 5800. The camera 5804 and rangefinder 5805 may also be fixed into a harness or holder that is clamped to device 5800. The holder with camera and rangefinder may have their own controllers and memory and communication circuitry which allows it to communicate with a processor in 5800. The holder structure allows the camera 5804 and/or rangefinder 5805 to be attached or detached from 5800 and to be used in portrait and landscape mode of 5800. This embodiment allows steps of the present invention to be performed while device 5800 is not blocking a view and also providing annotations or instructions on the screen is greatly facilitated. The inclusion of a rangefinder 5805 may be dropped if images only are used to estimate a distance.

Different configurations are used of computing device with camera and optionally a rangefinder and a pan/tilt motorized platform. When the camera is attached to the computing device, which includes being integrated in the body and clamped to the body, positional data including an altitude of the computing device is intended to mean also positional data of the camera. A pose of the computing device is intended to include a pose of the camera. If the camera is attached to an edge then pose data have to be adjusted for a rotation with 90 degrees or a multiple thereof. For the configuration of FIG. 60 which is described herein, the positional data including an altitude is the same as that of the computing device or substantially the same. However, because the camera body 5900 is rotatable independent from the computing device, additional devices are required. In one embodiment of the present invention device 5900 has its own pose sensors and may communicate those to device 6000. In one embodiment of the present invention the combination of connector 5903 with receptor 6001 includes an axis position sensor which determines the angle of rotation of 5900 relative to 6000 which is used with the angular position of 6000 to determine the pose 0f 5900.

Figure 59A:
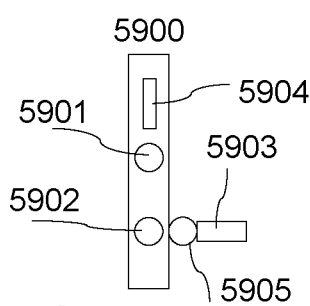
Figure 59B:
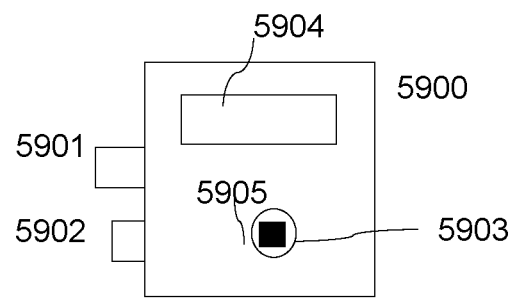
Figure 60:
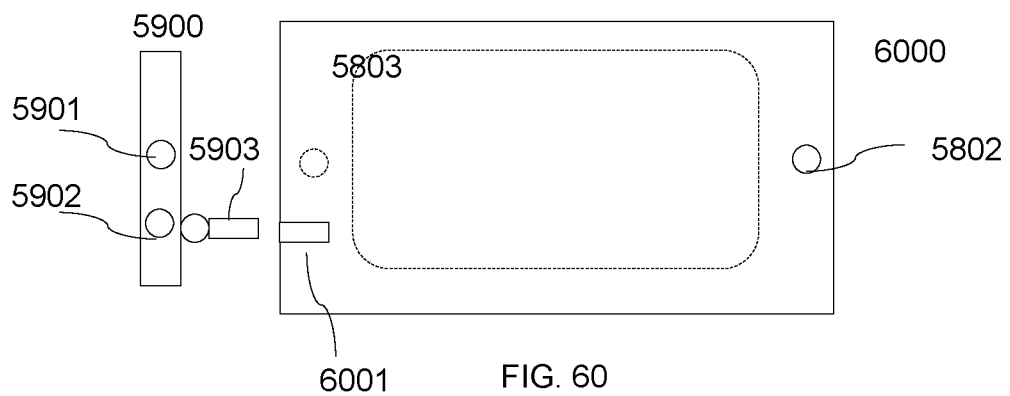

In certain cases a device like 5800 has to be held in a certain position, for instance for convenience or for limited room availability or for other reasons. It thus would be beneficial if the position of camera and/or rangefinder does not strictly depend on a position of device 5800 and offering a user the benefits of using the screen while applying the camera in accordance with one or more aspects of the present invention. In accordance with an aspect of the present invention a camera device 5900 as illustrated in FIGS. 59A and 59B is provided. The camera device 5900 has at least a camera of which lens 5901 is shown and a rangefinder 5902 of which a transmitter/receiver 5902 is shown. The rangefinder may be optional in one embodiment of the present invention. The camera device is embodied in a body or housing 5900. The body or housing contains circuitry 5904 and optionally a power source. Details of components and circuitry, including connections, in FIGS. 59A and 59B in 5900 have been omitted as not to obscure a purpose of the device, but should be assumed as one of ordinary skill knows. The circuitry contains control circuitry, sensors such as pose sensors, communication circuitry to communicate with device 5800, if so desired separate positioning or GPS circuitry. Device 5900 may optionally have a small display to provide status data and thumbnail images. Furthermore, 5900 has a connecting device 5903 that enables device 5900 to be mechanically connected to device 5800 via a rotatable mechanical connector 5905. FIG. 59A shows a frontal schematic view of device 5900 and FIG. 59B shows a side view of 5900. Device 5900 is at least rotatable 5903 with some friction so that the device 5900 can be placed in a semi-fixed but movable position relative to 5903. Connecting device 5903 in one illustrative example has a preferably not circle cross section. In one embodiment of the present invention a smartphone/tablet 5800 is modified to smartphone 6000 that is provided with a receptacle 6001 as shown in FIG. 60 to receive 5903 and that firmly but removably holds 5903. In one embodiment of the present invention connector 5903 is used to provide power to 5900 from a power source in 6000 when connected. Circuitry in 5900 determines a pose of 5900 relative to a horizon. Device 5900 may have its own positioning circuitry, to determine positional coordinates, including an altitude. Device 5900 may also rely on device 6000 or 5800 for positional coordinates. In one embodiment device can be rotated in a plane perpendicular to and around 5903 and thus parallel to the side of 6000. In a one embodiment of the present invention 5900 is also movable, because of ball connector 5905 in multiple planes. Accordingly, device 5900 can be placed in a desirable pose while computing device 6000 is held in a preferred or substantially preferred position. Data is exchanged between 5900 and 6000, preferably wirelessly and data and images as well as instructions to move 5900 in a particular pose can be viewed on screen 5803. In one embodiment of the present invention device 5900 can be handheld and spatially separate from either 5800 and/or 6000. Device 5900 may still be connected for communication with 5800 or 6000, and such communication is either wireless or through a cable.

In one embodiment of the present invention device 5900 is integrated into a headframe as illustrated in FIG. 39. In one embodiment of the present invention the display 3904 in the headframe is used to view images or data. In one embodiment of the present invention the screen 3904 displays data from separate device 5900. In one embodiment of the present invention device 5900 is integrated into headframe 3900. However the data is viewed on a separate device 5800 which is in communication with 3900. Preferably camera 3903 is rotatably fixed on 3900 so a user of 3900 can look down on device 5800 while the user rotates 3903 in a preferred pose. In such an embodiment a pose of 3903 is derived from a pose of 3900 or camera 3903 has its own pose sensors that determine a pose of 3903 relative to a horizon.

Figure 61:
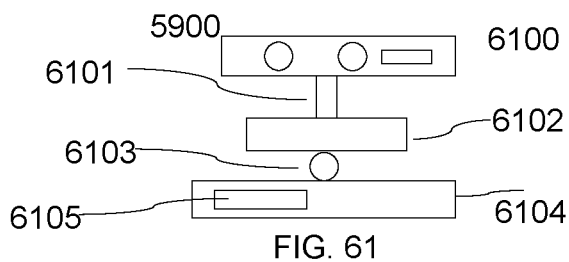
FIG. 61 illustrates a motorized pan/tilt camera platform in accordance with one or more aspects of the present invention.

In one embodiment of the present invention other constructions to attach 5900 to a computing device such as 5800 are contemplates, including clamping and screw constructions. Preferably a construction holds a camera and optionally a rangefinder in a fixed position. An illustrative embodiment of a motorized platform 6100 is provided in diagram in FIG. 61. A camera device 5900 with optional rangefinder and with sensors that enable determining a pose of the camera is attached to a motor controlled platform. The device 5900 is, preferably removably, attached with a connector or fixture 6101 to a motor rotatable platform 6102 which itself is attached with a motor tilting or motorized hinge like fixture 6103 to a base 6104 that is attachable to a structure like a tripod, a frame or other parts of a vehicle or to any other structure that may be static, moving or movable. The motorized platform as illustrated in FIG. 61 has circuitry 6105 to receive signals to activate and control one or more motors. A power source for the platform is assumed but not shown as well as circuitry to communicate with 5900 and/or with a computing device 5800/6000. Some elements are not shown in this and other drawings to prevent obscuring other details as provided herein. The platform 6100 of FIG. 61 is generally available and is for instance known as motorized and remote controlled pan/tilt scanner head or pan/tilt camera head and are marketed by companies such as Pelco of Clovis, Calif. and Bescor of Farmingdale, N.Y. In one embodiment of the present invention positioning of the camera and optionally the rangefinder in 5900 in a desired pose with the platform 6100 in pitch (tilt) and azimuth (pan) is calibrated with the sensors (accelerometers, gyroscope and digital compass) of 5900 and the controls of the platform 6100.

FIG. 57 illustrates an example of a location volume 5709, which has boundaries that are for example parallel to the ground. Other orientations and shapes of location volumes are contemplated and may be angled relative to the horizon or of irregular shape. The term horizon is applied herein as to be a common horizon would be understood by one of ordinary skill in navigation. One may use any of horizons as known, including an artificial horizon as available on smartphones and computing tablets. In case of doubt a horizon is defined as "One of several lines or planes used as reference for observation and measurement relative to a given location on the surface of the earth, and referred generally to a horizontal direction (i.e., at right angles to the zenith)" as provided by the American Meteorological Society. However, different horizons may be used, as long as they lead to substantially a camera to be positioned in a correct pose with a deviation that is preferably not greater than 15 degrees from an ideal, more preferably a deviation not greater than 10 degrees and most preferably a deviation not greater than 5 degrees wherein an ideal is a camera be positioned so that an object is exactly in the center of a field of view.

In one embodiment of the present invention an object is recorded into a database by determining, for instance with a smartphone with positioning circuitry, positional coordinates of an object or a spot in an object or structure or room. If the structure is movable or mobile, such as a vehicle or a shipping container, one or two or more positional measurements of recognizable elements, such as left front and rear light in a vehicle or upper corners of a shipping container as illustrative examples, are recorded. All positions inside the structure are recorded and calculated as relative to the recognizable elements. Inside a structure, such as a house, a vehicle, a container, a warehouse additional data or information that may include a written description, an image, a sound recording, or a video recording is associated with a specific location or a specific location volume determined by location coordinates which may be relative position coordinates. The data may be retrieved from the database based on a preset location volume and steps as provided herein.

One way to visualize this is to assume a house on a hill, including a bedroom, a kitchen and a bathroom and with a wall and a garden behind the house. Images are recorded of the rooms and garden with positions or location volumes. A user with a smartphone or tablet in accordance with an embodiment of the present invention sets a location volume that captures a particular room or garden and points a camera in the smartphone at the front door of the house on the hill. Positional coordinates of the front door are determined and a location volume for search is calculated. Based on the location volume images, and/or sounds and/or descriptions or documents of the room or garden captured by the location volume are retrieved from the database and are displayed on the screen of the smartphone. A preset location volume is associated with a label like kitchen and garden and a search location volume is calculated based on preset volume, pose and coordinates of the camera. A location volume may include the point at which the camera is directed as shown as 5709 in FIG. 57.

Some fine tuning may increase the accuracy of the above detection. In one embodiment of the present invention the search volume may be adjusted by increasing or decreasing relative to a detected/measured distance. This is illustrated in FIG. 61. A distance between hollow object 6100 and a camera 6110 is determined. To be sure that only objects inside 6100 are detected a certain distance is added to the measured distance, for instance a distance of 10 cm. One may also add a distance of 1 meter or any distance that ensures that only objects truly inside 6100 will be detected. Accordingly a virtual search box 6101 inside 6100 is created. In order to make sure that also objects close to a wall or even on the wall of 6100 are detected one may subtract a distance of for instance 10 cm. One may also subtract a distance of 1 meter or any distance that ensures that objects inside 6100 or very close to 6100 will be detected. This creates a virtual search box 6109.

Especially when stacked objects as in FIG. 57 are searched there is a need for creating a search volume, because here may be irrelevant objects below or above the search volume. In other cases one may search a property or object that has in essence one level. Or one is interested in all objects inside a searched object, such as a house or warehouse or even a department building, in case of a fire for instance, and the search volume is determined by its floor area, and not by its height. In that case, the computing device does a search request for objects within a preset search area determined by its geo-positional coordinates within the search area. In many cases a reasonable estimate of a search area or search contour can be entered, like 10 meter by 10 meter.

Figure 62:
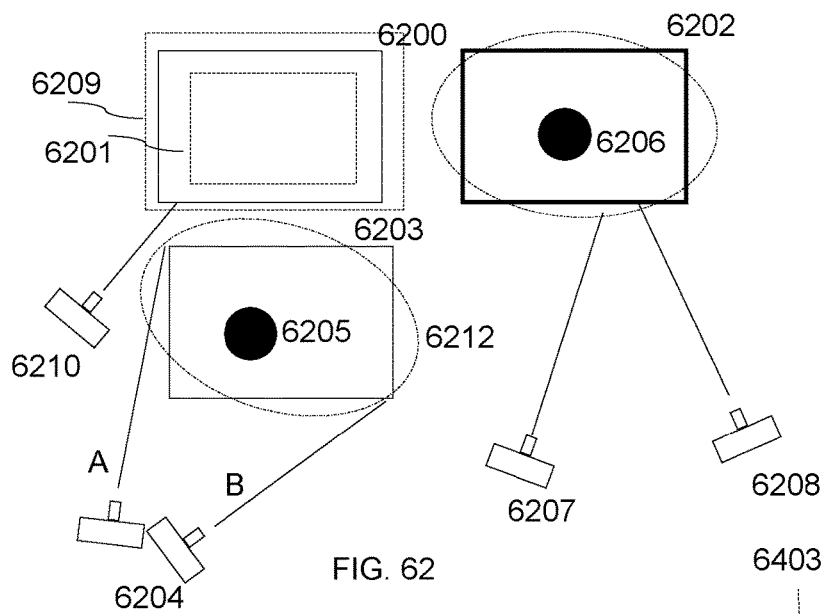
FIG. 62, FIG. 63, FIG. 64, FIG. 65 and FIG. 66 illustrate applications of a search contour in accordance with various aspects of the present invention.

In certain cases one wants to limit a search area or a search volume as to prevent overlap with adjacent objects, rooms or apartments that one does not want to be searched. In one embodiment of the present invention an estimate is made of a size of an object or measurements are made by the camera and calculated by the processor of the smartphone. This is illustrated in FIG. 62. In some cases it is not possible to have the camera in a position that will create a rectangular search area or search volume. In that case a search shape such as a rectangle or an ellipse or a search volume with an appropriate base such as an ellipse has to be created. Such a shape can be pre-programmed into the smartphone or computing device. In one embodiment of the present invention the dimensions are estimated with the camera. For instance camera 6204 is held in positions A and B and based on the measured distance of 6204 to object 6203 an estimate can be calculated of the diagonal of object 6203 between the corners of 6203. This allows to determine with basic geometry to create an area or search volume 6212 that captures most of 6203 with little overlap or spillage into neighboring property to detect in a database presence of an object 6205 inside object or room 6203.

In one embodiment of the present invention a distance to an object, such as a house, may be determined by two cameras 6207 and 6208, both trained on the same spot or close to the same spot of the object such as a house. As long as the center of the camera views of 6207 and 6208 do not cross before the edge of 6202, a reasonable distance to 6202 will be determined, allowing the detection of 6206 inside 6202. Cameras 6207 and 6208 preferably are placed at a distance of each other, for instance at the front and back of a vehicle, preferably with a distance of at least 1 meter, more preferably at a distance of at least 2 meters. Alternatively cameras 6207 and 6208 are the same cameras that are trained at the same spot of 6202 at different positions. This of course allows calculation of a distance of the camera to 6202.

In accordance with an aspect of the present invention, a search contour can be set at a computing device. A search contour is preferably a closed pre-set shape which can be a two-dimensional shape, if a height of a searched object is deemed to be not important, or a three dimensional shape if a height of a searched object is deemed to be of importance. If a camera is located in front of a building a rectangular 2D shape or a rectangular 3D box shape will likely capture the relevant parts of the coordinates of the objects that is searched on its content. If the camera is at some angle a 2D or 3D search volume or search contour may capture too many coordinates and may identify objects in adjacent areas or spaces or too few coordinates and may miss some objects. This can be remedied by starting with an oversized contour that is made smaller based on search results. In accordance with another aspect of the present invention one starts with an undersized search contour that is expanded based on search results or lack thereof.

Figure 63:
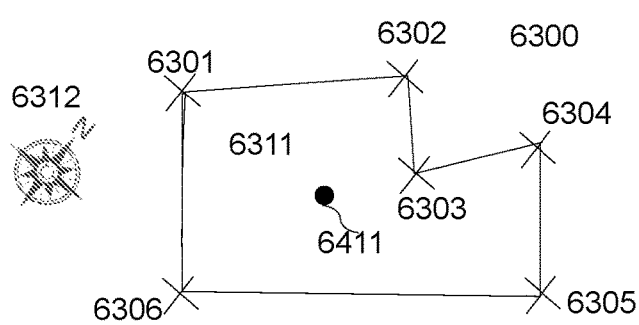

Approximation of a 2D or 3D contour by another shape is in many cases sufficient for detecting a presence of objects that are registered in a database searchable on coordinates such as GPS coordinates. Many, if not most real-estate properties that include land, buildings or other fixed or mainly immobile facilities are described in a survey that gives the metes and bounds of the property and also some of its landmarks, in a contour within a coordinate system. It is advantageous to store the actual 2D-contour on a memory or storage device that is part of the camera and/or computer device or is accessible either through a direct connection or on a remote server, by the camera computer device. A property 6300 as illustrated in FIG. 63 is described by survey coordinates 6301, 6302, 6303, 6304, 6305, 6306 that establish a coordinate 2D contour 6311. Storage of the contour may include a relative orientation for instance in relation to the compass (or magnetic) North. In case of a 3D contour additional height coordinates may be added, for instance if multiple objects are stacked vertically on the same 2D contour. Available property land and property surveys can easily be converted into memory or device stored 2D contours with for instance GPS coordinates. One can do that by using bearing surveys to determine property landmarks and converting them to GPS coordinates. There are a number of software programs available that assist in performing a conversion or a GPS based survey of a property of which some are listed on https://freeappsforme-.com/top-land-surveying-apps-2019/ which is incorporated herein by reference.

In accordance with an aspect of the present invention, a Google™ Earth picture of a property is applied to determine GPS coordinates of a property contour. See for instance at website https://support.google.com/maps/answer/18539?co=GENIE.Platform%3DDesktop&hl=en which is incorporated herein by reference. In accordance with an aspect of the present invention a GPS contour of a property is established with GPS/GNSS recording tools as known in the surveying industry. An example of these surveying tools can be found at website ww.novatel.com of NovAtel of Calgary, Canada which is incorporated herein by reference. The survey and GPS/GNSS technology is described in the NovAtel book "An Introduction to GNSS GPS, GLONASS, BeiDou, Galileo and other Global Navigation Satellite Systems, SECOND EDITION" published by NovAtel, Calgary, Canada, 2015, which is incorporated herein by reference. Accordingly, search contours may be extracted from existing databases such as survey databases, GIS maps, Google Earth and the like.

Figure 64:
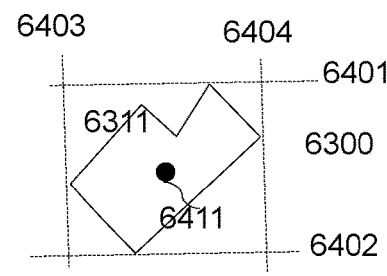

2D GPS contours (or extended 3D GPS contours) of a property such as a house, an apartment, a property or a track of land are stored with its orientation and GPS coordinates in an accessible database. In accordance with an aspect of the present invention an object provided with GPS coordinates is provided with an identifier that identifies a contour that it is in. For instance boundary GPS coordinates 6401 and 6402 for latitude and 6403 and 6404 for longitude in FIG. 64 are provided for a property 6300 with contour 6311 as in FIG. 63. When an object passes the boundaries it is checked if it is inside contour 6311. This can be done with algorithms like Point-in-Polygon as used in image processing and as described in for instance website https://automating-gis-processes.github.io/CSC18/lessons/L4/point-in-polygon.html which is incorporated herein by reference. When the object has moved inside an area with a contour such as 6311 it is assigned an identifier of the contour, such as numeral 6311. A camera/computing device 6315 is directed with the lens to property 6300.

A shape of a contour such as 2D contour 6311 may be irregular. Furthermore, an orientation of a contour may be not aligned with the "grid" of GPS which is generally aligned with compass directions. For instance, a width of a contour 6311 may be considered to be a distance determined by coordinates of 6306 and 6305. However, contour 6311 in its correct compass orientation of property or object 6300 in GPS coordinates has a shape that looks different from FIG. 63. On top of that, the orientation of camera 6315 further changes the coordinate view of 6300 in GPS coordinates. This can make searching on GPS coordinates in a database quite complicated. To facilitate rapid searching on GPS coordinates the following steps are provided in accordance with an aspect of the present invention. In a correct "compass orientation" (for instance relative to the magnetic north), line 6401 is a latitude line determining an extremum position of 6300 parallel to the equator. Line 6402 is the opposite extremum parallel to 6401. Line 6303 is a line determining an extremum longitude of property 6300 and line 6404 is the extremum longitude of 6300 opposite of 6403. These boundary lines determine the borderline values of a search area within which 6311 lies. A point 6411 with GPS coordinates is determined that represents (as a center of gravity for instance) the border values and is a representative GPS point of contour 6311. In relevant cases a contour can be 2D or 3D. In the 3D case a height is provided. A camera 6315 is provided with an instruction to be directed at 6411. When directed at point 6411 camera 6315 is directed at the object 6300. Thus by simple latitude and longitude GPS coordinate limitations a first search in a database can be done of finding objects within those GPS coordinates without initial concern about exact shape of a property or object.

Geographic Information System (GIS) software applications may be able to search any area or contour such as an asymmetric or a symmetric polygon that defines geographic or GPS boundaries for object properties within the boundaries without significant delay. In certain cases it may be beneficial to create a simple contour with rectangular boundaries in a straightforward North-South orientation. The software application searches then for object properties (such as a physical presence, or age, or nationality, or gender or profession or manufacturer or tax status or other relevant properties) of objects located within the boundaries which may be simple rectangular boundaries. Other regular contours such as circles and ellipses are also contemplated. Even more complex and better descriptions of 2D and 3D contours (such as irregular polygons that describe a building or an area) are also contemplated. Height of a 2D contour may be added to create a 3D contour. 2D and 3D contours defined by GPS boundaries may be called search contours or GPS search contours or coordinate search contours.

Figure 65:
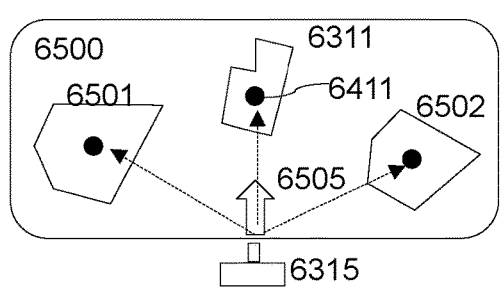
Figure 66:
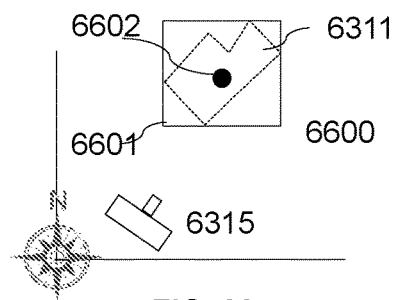

The found objects may be within the GPS limitations, but outside the exact contour 6311. In general an object or property 6300 can be described by a 2D polygon determined by its corner points as illustrated in FIG. 63. The properties of the polygon are in accordance with an aspect of the present invention stored as geospatial data. The polygon is in 2D defined by a spatial are. In addition, in 3D a height or a range of heights further defines a 3D contour for searching objects. There are different ways to check for presence of objects in a 2D/3D contour defined by geospatial data. As an example one may determine if objects are present within a simple rectangular shape that includes the contour as illustrated in FIG. 65 and FIG. 66. In a software procedure objects close to the border of the box 6600 can be tested if they are also inside contour 6311. For instance Matlab® of Mathworks® has a procedure "[in, on]=inpolygon(xq, yq, xv, yv)" that tests if a point is inside or on an edge of a polygon. Such procedures also exist in other computer languages such as Python and are known.

FIG. 65 illustrates what is visible on screen 6500 of device 6315. Device 6315 has GPS capabilities and a compass MEMS and its GPS coordinates as well as compass direction are determined. Either on 6315 or on a remote server, the properties that are closest in distance to the coordinates of 6315 are determined and are displayed on screen 6500. Device 6315 is directed at 6300 and contour 6311 of 6300 in its correct orientation is displayed on screen 6500. Within a field of vision of 6315 are also properties with contours 6501 and 6502, which are also displayed on screen 6500. An arrow or indicator 6505 may indicate the viewing direction of the camera/device. A user then activates a contour, for instance by touching the contour on a touch screen, to display data or images of objects with GPS identification within the contour. If there are many objects, a list of objects may be displayed through which a user can cycle and select an object of which data and/or an image is displayed. In accordance with an aspect of the present invention a size of a contour or a height can be modified to limit or increase number of displayed objects. Visual instructions may be displayed on screen 6500 for a user to move 6315 to point in the direction of another property such as depicted by contour 6502.

Geo-spatial data and attributes of objects associated with geo-spatial data may be stored in Geographic Information System (GIS) mapping files, such as shape files in ArcGIS of ESRI of Redlands, Calif. Functionality of ArcGIS is provided in "Manual for working with ArcGIS 10" by Amy Hiller, January 2011, University of Pennsylvania, downloaded from https://works.bepress.com/amy_hillier/24/ and which is incorporated herein by reference.

In several GIS mapping systems it is possible to approach an object defined by a shape or contour from an arbitrary but defined direction with a camera (or a virtual camera) and generate or search for properties within the contour. In accordance with an aspect of the present invention, the camera is a real camera. This is illustrated in FIG. 65 wherein a camera 6315 with a screen/display 6500 is pointed in a direction illustrated by arrow 6505 shown on screen 6500. The screen 6500 displays properties with contours 6501, 6311 and 6502. The camera is directed at 6311 and this contour may be activated on camera/device 6315, for instance by touching a touch screen portion or by activating a control on device 6315. If no altitude calculation is required, the device can be held so that the compass of device 6315 is directed at 6311. In case an altitude is to be calculated, the lens of 6315 is to be directed at a pose directed at the property represented by 6311.

In certain cases no pre-set contour of a property may be available. In that case a generic search 2D or 3D contour and a pre-set distance may be activated on device 6315. The search volume or contour in the direction wherein the camera is pointing and has an area/volume of the pre-setting with a center for instance on the pre-set distance that determines the search contour/volume that is searched in a database for a presence of objects with a GPS device. A list of objects may be provided on a screen. A specific object may be selected from the list and textual, image or sound data related to the selected object is displayed on the device 6315.

A user may be interested to find out what objects are available for review within a predefined distance of a device such as device 6315. The search distance relative to 6315 may be unlimited, but for practical reasons is preferably less than 10 kilometers, more preferably less than 1 kilometer and most preferably less than 100 meters. Initially a simple 2D contour such as a rectangle or a square oriented in North-South orientation as 6600 that is independent of the orientation of 6315 may be activated. For instance a size 6600 of 100 by 100 meters may be set. One may be interested in an area close to 6315. In that case a contour corner point 6601 of 6600 may be calculated to be at 6315. Because the coordinates of 6315 are known, coordinates of 6600 can be calculated and activated. A search contour has a center 6602 and the coordinate positions of 6600 can be moved by moving 6602 on a screen. Also the size of 6600 can be modified, such as being broadened or narrowed. This search area or volume can be modified by changing position and size of 6600. Search contour 6600 may be associated or attached to coordinates and positioning, such as compass direction and/or elevation, of 6315. In that case, a search contour such as 6600 tracks or follows the position or attitude of 6315. A user may thus sweep a range of positions to find an area or volume of interest, based on information generated by a search in a search contour.

A search in a database may generate different types of information. For instance a search in a database on coordinates of 6600 may generate an object with a contour 6311 within 6600. Contour 6311 may be activated to search for objects within 6311. Presence of objects or numbers of objects inside 6600 may be displayed, allowing a user to perform a more detailed analysis. Absence of information of interest may allow a user to continue a sweep or modify a sweep, for instance by modifying position of 6315 and/or position and size of 6600 relative to 6315. Change in attitude of 6315 may take place in horizontal and/or vertical direction. Speed of a sweep may depend on the speed of generating search data by the geographic database or databases being searched.

Device 6315 in one embodiment of the present invention is a portable and mobile computing device with GPS, compass, altitude, camera and gyroscopic devices such as a smartphone with a display preferably connected to a network that enables access and data exchange with one or more remote databases. In a further embodiment of the present invention device 6315 is integrated in a wearable device such as Google Glasses. In a further embodiment of the present invention device 6315 is integrated in a remotely controlled or autonomous vehicle such as an aircraft drone.

Coordinates herein are often described as Global Positioning System (GPS) coordinates. GPS coordinates are often associated with GPS satellite position systems. Coordinate systems, even GPS coordinate systems, may be used in different forms. For instance it may be beneficial to use decimal GPS coordinates. All objective geographic coordinate systems can be converted into each other's dimensions. No limitation of representation is intended by using GPS coordinates as any objective coordinate system can be used. Many navigation and geographic mapping systems may use coordinates based on an anchor point and apply accurate dead reckoning or inertial navigation to determine coordinates of an object or area (including height). Inertial navigation and mapping can takes place with inertial navigation sensors, including accelerometers, gyroscopes, altitude meters and compasses. Inertial navigation based on image recognition of landmarks with known coordinates is also known. Accordingly, methods and apparatus described herein are not limited to satellite dependency but may include sensor based inertial navigation and image based navigation or a combination thereof.

A contour herein is a 2-dimensional (2D) or 3-dimensional (3D) geographic shape, at least defined by geographic coordinates and in case of a 3-D contour by a height or altitude or a range of altitudes in combination with th2-dimensional coordinates. The shape of a 2D contour may be a symmetric or an asymmetric polygon which can range from a triangle to any polygon with n vertices or n edges. The shape of a contour may also have curved or smooth edges, like a circle or an ellipse. A contour may be defined by its vertices or corner-points and/or equations of lines that connect points or form the edges. A 3D contour preferably is formed from a 2D contour with a height. However, other shapes, like a sphere, a cone, a pyramid or asymmetric or symmetric volumes are also possible. A 2D contour covers a geographic area and a 3D contour covers a geographic volume.

A contour herein has a limited size. A contour may substantially follow a shape of an object, such as a building, land property, a container, a stadium, a public square, a swimming pool. In that sense a search contour may preferably not vary more than 50% from an actual size or 2D projection of an object from which it is the contour. That is: a contour of an existing object substantially covers the size of that object in at least 2D. A generic contour also has a limited size and may be intended to capture an object or area that is analyzed. During use a generic contour may be changed in size a position in a search sweep of a camera. A contour is exactly that: a contour or shape of an area or volume. No internal details of features inside the contour are required. A contour is thus different from a map, which includes details inside the map.

One aspect of the instant invention is to point a camera at an object or sweep an area and find objects that are present within a contour as provided from a database. This means that objects and/or contours are within reasonable viewing distance of a camera. A size of a 2D contour or the 2D aspect of a 3D contour is preferably limited to a geographic area smaller than 1 million square meters, more preferably smaller than 10,000 square meters, even more preferably smaller than 100 square meters, most preferably smaller than 25 square meters.

A search contour thus is a shape defining a geographic area or volume and is defined by geographic coordinates. The search contour encapsulates all coordinates inside the contour. The search contour may be detected and retrieved from a memory or storage possibly of a remote server and displayed on a screen based on a geographic location and/or a pose or orientation of a camera. A contour may also be of a defined size and location set on the device and positioned in a viewing direction of the camera and allows for open ended search. A camera in a device should be pointed to the area or volume represented by the search contour to activate a search in a database for objects within the confines of a search contour. The area or volume of the contour should at least be partially within a field of view of the camera.

In certain cases a shape of an object, such as a container or building or sports field for instance, is known, but the orientation relative to the camera is open ended. For instance a shape and size of a container, a building or a football field or other object can be stored on a memory. The contour may be rotated on a screen and best matched in coordinates with the actual object based on an orientation and position of the camera. A distance between the camera in the orientation and position and the object may be measured and used to better match the shape of the contour with the actual object relative to the position and orientation of the camera.

An object may be registered in a database with its geographic coordinates and one or more properties. An object may be attached to, include or be very close to a geographic coordinate generating device such as a GPS device and the device may contact a remote server to store one or more properties of the device associated with its geographic coordinates. The object may have a smartphone which has it position known or easily detectable by a remote server. One or more properties of the device including owner or user of the device is associated with its geographic coordinates and stored in a database that is searchable including on location. The object, device or user may be associated with a specific contour that is related with a building or property that has a presence of the object, device or user. A timestamp is also provided, allowing to check a presence of an object, device or user during a past period and also after the object, device or user has left the property. Databases are preferably updated regularly to reflect an actual presence. The database may be searched or queried from the mobile device.

An image of an object, device or user may be displayed on a screen when its presence at a relevant time is detected. Such object is preferably hidden from direct view by the camera. The object may be inside another object, like a building or a container, behind a wall, inside a vehicle that obscures the object from view, in a crowd hidden from view by other people or if not obscured being so crowded that direct visual identification on a distance of over a distance of preferable over 10 meter or over 50 meter is impossible. The object may be hidden from view on land or water or in the air by surrounding obstacles, including trees, shrubs, hills, waves, clouds, fog, smoke, fire, people, animals, structures, vehicles or any other object that obscures an object from direct view. Lack of light may also make directly seeing an object impossible.

A distance from a camera to an object may be measured as disclosed earlier above. A distance from a camera to an object may also be determined from landmarks. For instance a geo-position of a camera is known. The camera applies a contour to detect and display objects in a moving truck over a road. The geo-coordinates of a road may be known. A rectangle may be drawn on a screen around a map of the road. The geo-coordinates of the rectangle are determined and are used to determine a search contour for a location where a truck may pass. For practical purposes, the contour may follow a road for several lengths of a truck, allowing sufficient time for a system to query/search a database. The camera is directed to the contour and the contour is activated. A time stamp is generated and a time period, preceding and succeeding the time stamp may be set. Also a different time-period, unrelated to the time-stamp may be set and a search in a geo-database is performed, at least on the contour and preferably on a time period. An image of an image inside the contour, preferably during the time period is displayed on the screen of the mobile device with the camera. Such image may be an image of the truck, stored on the database, including data related to the truck and data which may include an image of one or more objects inside the truck.

A covering or obstructing object like a building or a vehicle may be stored in a geo-database. Objects inside such objects may be associated with the covering object, but may not generate GPS coordinates. Data related to these objects, which may include image data, may be displayed on a screen. For instance a transportation bus may have active GPS equipment which is provided to the database. Passengers, at the beginning of a trip are registered in the database and may not have active GPS devices. However, the camera, when identifying the bus in a contour has access to all data and may this display data of passengers in the bus. A similar approach applies to people who enter a building with a contour and are registered in the geo-database associated with the contour, preferably with a time-stamp.

Aspects of the present invention have been described above in connection with the embodiments thereof. The embodiments are illustrative examples. It is recognized by those skilled in the art that various modifications are possible with regard to the combinations of the components and the processes of the embodiments and such modifications fall within the scope of the various aspects of the present invention.

The invention claimed is:

1. A method for displaying an image of an object, the object having a location with geographic coordinates, comprising:
    displaying a search contour corresponding to a search area on a portable and mobile computing device with a processor, a camera and a screen, the search area being defined by geographic coordinates;
    activating the search contour on the portable and mobile computing device to search a database for one or more objects with geographic coordinates in the search area;
    positioning the camera in a pose determined by the search contour with the search area in a field of vision of the camera, wherein an indicator provides directions to the pose;
    searching the database that is searchable on geographic coordinates based on activating the search contour for one or more objects located within the search area corresponding to the activated search contour;
    retrieving the image of the object identified as being inside the activated search contour; and
    displaying on the screen information including at least the retrieved image of the object being part of the one or more objects located within the search area corresponding to the activated search contour.

2. The method of claim 1, wherein the search contour is a closed two-dimensional contour (2D contour).

3. The method of claim 1, wherein the search contour is a closed three-dimensional contour (3D contour) with two-dimensional geographic coordinates and altitude coordinates.

4. The method of claim 1, further comprising:
    displaying on the screen the search contour based on a geographic location of the camera.

5. The method of claim 1, further comprising:
    displaying on the screen the search contour based on a pose of the camera.

6. The method of claim 1, wherein the search contour includes a two-dimensional contour with two-dimensional geographic coordinates determined by a distance relative to geographic coordinates of the camera.

7. The method of claim 1, wherein the search contour represents a shape of a building or a container.

8. The method of claim 1, wherein the search contour has a rectangular shape.

9. The method of claim 1, wherein the searching of the database covers a period of time.

10. The method of claim 1, wherein the portable and mobile computing device with the processor is a smartphone.

11. The method of claim 1, wherein a shape of the search contour, a size of the search contour and a distance of the search area relative to the camera is set on the portable and mobile computing device.

12. Apparatus to display an object, comprising:
- a mobile, portable and wireless computing device including a screen, a camera and positional sensors to determine positional data of the camera, including an altitude and a directional pose;
- a database device storing data related to one or more objects, the database device being searchable on geographic coordinates;
- a processor in the mobile, portable and wireless computing device enabled to display on the screen a search contour, the search contour corresponding to a search area defined by geographic coordinates, the camera being positioned in a pose determined by the search contour;
- the processor being enabled to execute instructions retrieved from a memory to perform the steps:
  - providing an indicator to direct the camera to the pose;
  - activating the search contour on the portable and mobile computing device to search the database device;
  - querying the database device for one or more objects located within the activated search contour; and
  - retrieving from the database device and displaying on the screen information including at least an image related to the object being part of the one or more objects located within the search area corresponding to the activated search contour.

13. The apparatus of claim 12, wherein the search contour is a two-dimensional contour (2D contour).

14. The apparatus of claim 12, wherein the search contour is a three-dimensional contour (3D contour) with two-dimensional geographic coordinates and altitude coordinates.

15. The apparatus of claim 12, wherein the displaying on the screen of the search contour is based on a geographic location of the camera.

16. The apparatus of claim 12, wherein the search contour includes a two-dimensional contour with two-dimensional geographic coordinates determined by a distance relative to geographic coordinates of the camera.

17. The apparatus of claim 12, wherein the search contour represents a shape of a building or a container.

18. The apparatus of claim 12, wherein the search contour has a rectangular shape.

19. The apparatus of claim 12, wherein the portable and mobile computing device with the processor is a smartphone.

20. The apparatus of claim 12, wherein a shape of the search contour, a size of the search contour and a distance of the search area relative to the camera is set on the portable and mobile computing device.

* * * * *